US012594658B2

(12) United States Patent
Suzuki et al.

(10) Patent No.: US 12,594,658 B2
(45) Date of Patent: Apr. 7, 2026

(54) IMPACT TOOL

(71) Applicant: MAKITA CORPORATION, Anjo (JP)

(72) Inventors: Yuta Suzuki, Anjo (JP); Haruki Tejima, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 19/057,443

(22) Filed: Feb. 19, 2025

(65) Prior Publication Data

US 2025/0289108 A1 Sep. 18, 2025

(30) Foreign Application Priority Data

Mar. 13, 2024 (JP) ................................ 2024-038817

(51) Int. Cl.
*B25F 5/00* (2006.01)
*B25B 21/02* (2006.01)
*B25B 23/18* (2006.01)

(52) U.S. Cl.
CPC .............. *B25F 5/001* (2013.01); *B25B 21/02* (2013.01); *B25B 23/18* (2013.01); *B25F 5/008* (2013.01)

(58) Field of Classification Search
CPC ......... B25B 21/02; B25B 23/18; B25F 5/001; B25F 5/008
See application file for complete search history.

(56) References Cited

U.S. PATENT DOCUMENTS

| | | | | |
|---|---|---|---|---|
| 7,469,753 | B2 * | 12/2008 | Klemm | B23B 45/008 81/473 |
| 8,496,366 | B2 * | 7/2013 | Leong | B25B 21/02 362/446 |
| 2005/0284646 | A1 * | 12/2005 | Bacila | B25D 17/043 173/162.2 |
| 2007/0056757 | A1 * | 3/2007 | Stirm | B25D 17/043 173/162.2 |
| 2012/0090863 | A1 * | 4/2012 | Puzio | B25B 21/002 173/2 |
| 2013/0316626 | A1 * | 11/2013 | Yaschur | B25F 5/02 173/171 |
| 2019/0358789 | A1 * | 11/2019 | Chung | B25B 21/026 |
| 2021/0129307 | A1 * | 5/2021 | Tsuji | B25D 17/24 |
| 2021/0237249 | A1 * | 8/2021 | Fischer | B25F 5/02 |
| 2023/0364756 | A1 * | 11/2023 | Hozumi | F21V 29/503 |
| 2023/0366536 | A1 * | 11/2023 | Hozumi | B25F 5/001 |
| 2024/0058926 | A1 * | 2/2024 | Yueda | B25F 5/02 |
| 2024/0058937 | A1 * | 2/2024 | Chikaraishi | B25F 5/02 |

* cited by examiner

*Primary Examiner* — Himchan Song
(74) *Attorney, Agent, or Firm* — Oliff PLC

(57) ABSTRACT

An impact tool includes: a motor; a speed reduction mechanism rotated by the motor; a hammer rotated by rotation of the motor transmitted via the speed reduction mechanism; an anvil to be impacted in a rotation direction by the hammer; a motor case accommodating the motor; and a gear case accommodating the speed reduction mechanism. One or both of the motor case and the gear case are made of a magnesium alloy.

19 Claims, 35 Drawing Sheets

IMPACT TOOL

CROSS-REFERENCE TO RELATED APPLICATION(S)

The present application claims priority to and incorporates by reference the entire contents of Japanese Patent Application No. 2024-038817 filed in Japan on Mar. 13, 2024.

BACKGROUND

The techniques disclosed in the present specification relates to an impact tool.

In the technical field related to impact tools, a handheld power tool as disclosed in U.S. Pat. No. 8,496,366 B2 is known.

With the trend of higher output of an impact tool, a large impact is applied to components of the impact tool when the hammer impacts the anvil. The component needs to be made of a high-strength material so as to withstand the impact. However, high specific gravity of the high-strength material might increase the weight of the impact tool, leading to deterioration of workability.

SUMMARY

One non-limiting object of the present teachings is to achieve both high strength and light weight in an impact tool.

In one non-limiting aspect of the present teachings, an impact tool includes: a motor; a speed reduction mechanism rotated by the motor; and a hammer rotated by rotation of the motor transmitted via the speed reduction mechanism; an anvil to be impacted in a rotation direction by the hammer; a motor case configured to accommodate the motor; and a gear case configured to accommodate the speed reduction mechanism. One or both of the motor case and the gear case are made of a magnesium alloy.

According to the present teachings, it is possible to achieve both high strength and light weight in the impact tool.

DETAILED DESCRIPTION

Figure 1:
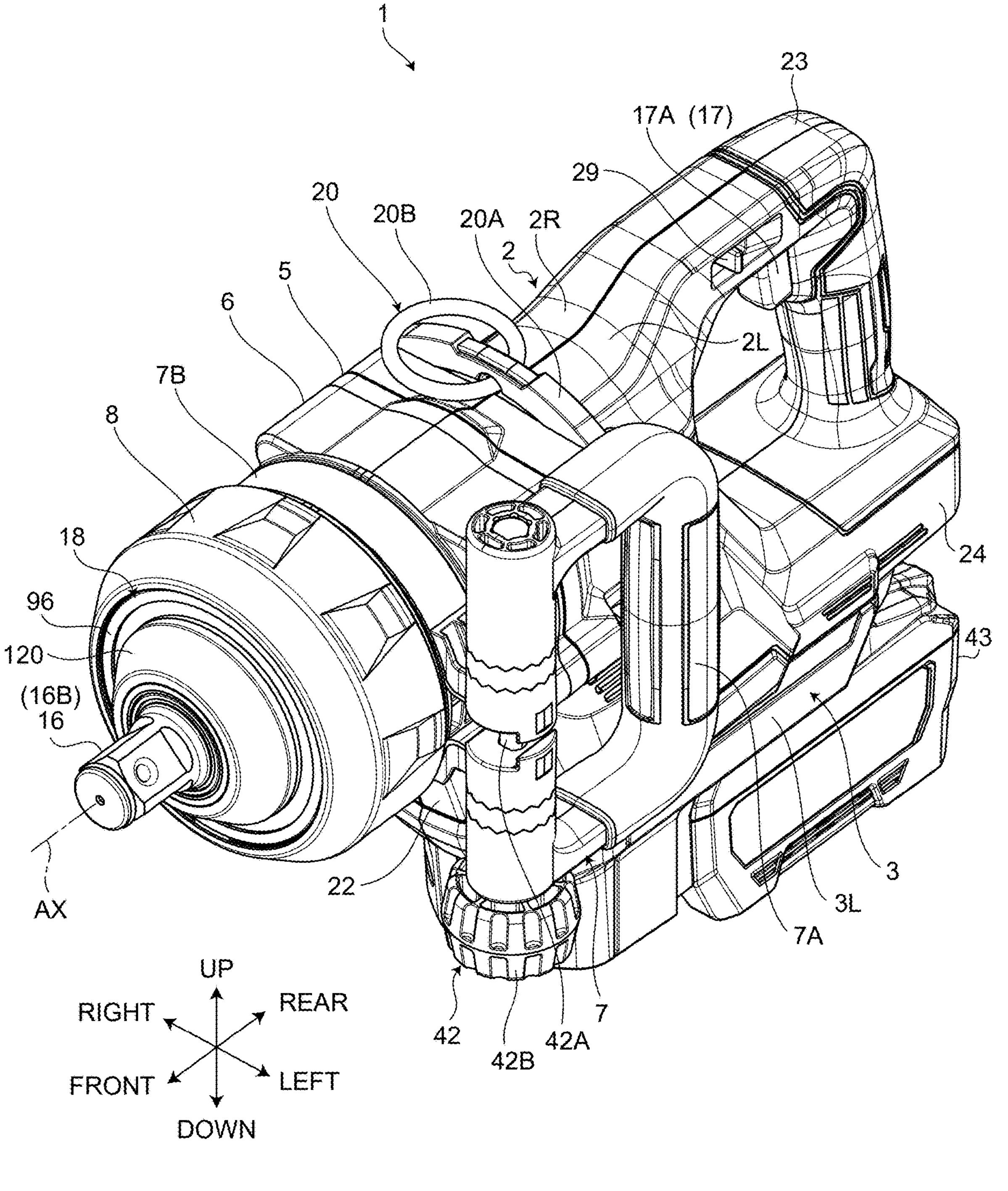
FIG. 1 is a front left-side perspective view illustrating an impact tool according to an embodiment.

In one or more embodiments, an impact tool includes: a motor; a speed reduction mechanism rotated by the motor; a hammer rotated by rotation of the motor transmitted via the speed reduction mechanism; an anvil to be impacted in a rotation direction by the hammer; a motor case accommodating the motor; and a gear case accommodating the speed reduction mechanism. One or both of the motor case and the gear case are made of a magnesium alloy.

In the above configuration, one or both of the motor case and the gear case are made of a magnesium alloy, making it possible to achieve both high strength and light weight in the impact tool. The strength of the magnesium alloy is higher than the strength of the synthetic resin. The specific gravity of the magnesium alloy is lower than the specific gravity of aluminum.

In one or more embodiments, the motor case includes a holder mechanism that holds a first lead wire passing through the outside of the motor case.

In the above configuration, the first lead wire is held by the holder mechanism, leading to improvement of the assemblability at the time of assembling the impact tool.

In one or more embodiments, the first lead wire is not connected to the motor.

In the above configuration, the first lead wire not connected to the motor is held by the holder mechanism. Power is supplied to an electronic device other than the motor via the first lead wire.

In one or more embodiments, the impact tool includes a controller. The first lead wire is connected to the controller.

In the above configuration, the first lead wire not connected to the controller is held by the holder mechanism.

In one or more embodiments, the controller is positioned rearward of the motor case. The first lead wire is connected to an electronic component disposed forward of the motor case.

In the above configuration, power is supplied, via the first lead wire, to the electronic component disposed forward of the motor case.

In one or more embodiments, the impact tool includes a light emitter unit including a light emitter that illuminates the front end side of the anvil. The electronic component includes an LED chip of the light emitter unit.

In the above configuration, power is supplied, via the first lead wire, to the LED chip disposed forward of the motor case. The LED chip emits light by the power supplied via the first lead wire.

In one or more embodiments, the impact tool includes a connector that is disposed forward of the motor case to energize the light emitter unit. The rear end of the first lead wire is connected to the controller. A front end of the first lead wire is connected to the connector. The holder mechanism holds an intermediate part of the first lead wire.

In the above configuration, the intermediate part of the first lead wire connecting the controller and the connector to each other is held by the holder mechanism.

In one or more embodiments, the holder mechanism includes: a base rib provided on the outer surface of the motor case to support the first lead wire from the lower side; and a hook rib disposed on the outer surface of the motor case on the upper side of the base rib to support the first lead wire from the side.

In the above configuration, the first lead wire is held by the base rib and the hook rib.

In one or more embodiments, the motor case includes: a tube portion disposed around the motor; a lower wall disposed at a lower end of the tube portion; and a protruding portion protruding laterally from an upper part of an outer circumferential surface of the tube portion. The base rib protrudes from the side surface of the tube portion on the lower side of the protruding portion. The hook rib protrudes downward from the lower surface of the protruding portion.

In the above configuration, the relative position between the base rib and the hook rib is optimized to be able to hold the first lead wire.

In one or more embodiments, the impact tool includes: a fan fixed to an upper part of a rotor shaft of the motor; and a baffle plate disposed at an upper end of the motor case to face the fan. The baffle plate includes: a base portion having an annular shape and inserted into an opening of an upper end of the tube portion; and a screw boss provided on a peripheral edge of the base portion. The protruding portion has an upper recess into which the screw boss is inserted in a state where the base portion is inserted into the opening at the upper end of the tube portion.

In the above configuration, the base portion is inserted into the opening of the upper end of the tube portion and the screw boss is inserted into the upper recess of the protruding portion, leading to a decrease in the amount of protrusion of the baffle plate upward from the motor case. This prevents enlargement of the impact tool.

In one or more embodiments, a screw inserted into the opening of the screw boss is joined to a screw hole provided in the upper recess.

In the above configuration, the motor case and the baffle plate are fixed with each other by a screw. The screw is disposed inside the upper recess, decreasing the amount of protrusion of the screw upward from the baffle plate. This prevents enlargement of the impact tool.

In one or more embodiments, the motor case includes: a tube portion disposed around the motor; and a lower wall disposed at the lower end of the tube portion. The impact tool includes an inner member made of a synthetic resin and disposed between the inner circumferential surface of the tube portion and the outer circumferential surface of a stator core of the motor.

In the above configuration, the contact between the magnesium alloy motor case and the iron stator core is blocked by the inner member made of a synthetic resin, making it possible to reduce wear of the motor case.

In one or more embodiments, the inner member includes: a base portion having an annular shape and disposed between the inner circumferential surface of the tube portion and the outer circumferential surface of the stator core of the motor; an outer protrusion protruding outward in the radial direction from the outer circumferential surface of the base portion; and an inner protrusion protruding inward in the radial direction from the inner circumferential surface of the base portion. The inner circumferential surface of the tube portion has an inner recess into which the outer protrusion is inserted. The outer circumferential surface of the stator core has a groove into which the inner protrusion is inserted.

In the above configuration, since the inner protrusion is inserted into the groove, it is possible to prevent a change in the relative position between the stator and the inner member in the rotation direction. With the outer protrusion inserted into the inner recess, it is possible to prevent a change in the relative position between the inner member and the motor case in the rotation direction.

In one or more embodiments, the impact tool includes: a controller disposed on a rear side of the motor case to control the motor; and a sensor substrate accommodated in the motor case to detect a position of a rotor of the motor in a rotation direction. The motor case includes: a tube portion disposed around the motor; and a lower wall disposed at the lower end of the tube portion. The stator of a motor includes: a stator core; and a power supply terminal disposed on a rear side of the stator core inside the motor case. The sensor substrate is disposed on the lower side of the stator core inside the motor case. A first opening is provided at a rear part of the tube portion. A second opening is provided in a rear part of the lower wall. A second lead wire connecting a power supply terminal and the controller to each other passes through the first opening. A third lead wire connecting the sensor substrate and the controller to each other passes through the second opening.

In the above configuration, with the second lead wire passing through the first opening provided in the rear part of the tube portion, it is possible to prevent a situation in which the second lead wire is excessively bent or an excessive tension acts on the second lead wire. With the third lead wire passing through the second opening provided at the rear part of the lower wall, it is possible to prevent a situation in which the third lead wire is excessively bent or an excessive tension acts on the third lead wire.

In one or more embodiments, the motor case includes a reinforcement rib provided at a boundary between the first opening and the second opening and integrated with the tube portion and the lower wall.

In the above configuration, with the reinforcement rib disposed at the boundary between the first opening and the second opening, it is possible to reduce deterioration of strength of the motor case.

In one or more embodiments, the impact tool includes a main body housing made of a synthetic resin and configured to accommodate the motor case. The anvil rotates about an output rotation axis extending in the front-rear direction. An overall length indicating a distance between the front end of the anvil and the rear end of the main body housing in the front-rear direction is 440 mm or less.

The above configuration can prevent enlargement of the impact tool, improving workability in work using the impact tool.

In one or more embodiments, the main body housing includes: a main body portion configured to accommodate the motor case; a grip portion disposed on a rear side of the main body portion; and a controller accommodating portion disposed on the lower side of the grip portion. The grip portion includes: a rear grip portion extending upward from a rear part of the controller accommodating portion; and an upper grip portion extending forward from an upper end of the rear grip portion. A front end of the upper grip portion is connected to an upper part of the main body portion. A space length indicating a maximum dimension in the front-rear direction of a space surrounded by the grip portion, the main body portion, and the controller accommodating portion is 90 mm or more.

With the above configuration, when gripping the grip portion, the operator can easily grip only the rear grip portion as well as easily grip a part of the rear grip portion and a part of the upper grip portion at the same time. In addition, this makes it easy to grip the grip portion because the finger and the main body portion are unlikely to interfere with each other. This makes it possible to apply various ways of gripping according to the working situation, leading to an improvement in operability.

In one or more embodiments, the upper end of the motor case and the lower end of the gear case are fixed with each other by screws.

In the above configuration, the motor case and the gear case disposed in an up-down direction are fixed with each other by the screw.

In one or more embodiments, the rotor of the motor rotates about a motor rotation axis extending in the up-down direction. The speed reduction mechanism includes: a first bevel gear configured to rotate about a motor rotation axis; and a second bevel gear configured to mesh with the first bevel gear and rotate about an output rotation axis extending in the front-rear direction.

In the above configuration, the motor rotation axis and the output rotation axis are orthogonal to each other, making it possible to shorten the overall length of the impact tool.

In one or more embodiments, the impact tool includes a hammer case disposed on a front side of the gear case to accommodate a hammer. Both the motor case and the gear case are made of a magnesium alloy, and the hammer case is made of aluminum.

In the above configuration, since both the motor case and the gear case are made of a magnesium alloy, it is possible to achieve high strength and light weight of both the motor case and the gear case. The hammer case is made of aluminum having a strength higher than that of the magnesium alloy. Therefore, even with a large impact applied to the hammer case when the hammer impacts the anvil, the hammer case can withstand the impact.

Hereinafter, embodiments according to the present disclosure will be described with reference to the drawings, although the present disclosure is not limited to the embodiments. The components of the embodiments described below can be appropriately combined. In addition, there may be cases where some components are omitted in use.

In the embodiment, the positional relationship of each component will be described using terms of "left", "right", "front", "rear", "up" (or "upper"), "down" (or "lower"). These terms indicate the relative position or direction with respect to the center of the impact tool 1. The left-right direction, the front-rear direction, and the up-down direction are orthogonal to each other.

The impact tool 1 includes: a motor 10; and an anvil 16 being an output portion of the impact tool 1. The rotation axis of the motor 10 is appropriately referred to as a motor rotation axis MX, and the rotation axis of the anvil 16 is appropriately referred to as an output rotation axis AX. The motor rotation axis MX extends in the up-down direction. The output rotation axis AX extends in the front-rear direction. The motor rotation axis MX and the output rotation axis AX are orthogonal to each other.

The direction parallel to the output rotation axis AX is appropriately referred to as an axial direction, the direction around the output rotation axis AX is appropriately referred to as a circumferential direction or a rotation direction, and a radiating direction of the output rotation axis AX is appropriately referred to as a radial direction. In the radial direction, a position close to or a direction approaching the output rotation axis AX is appropriately referred to as an inward, inside, or inner side in the radial direction, and a position far from or a direction away from the output rotation axis AX is appropriately referred to as an outward, outside, or outer side in the radial direction.

Impact Tool

Figure 2:
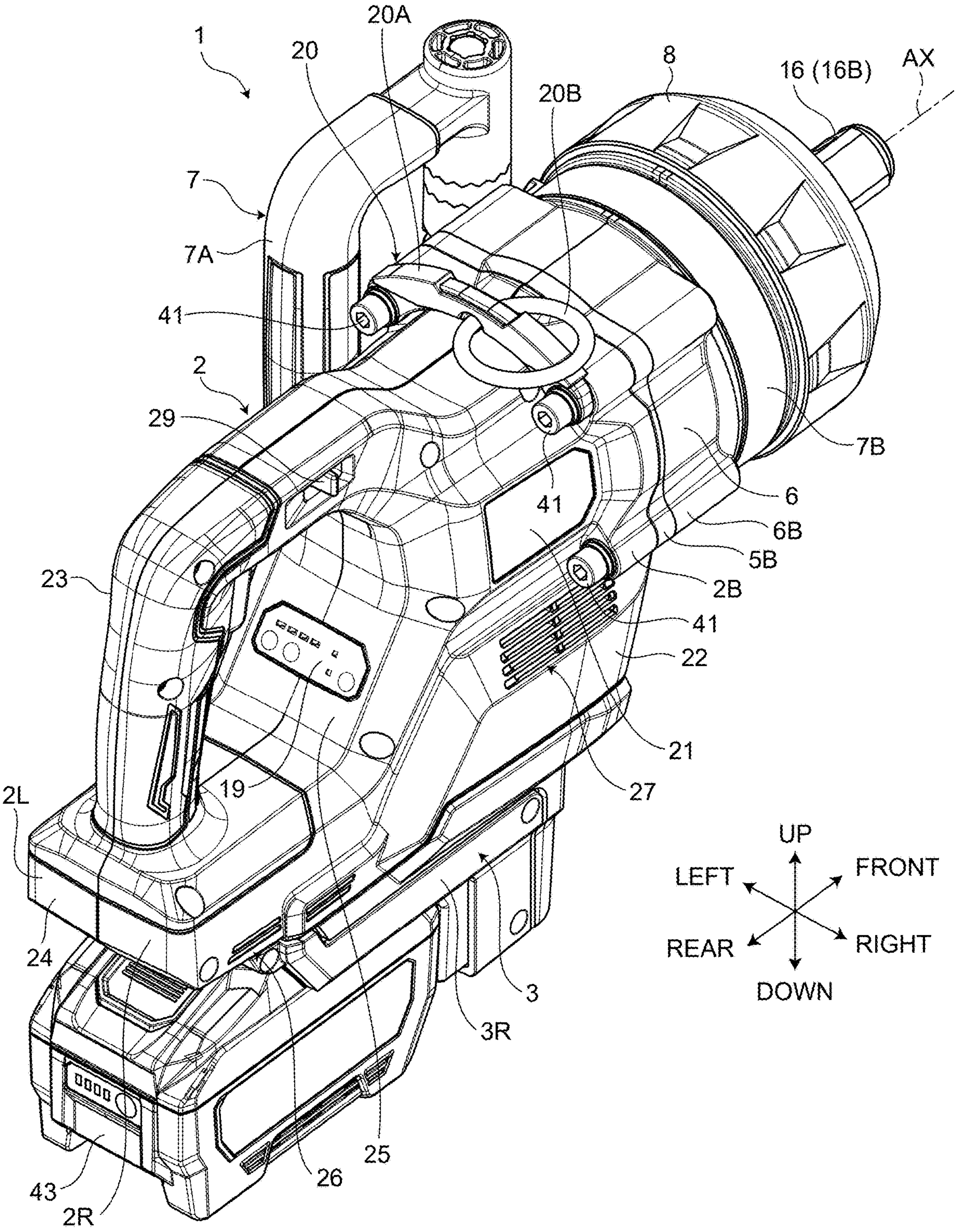
FIG. 2 is a rear right-side perspective view illustrating the impact tool according to the embodiment.
Figure 3:
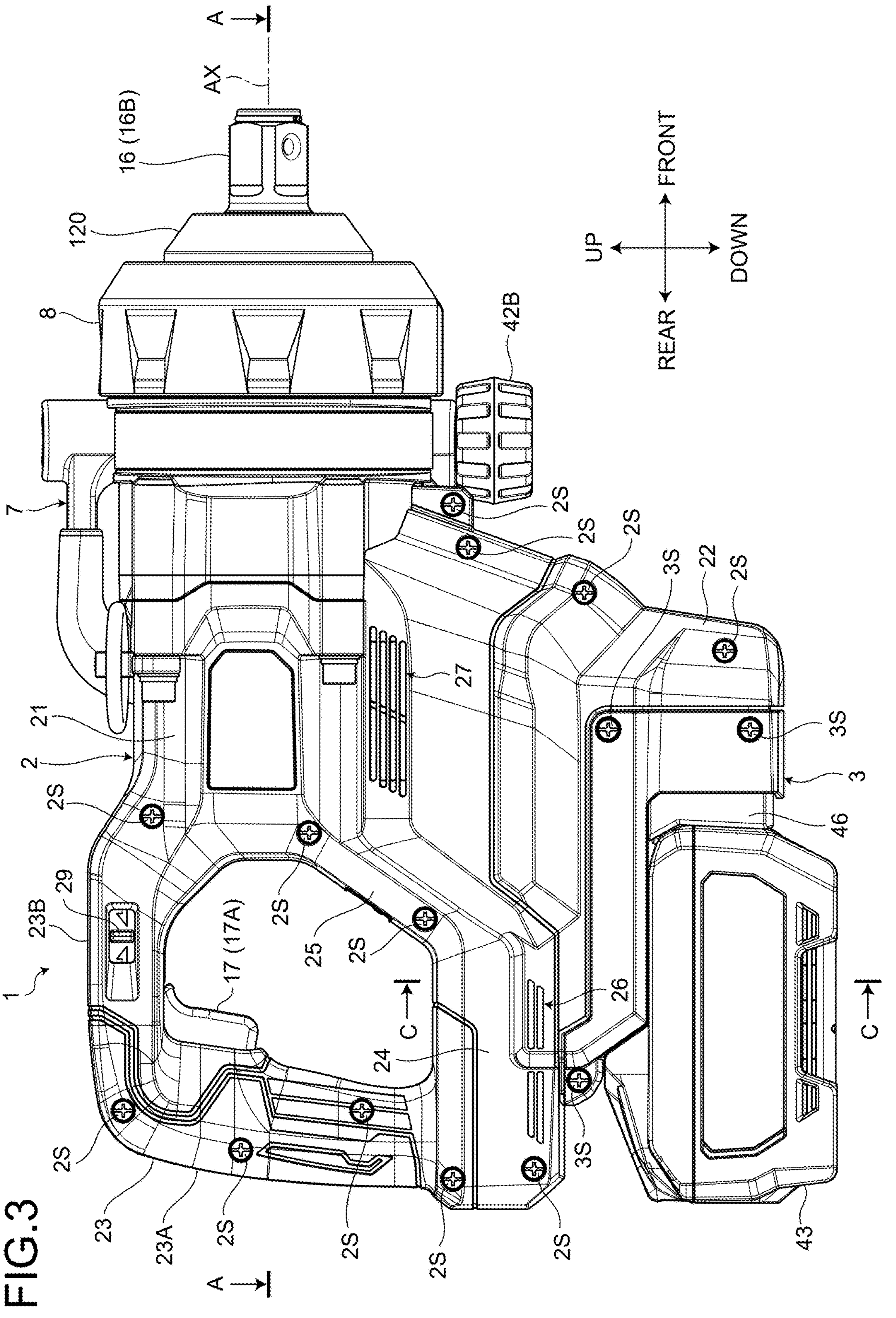
FIG. 3 is a right side view of the impact tool according to the embodiment.
Figure 4:
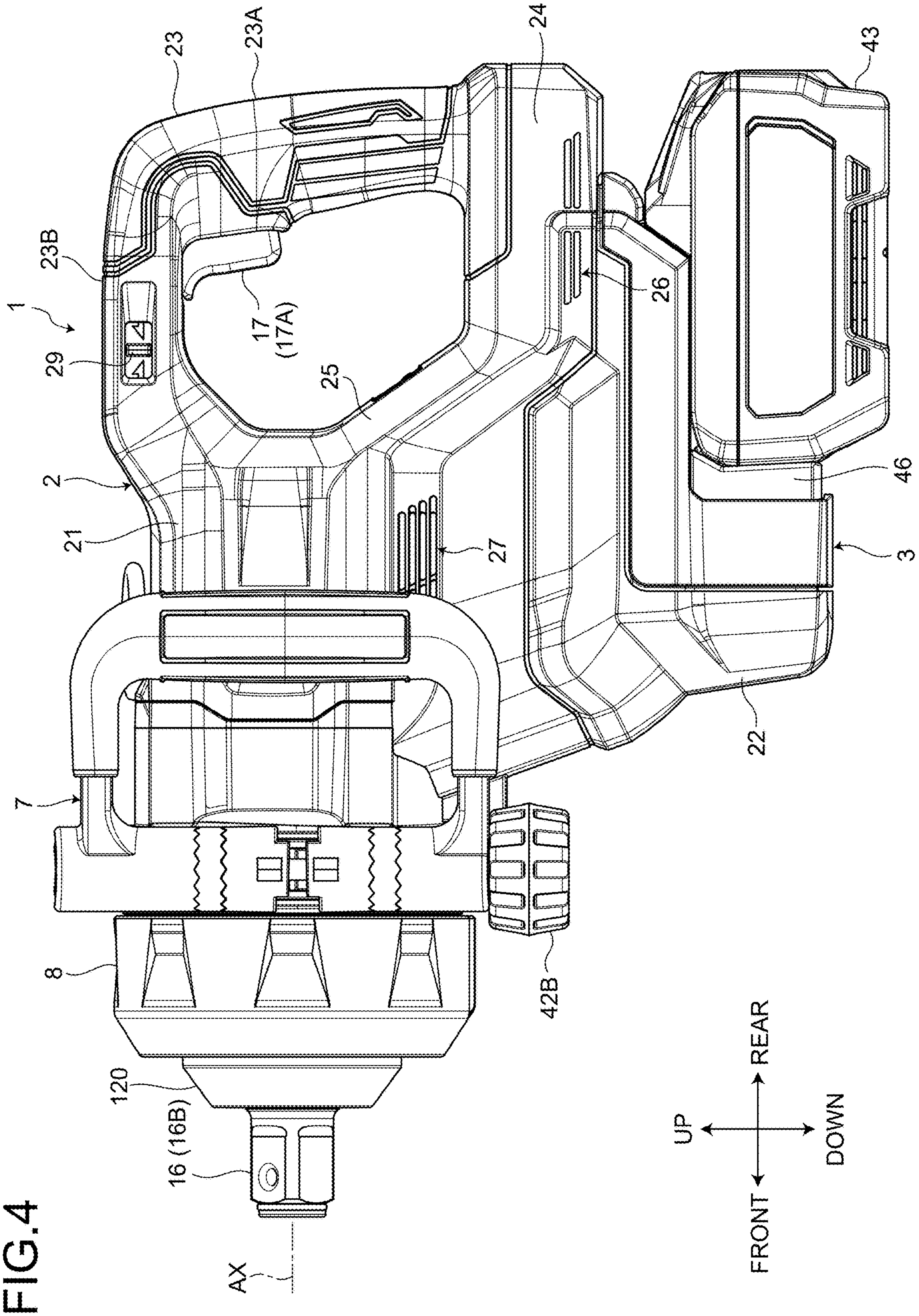
FIG. 4 is a left side view of the impact tool according to the embodiment.
Figure 5:
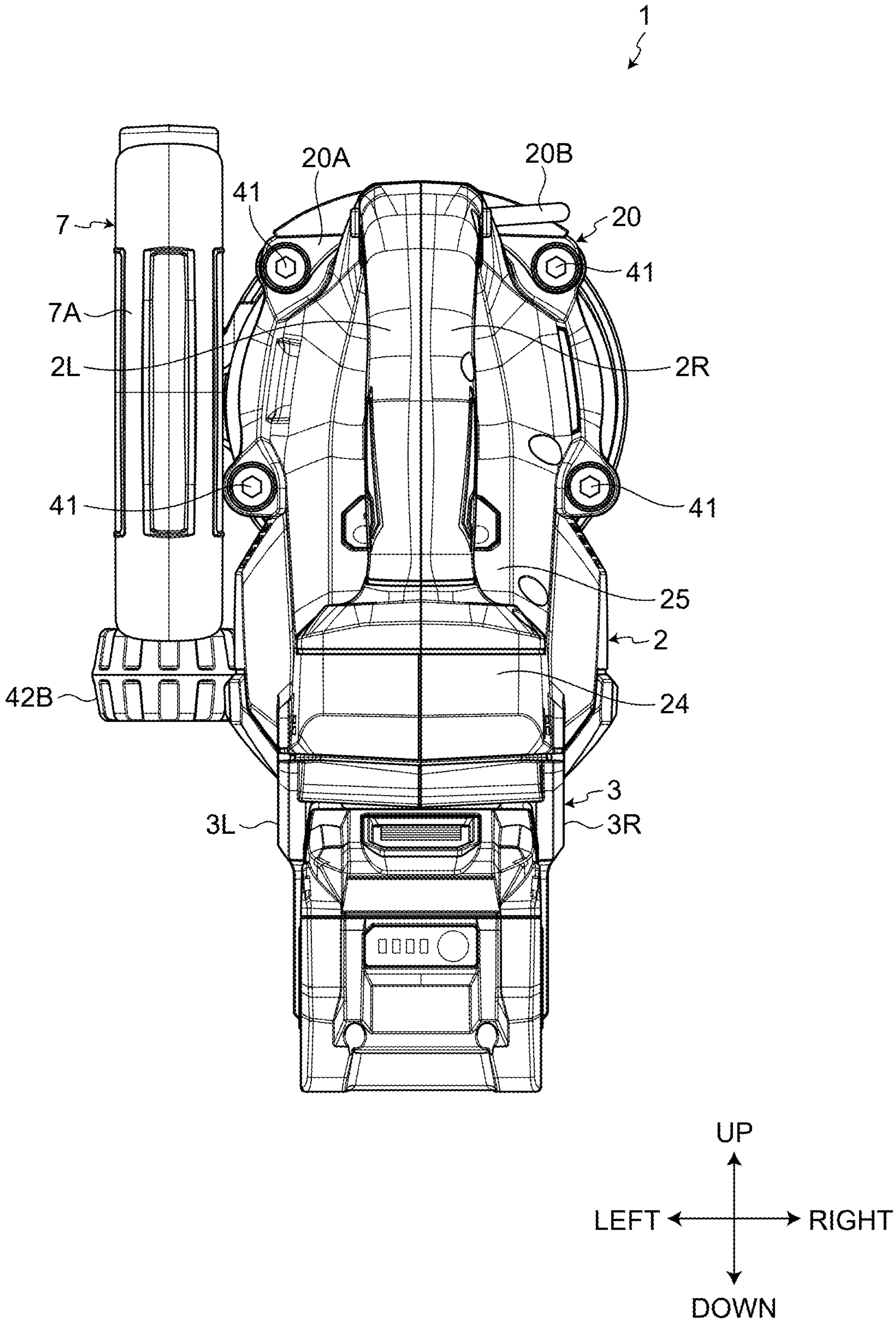
FIG. 5 is a rear view of the impact tool according to the embodiment.
Figure 6:
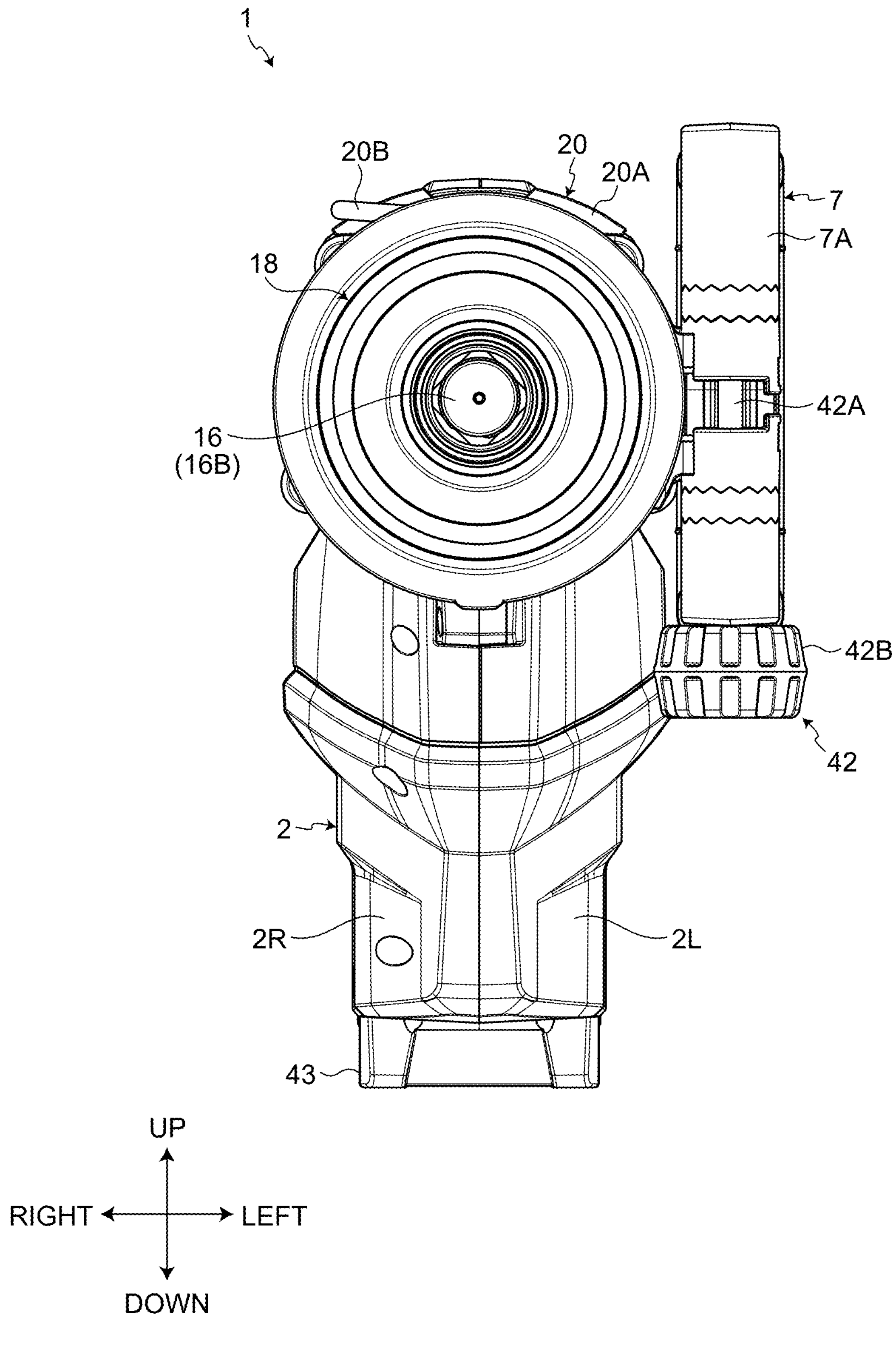
FIG. 6 is a front view of the impact tool according to the embodiment.
Figure 7:
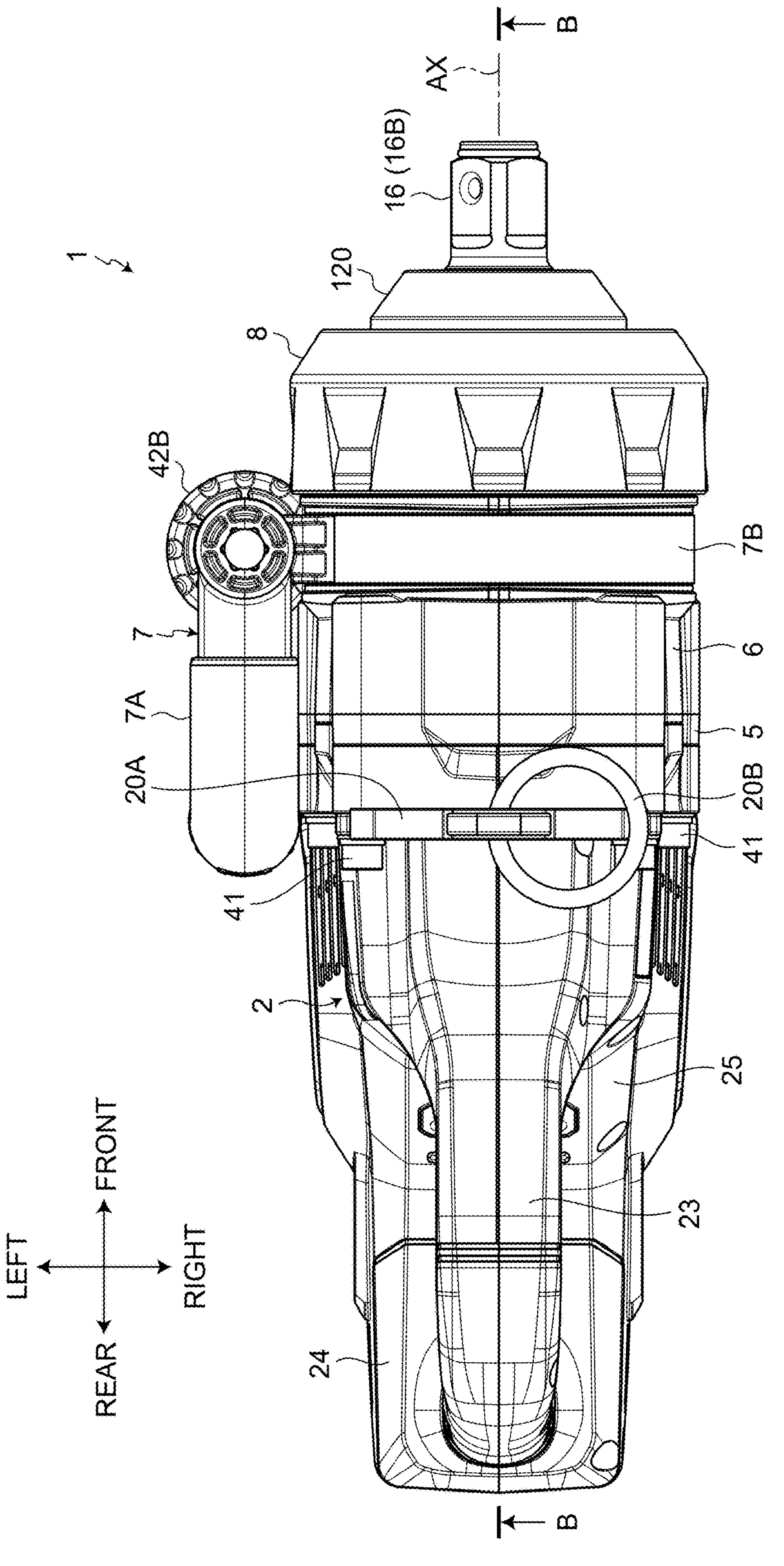
FIG. 7 is an upper view of the impact tool according to the embodiment.
Figure 8:
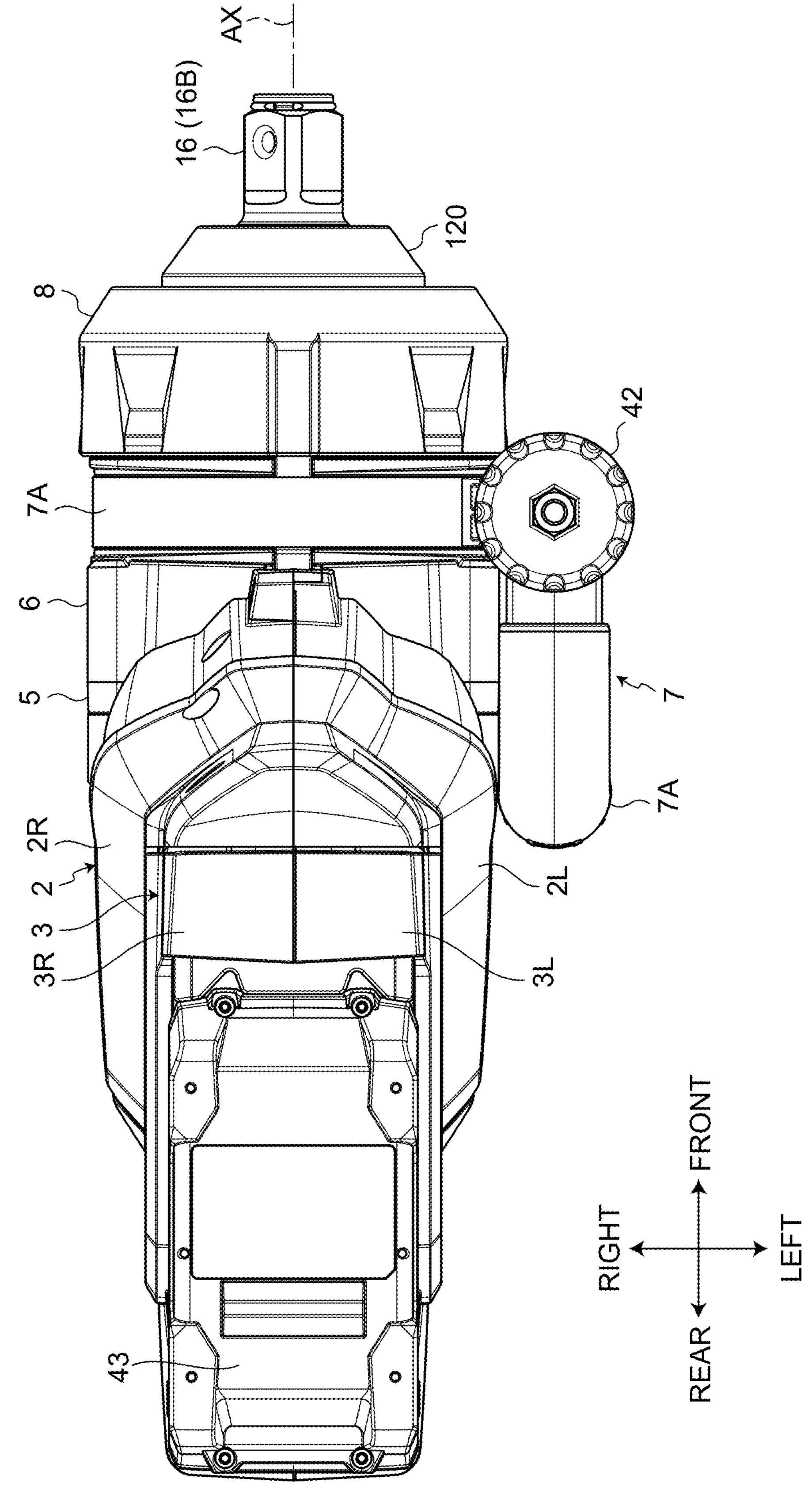
FIG. 8 is a lower view of the impact tool according to the embodiment.
Figure 9:
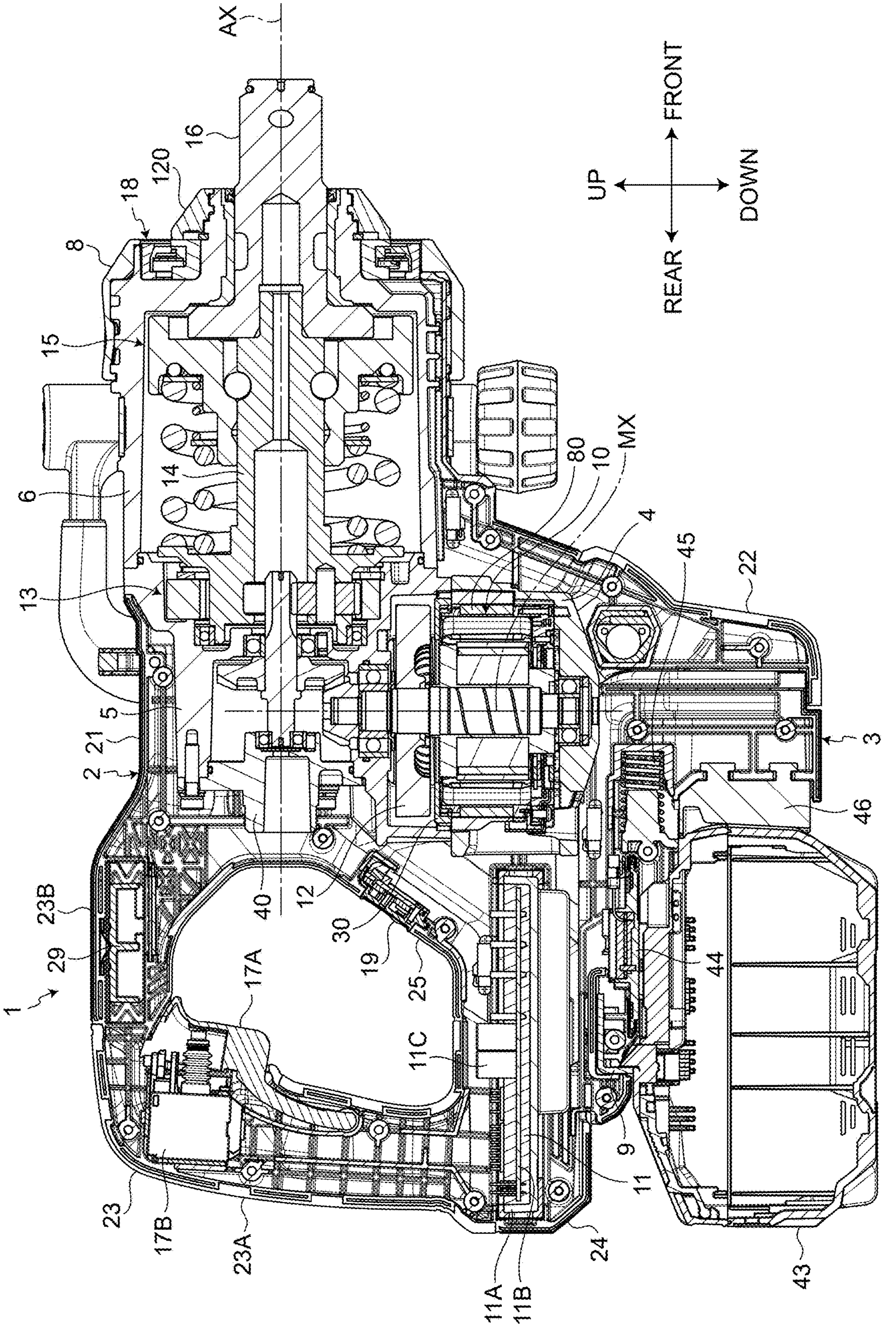
FIG. 9 is a cross-sectional view illustrating the impact tool according to the embodiment.
Figure 10:
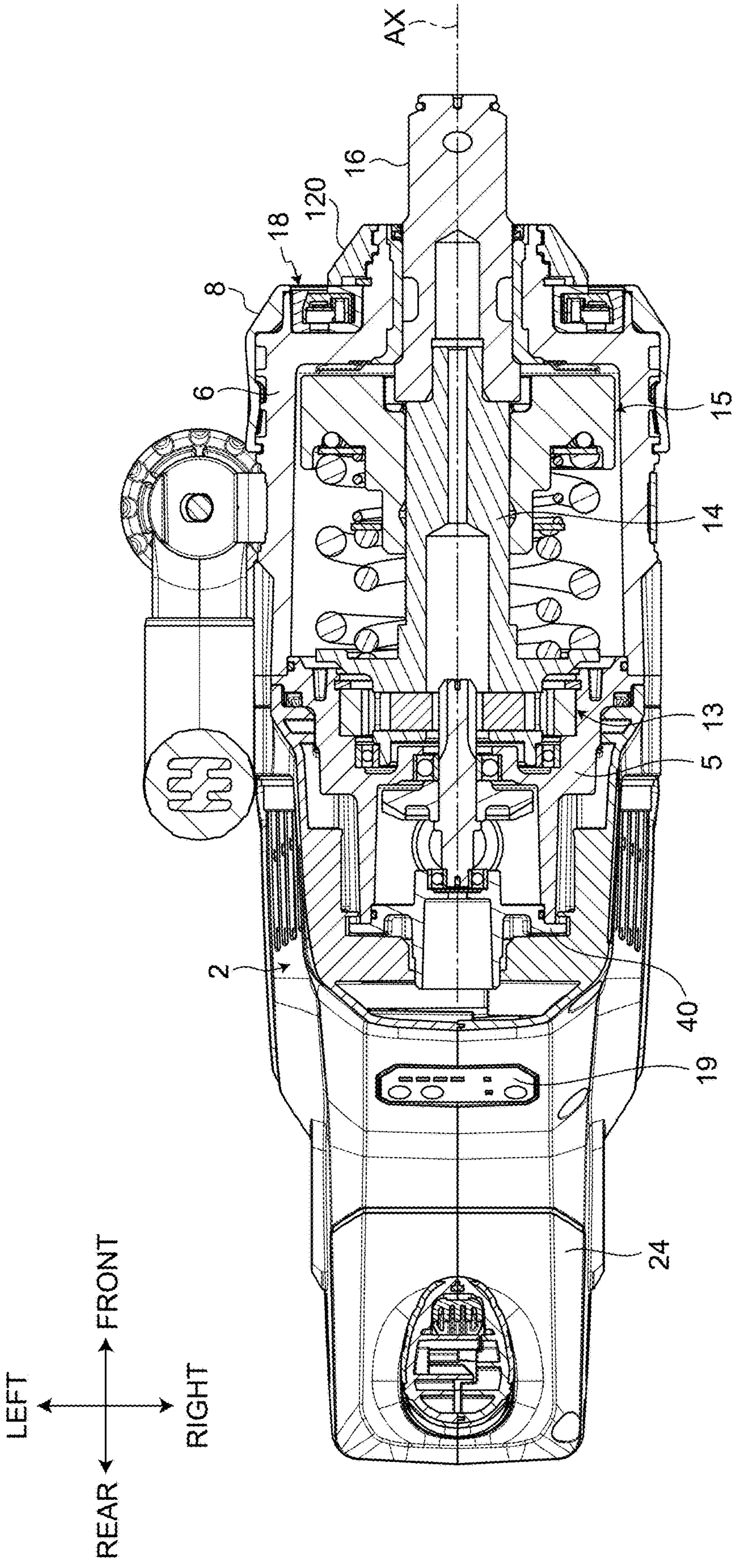
FIG. 10 is a cross-sectional view illustrating the impact tool according to the embodiment.
Figure 11:
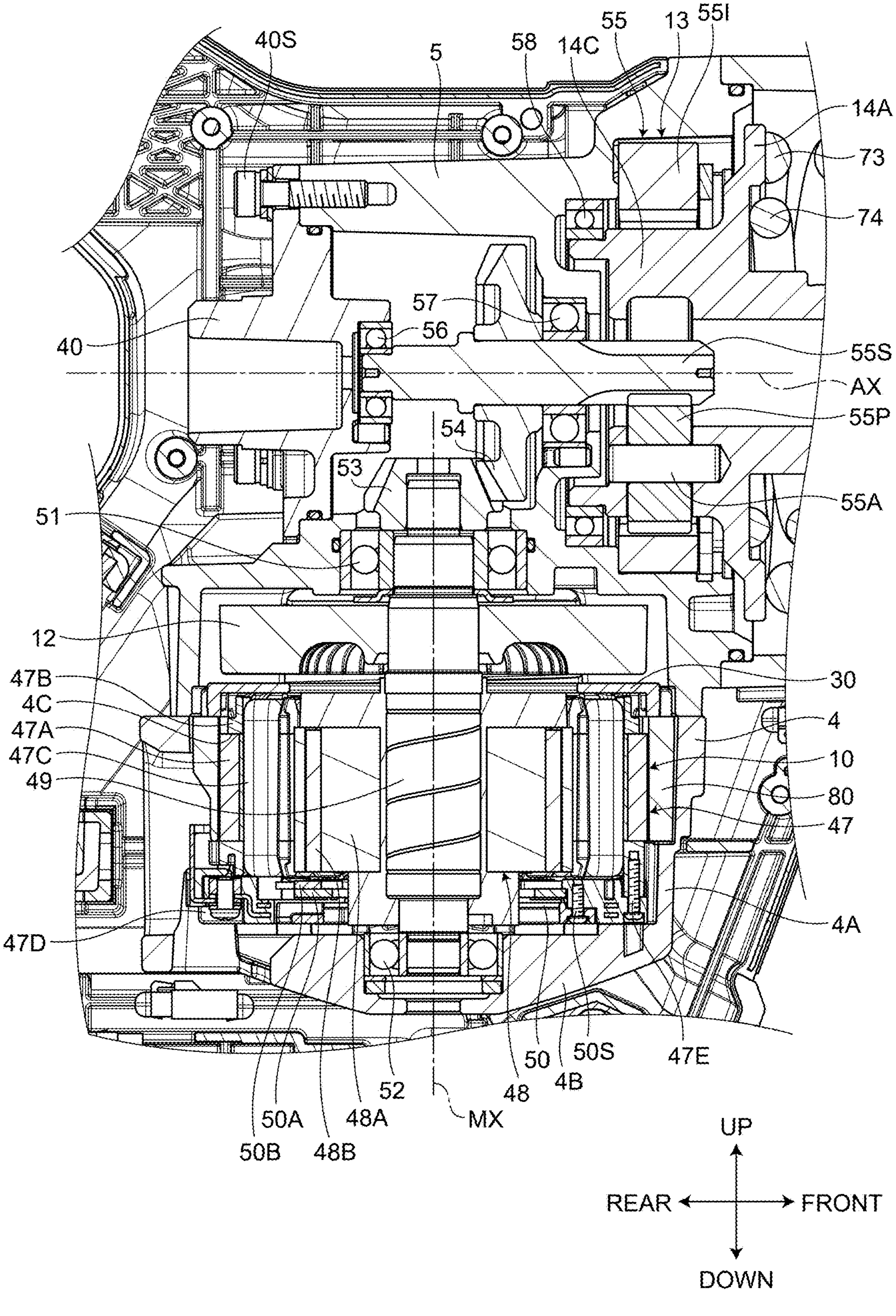
FIG. 11 is a cross-sectional view illustrating a part of the impact tool according to the embodiment.
Figure 12:
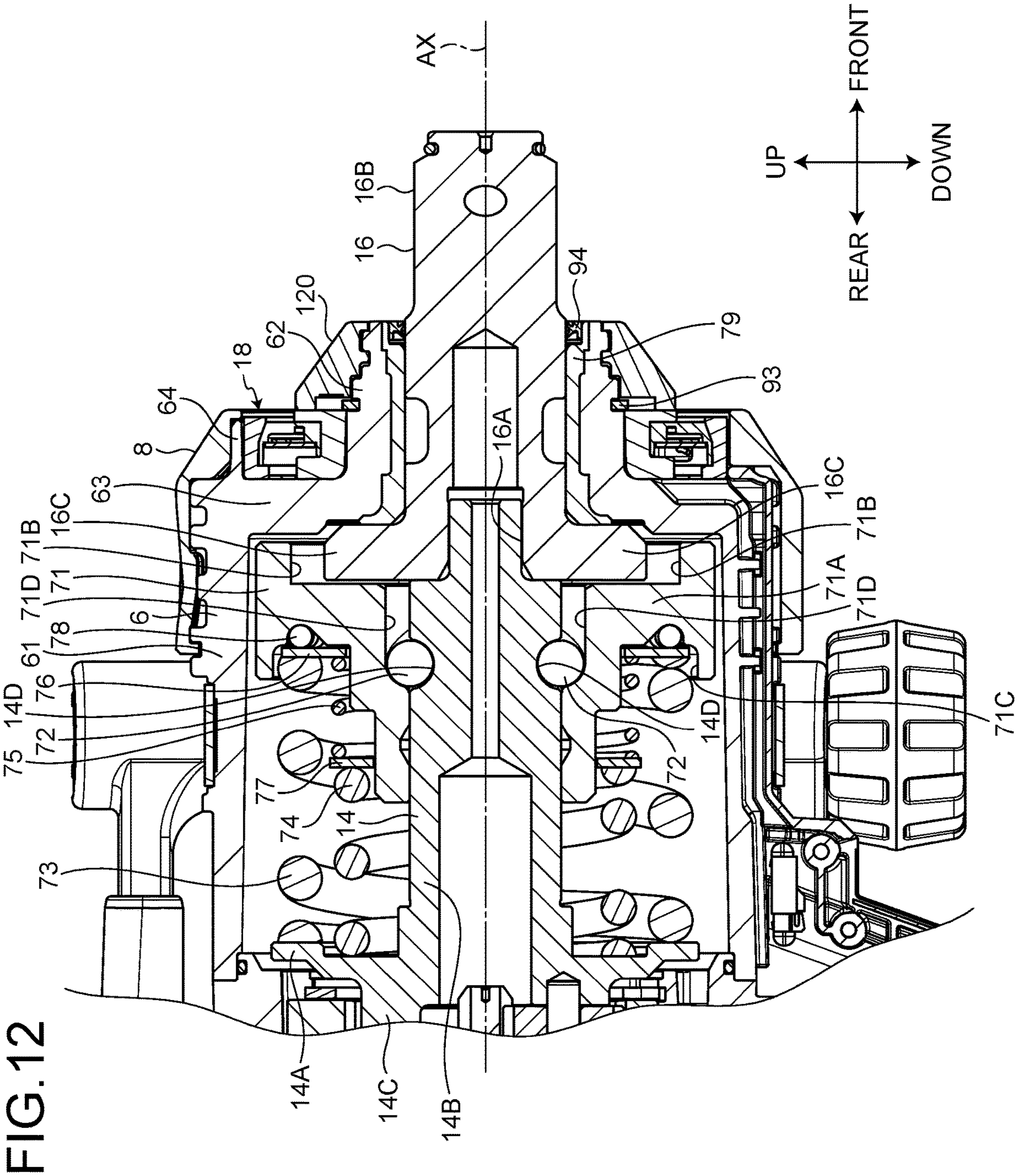
FIG. 12 is a cross-sectional view illustrating a part of the impact tool according to the embodiment.
Figure 13:
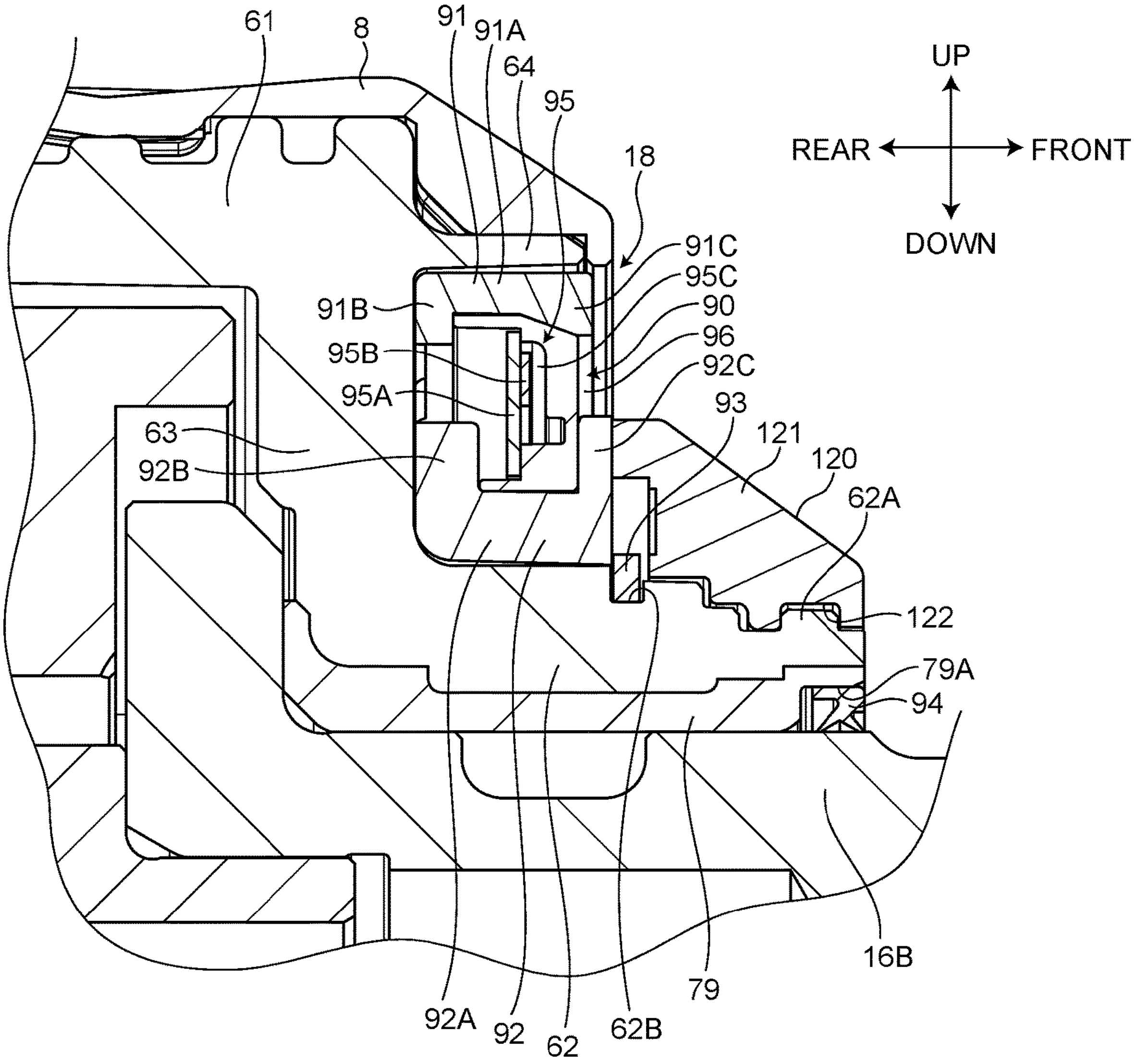
FIG. 13 is a cross-sectional view illustrating a part of the impact tool according to the embodiment.

FIG. 1 is a front left-side perspective view illustrating the impact tool 1 according to the embodiment. FIG. 2 is a rear right-side perspective view illustrating the impact tool 1 according to the embodiment. FIG. 3 is a right side view of the impact tool 1 according to the embodiment. FIG. 4 is a left side view of the impact tool 1 according to the embodiment. FIG. 5 is a rear view of the impact tool 1 according to the embodiment. FIG. 6 is a front view of the impact tool 1 according to the embodiment. FIG. 7 is an upper view of the impact tool 1 according to the embodiment. FIG. 8 is a lower view of the impact tool 1 according to the embodiment. FIG. 9 is a cross-sectional view illustrating the impact tool 1 according to the embodiment and corresponds to a cross-sectional arrow view taken along line B-B in FIG. 7. FIG. 10 is a cross-sectional view illustrating the impact tool 1 according to the embodiment and corresponds to a cross-sectional arrow view taken along line A-A in FIG. 3. FIG. 11 is a cross-sectional view illustrating a part of the impact tool 1 according to the embodiment, and corresponds to an enlarged partial view of FIG. 9. FIG. 12 is a cross-sectional view illustrating a part of the impact tool 1 according to the embodiment, and corresponds to an enlarged partial view of FIG. 9. FIG. 13 is a cross-sectional view illustrating a part of the impact tool 1 according to the embodiment, and corresponds to an enlarged partial view of FIG. 12.

The impact tool 1 is a type of power tool using the motor 10 being an electric motor, as a drive source. In the embodiment, the impact tool 1 is an impact wrench which is a type of tightening tool. The impact tool 1 includes a main body housing 2, a battery housing 3, a motor case 4, a gear case 5, a hammer case 6, a side handle 7, a rear bumper 8, a front bumper 120, a battery holder 9, a motor 10, a controller 11, a fan 12, a speed reduction mechanism 13, a spindle 14, an impacting mechanism 15, an anvil 16, a trigger switch 17, a forward/reverse switching lever 29, a light assembly 18, an interface panel 19, and a hook assembly 20.

The main body housing 2 accommodates the motor case 4. The main body housing 2 accommodates a part of the gear case 5. The main body housing 2 is connected to the battery housing 3. The main body housing 2 is fixed to the hammer case 6.

The main body housing 2 is made of synthetic resin. An example of the synthetic resin forming the main body housing 2 is a nylon resin. The main body housing 2 includes a left main body housing 2L and a right main body housing 2R. The right main body housing 2R is disposed on the right side of the left main body housing 2L. The left main body housing 2L and the right main body housing 2R constitute a pair of half split housings. The left main body housing 2L and the right main body housing 2R are fixed by a plurality of screws 2S.

The main body housing 2 includes a main body portion 21, a protruding portion 22, a grip portion 23, a controller accommodating portion 24, and a panel holding portion 25.

The main body portion 21 accommodates the motor case 4. The main body portion 21 accommodates a part of the gear case 5.

The protruding portion 22 protrudes downward from the main body portion 21. The protruding portion 22 is disposed on the front side of the battery housing 3.

The grip portion 23 is gripped by an operator. The grip portion 23 is disposed on the rear side of the main body portion 21. The grip portion 23 includes; a rear grip portion 23A extending upward from the rear part of the controller accommodating portion 24; and an upper grip portion 23B extending forward from the upper end of the rear grip portion 23A. The lower end of the rear grip portion 23A is connected to the controller accommodating portion 24. An upper end of the rear grip portion 23A is connected to a rear end of the upper grip portion 23B. A front end of the upper grip portion 23B is connected to an upper part of the main body portion 21. The grip portion 23, the main body portion 21, and the controller accommodating portion 24 form a D-shaped handle. The D-shaped handle is disposed on the rear side of the motor 10. Trigger switch 17 is disposed on an upper part the rear grip portion 23A.

The controller accommodating portion 24 accommodates the controller 11. The controller accommodating portion 24 is disposed on the lower side of the rear grip portion 23A. The controller accommodating portion 24 is disposed on the rear side of the main body portion 21 and the panel holding portion 25.

The panel holding portion 25 holds the interface panel 19. The panel holding portion 25 is disposed so as to extend upward from the front part of the controller accommodating portion 24 toward the front side. The panel holding portion 25 is disposed on the rear side of the main body portion 21.

The battery housing 3 supports the battery holder 9. The battery housing 3 is coupled to the main body housing 2 so as to be relatively movable with respect to the main body housing 2. The battery housing 3 is made of synthetic resin. An example of the synthetic resin forming the battery housing 3 is a nylon resin.

The battery housing 3 is disposed on the lower side of the controller accommodating portion 24. The battery housing 3 is disposed on the rear side of the protruding portion 22. The battery housing 3 is connected to the D-shaped handle.

The battery housing 3 includes a left battery housing 3L and a right battery housing 3R. The right battery housing 3R is disposed on the right side of the left battery housing 3L. The left battery housing 3L and the right battery housing 3R constitute a pair of half split housings. The left battery housing 3L and the right battery housing 3R are fixed by a plurality of screws 3S. The battery holder 9 is sandwiched between the left battery housing 3L and the right battery housing 3R.

The motor case 4 accommodates the motor 10. The motor case 4 is disposed on the lower side of the gear case 5. The motor case 4 is fixed to the gear case 5.

The motor case 4 is made of a magnesium alloy. An example of the magnesium alloy forming the motor case 4 is MDC1D being a Mg—Al—Zn-based magnesium alloy. The motor case 4 is manufactured with a die casting method.

The motor case 4 includes: a tube portion 4A disposed around the motor 10; and a lower wall 4B disposed at a lower end of the tube portion 4A.

The gear case 5 accommodates at least a part of the speed reduction mechanism 13. The gear case 5 is disposed on the rear side of the hammer case 6. The hammer case 6 is disposed on the front side of the gear case 5. The gear case 5 is fixed to the hammer case 6.

The gear case 5 is made of a magnesium alloy. An example of the magnesium alloy forming the gear case 5 is MDC1D being a Mg—Al—Zn-based magnesium alloy. The gear case 5 is manufactured with a die casting method.

Figure 29:
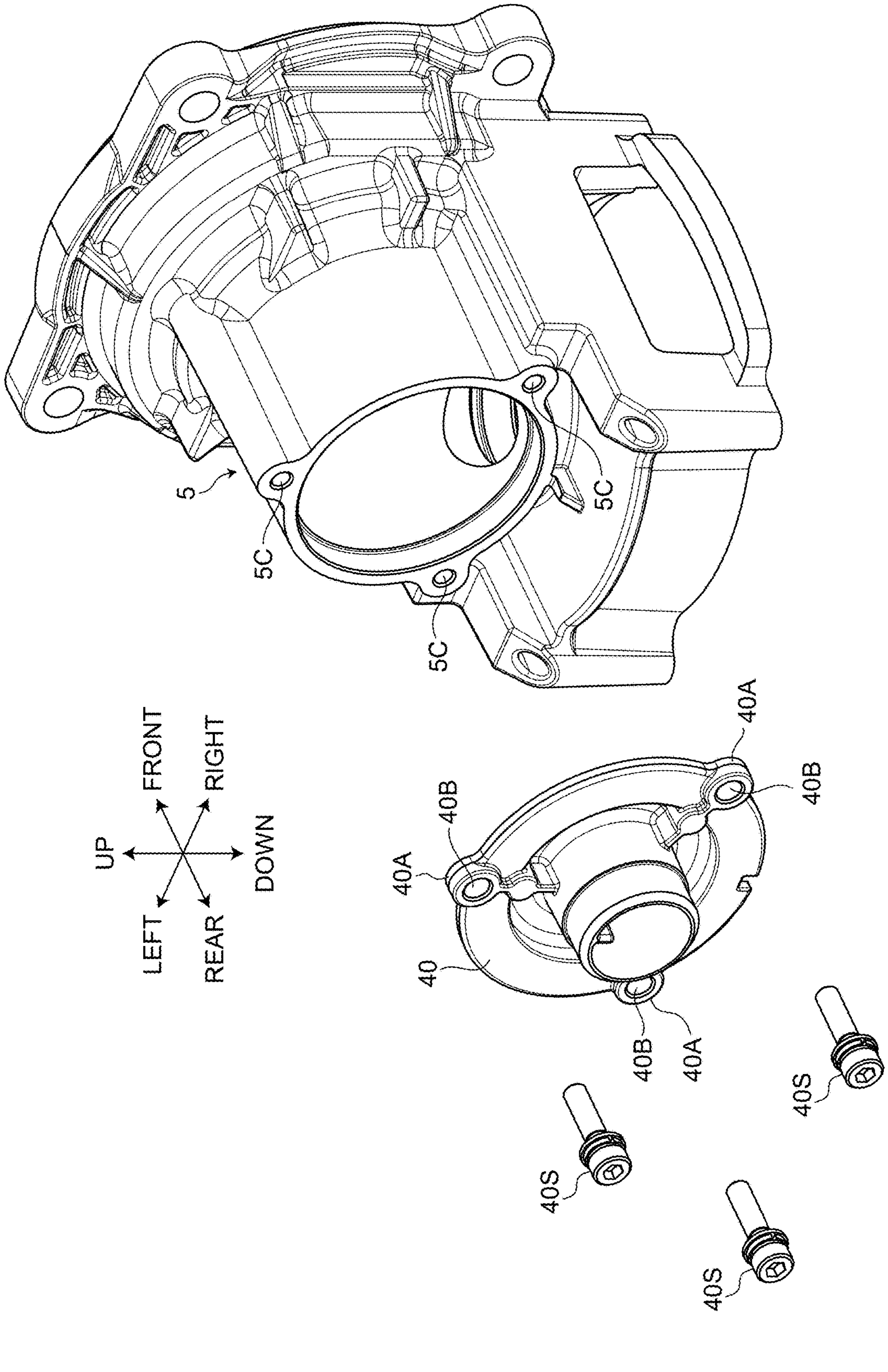
FIG. 29 is a rear right-side exploded perspective view illustrating a gear case and a bearing cover according to the embodiment.

The gear case 5 has a substantially tubular shape. An opening is provided in a front part of the gear case 5. An opening is provided in the rear part of the gear case 5. An opening is provided in a lower part of the gear case 5. A bearing cover 40 is disposed in the opening in the rear part of the gear case 5. As illustrated in diagrams such as FIGS. 11 and 29, the bearing cover 40 is fixed to the rear part of the gear case 5 with screws 40S. As illustrated in FIG. 29, screw bosses 40A are provided on a peripheral edge of the bearing cover 40. The screws 40S are inserted into openings provided in the screw bosses 40A, respectively. The screws 40S are inserted into screw holes 5C provided at the rear end of the gear case 5. The screws 40S are inserted into openings 40B of the screw bosses 40A from the rear side of the screw bosses 40A, and then inserted into the screw holes 5C of the gear case 5, respectively.

The hammer case 6 accommodates the impacting mechanism 15 including a hammer 71. The hammer case 6 is connected to the front part of the main body housing 2. The hammer case 6 is connected to a front part of the gear case 5.

The hammer case 6 is made of aluminum.

The hammer case 6 has a substantially tubular shape. As illustrated in FIGS. 12 and 13, the hammer case 6 includes a first tube portion 61, a second tube portion 62, a front wall 63, and an annular rib portion 64. The first tube portion 61 is disposed around the impacting mechanism 15 including the hammer 71. The second tube portion 62 is disposed on the front side of the first tube portion 61. The outer diameter of the second tube portion 62 is smaller than the outer diameter of the first tube portion 61. The front end of the gear case 5 is inserted into an opening provided at the rear end of the first tube portion 61. The front wall 63 connects the front end of the first tube portion 61 and the rear end of the second tube portion 62 to each other. The annular rib portion 64 protrudes forward from the outer edge of the front surface of the front wall 63. The annular rib portion 64 has a substantially annular shape in a plane orthogonal to the output rotation axis AX.

As illustrated in FIGS. 2, 5, 21, and 22, the main body housing 2, the gear case 5, and the hammer case 6 are fixed by a plurality of screws 41. The main body housing 2 has a plurality of screw bosses 2B. The gear case 5 has a plurality of screw bosses 5B. The hammer case 6 has a plurality of screw bosses 6B. The screws 41 are inserted into openings provided in the screw bosses 2B of the main body housing 2 and openings provided in the screw bosses 5B of the gear case 5. The screws 41 are inserted into screw holes provided in the screw bosses 6B of the hammer case 6. The screws 41 are inserted into the openings of the screw bosses 2B and the openings of the screw bosses 5B from the rear side of the screw bosses 2B, and then inserted into the screw holes of the screw bosses 6B.

Figure 21:
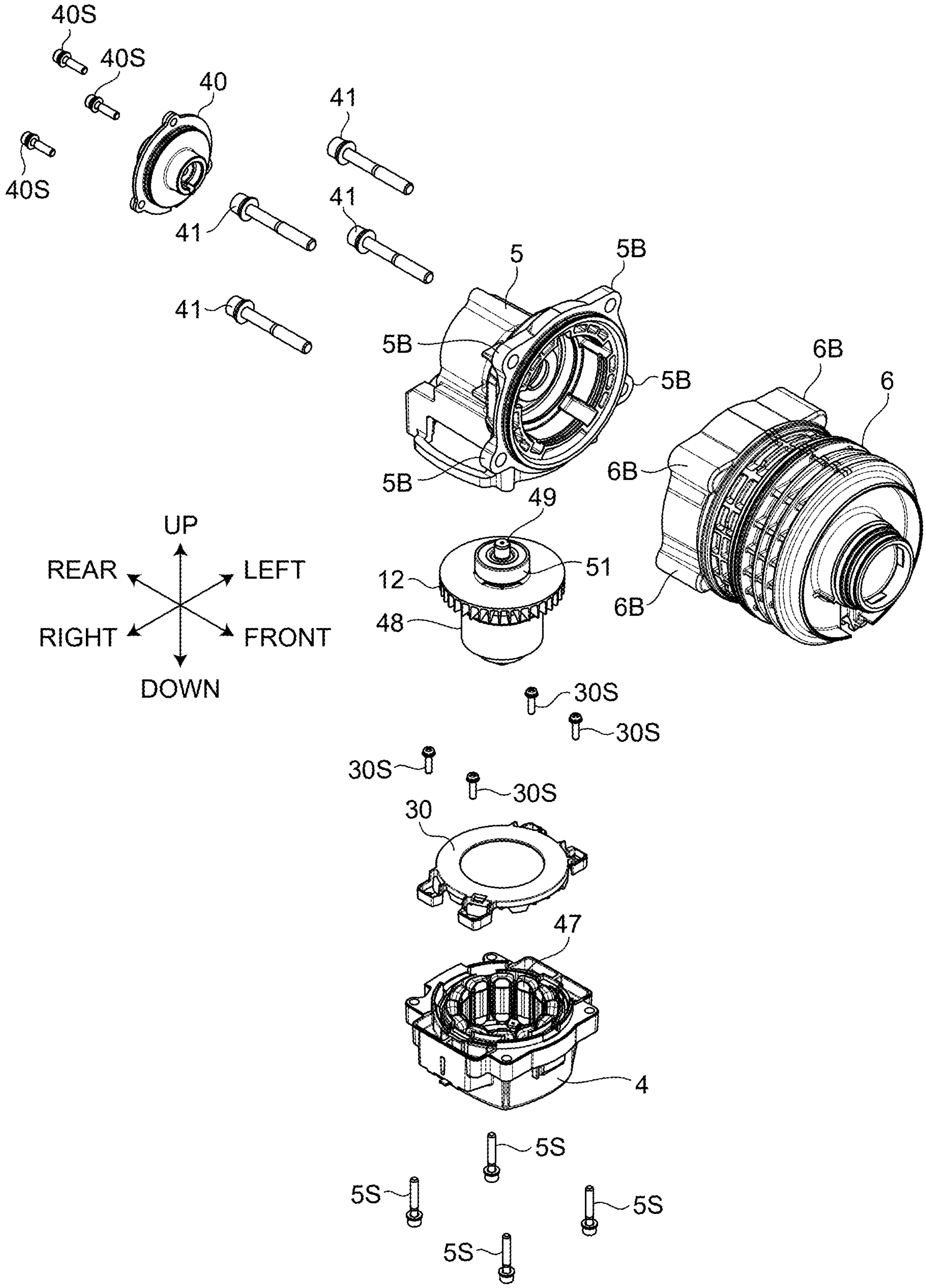
FIG. 21 is a front right-side exploded perspective view illustrating a part of the impact tool according to the embodiment.
Figure 22:
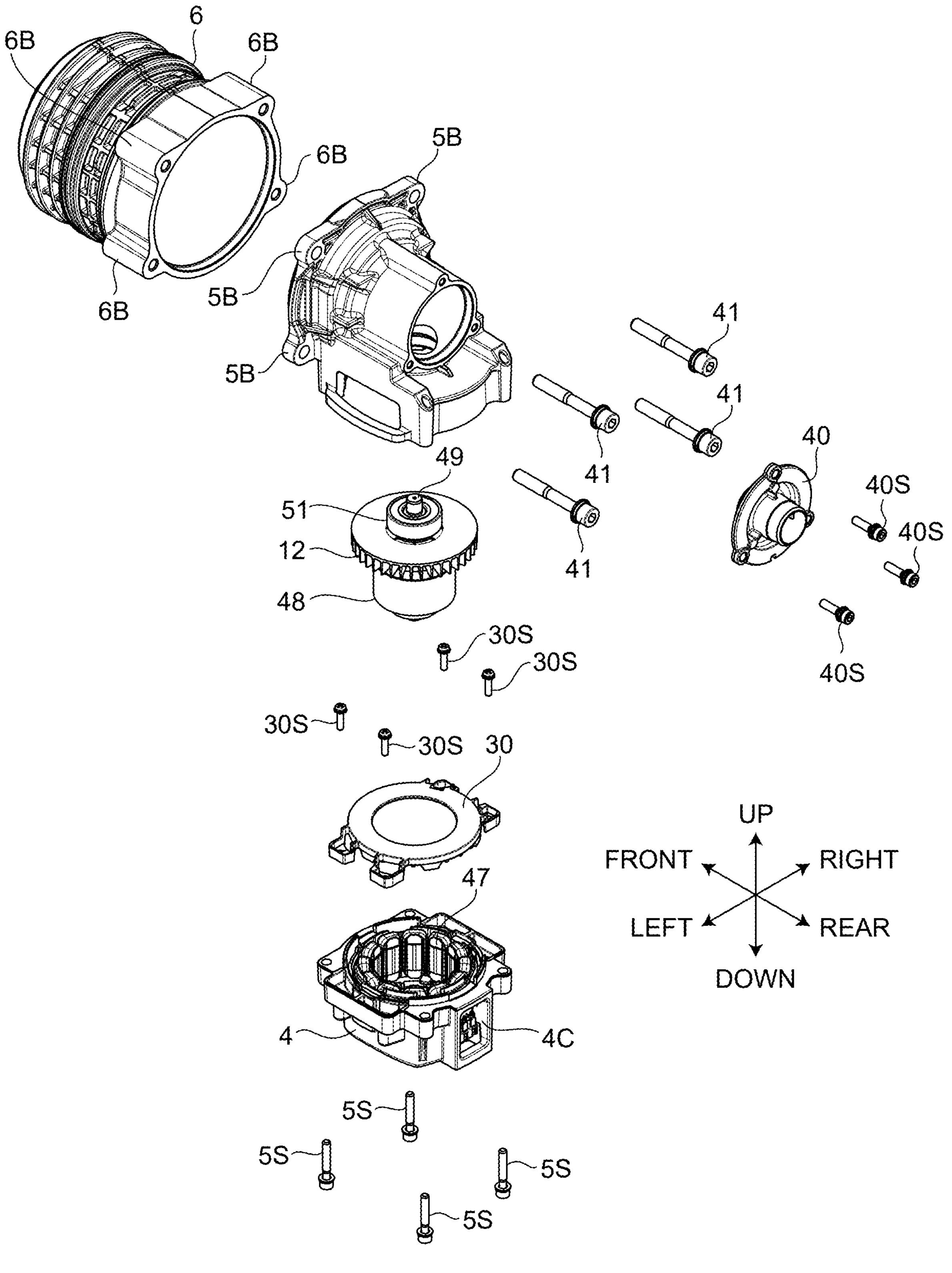
FIG. 22 is a rear left-side exploded perspective view illustrating a part of the impact tool according to the embodiment.

An opening is provided at an upper part of the motor case 4. An opening is provided in a lower part of the gear case 5. The internal space of the motor case 4 and the internal space of the gear case 5 are connected to each other via the opening at the upper part of the motor case 4 and the opening at the lower part of the gear case 5. As illustrated in FIGS. 21 and 22, the motor case 4 and the gear case 5 are fixed by a plurality of screws 5S.

An opening is provided in a front part of the gear case 5. An opening is provided in the rear part of the hammer case 6. The internal space of the gear case 5 and the internal space of the hammer case 6 are connected to each other via the opening at the front part of the gear case and the opening at the rear part of the hammer case 6.

The side handle 7 is gripped by an operator. The side handle 7 includes a handle portion 7A gripped by an operator and a base portion 7B fixed to the hammer case 6. The handle portion 7A is disposed on the left side of the hammer case 6. The base portion 7B is disposed so as to surround the first tube portion 61 of the hammer case 6. The base portion 7B has a substantially annular shape (arc shape). The left end of the base portion 7B is cut out.

The left end of the base portion 7B is coupled to the handle portion 7A via the tightening mechanism 42. The tightening mechanism 42 includes: a screw 42A disposed in a screw hole provided at the left end of the base portion 7B; and a dial 42B rotatable with respect to the screw 42A. The operator can rotate the screw 42A by operating the dial 42B. The rotation of the dial 42B tightens the hammer case 6 to the base portion 7B, so as to fix the side handle 7 to the hammer case 6.

Although the handle portion 7A is disposed on the left side of the hammer case 6 in the embodiment, the handle portion 7A can be disposed at any position around the hammer case 6. For example, the handle portion 7A can be disposed on the left side of the hammer case 6, can be disposed on the upper side of the hammer case 6, and can be disposed on the lower side of the hammer case 6. The position (angle) of the handle portion 7A with respect to the hammer case 6 can be adjusted in a range of 360 degrees.

The rear bumper 8 is disposed so as to cover at least a part of the surface of the hammer case 6. As illustrated in FIGS. 12 and 13, the rear bumper 8 is disposed so as to cover the outer circumferential surface of the first tube portion 61, the outer circumferential surface of the annular rib portion 64, and the front end surface of the annular rib portion 64. The rear bumper 8 protects the hammer case 6. The rear bumper 8 prevents contact between the hammer case 6 and an object around the impact tool 1. The rear bumper 8 is made of rubber.

The front bumper 120 is disposed so as to cover at least a part of the surface of the hammer case 6. As illustrated in FIGS. 12 and 13, the front bumper 120 is disposed so as to cover the outer circumferential surface of the second tube portion 62. The front bumper 120 protects the hammer case 6. The front bumper 120 prevents contact between the hammer case 6 and an object around the impact tool 1. The front bumper 120 is made of rubber.

As illustrated in FIG. 13, the front bumper 120 includes: a tubular portion 121 that covers the outer circumferential surface of the second tube portion 62; and a recess 122 recessed outward in the radial direction from the inner circumferential surface of the tubular portion 121. The tubular portion 121 is disposed so as to surround the second tube portion 62. The recess 122 has a protrusion 62A provided on the outer circumferential surface of the second tube portion 62. The front bumper 120 is fixed to the second tube portion 62 by elastic force (tightening force) of rubber. With the protrusion 62A inserted into the recess 122, the front bumper 120 is positioned at the second tube portion 62.

The battery holder 9 holds a battery pack 43. The battery pack 43 is detachably attached to the battery holder 9. The controller accommodating portion 24 is disposed on the upper side of the battery pack 43 attached to the battery holder 9. The protruding portion 22 is disposed on the front side of the battery pack 43 attached to the battery holder 9. The battery pack 43 functions as a power source of the impact tool 1. The battery pack 43 includes a secondary battery. In the embodiment, the battery pack 43 includes a rechargeable lithium-ion battery. The battery pack 43, in a state of being attached to the battery holder 9, can supply power to the impact tool 1. The motor 10 is driven owing to the power supplied from the battery pack 43. The controller 11 is driven owing to the power supplied from the battery pack 43.

The battery holder 9 holds a plate-shaped terminal 44. The terminal 44 includes: a synthetic resin plate; and a terminal member which is a metal connection terminal member disposed on the plate. The battery pack 43 is attached to the battery holder 9, thereby connecting a battery terminal member which is a connection terminal member of the battery pack 43 and a terminal member of the terminal 44 to each other.

The battery housing 3 holds a spring 45 and a cushion rubber 46. The spring 45 is disposed on the front side of the battery holder 9. The cushion rubber 46 is disposed on the front side of the battery pack 43 held by the battery holder 9. The spring 45 biases the battery holder 9 rearward. The cushion rubber 46 is disposed on the front side of the battery pack 43 attached to the battery holder 9. The cushion rubber 46 is disposed on the front side of the battery pack 43 attached to the battery holder 9. The cushion rubber 46 can come in contact with the front part of the battery pack 43. For example, when the impact tool 1 falls, the elastic force of the spring 45 reduces the impact acting on the terminal 44, and the cushion rubber 46 reduces the impact acting on the battery pack 43.

The motor 10 functions as a power source of the impact tool 1. The motor 10 is an inner rotor type DC brushless motor. As illustrated in FIG. 11, the motor 10 includes a stator 47, a rotor 48, and a rotor shaft 49. The stator 47 is supported by the motor case 4. At least a part of the rotor 48 is disposed inside the stator 47. The rotor shaft 49 is fixed to the rotor 48. The rotor 48 is rotatable with respect to the stator 47 about a motor rotation axis MX extending in the up-down direction.

As illustrated in FIG. 11, the stator 47 includes: a stator core 47A; an insulator 47B fixed to the stator core 47A; and coils 47C respectively wound around teeth of the stator core 47A via the insulator 47B. The coils 47C are connected via a busbar unit 47D. The busbar unit 47D is fixed to the lower part of the insulator 47B by a screw 47E.

As illustrated in diagrams such as FIGS. 11, 24, 26, 27, and 28, in the embodiment, an inner member 80 is disposed between the outer circumferential surface of the stator core 47A and the inner circumferential surface of the tube portion 4A of the motor case 4. The inner member 80 has a substantially annular shape. The inner member 80 is made of a glass fiber-reinforced polycarbonate resin.

The rotor 48 rotates about the motor rotation axis MX. As illustrated in FIG. 11, the rotor 48 includes a rotor core 48A and a rotor magnet 48B fixed to the rotor core 48A. In the embodiment, the rotor magnet 48B is disposed inside the rotor core 48A. The rotor magnet 48B may be disposed on the outer circumferential surface of the rotor core 48A.

As illustrated in FIG. 11, the sensor substrate 50 is fixed to the busbar unit 47D of the stator 47. The sensor substrate 50 is accommodated in the motor case 4. The sensor substrate 50 is fixed to the busbar unit 47D with a screw 50S. The sensor substrate 50 detects the position of the rotor 48 in the rotation direction. The sensor substrate 50 includes: a circuit substrate 50A having an annular shape; and a magnetic sensor 50B supported by the circuit substrate 50A. The magnetic sensor 50B is a Hall-effect IC. The magnetic sensor 50B detects the position of the rotor magnet 48B of the rotor 48 to detect the position of the rotor 48 in the rotation direction.

The rotor shaft 49 is fixed to the rotor core 48A of the rotor 48. The rotor 48 and the rotor shaft 49 rotate together about the motor rotation axis MX.

As illustrated in FIG. 11, the rotor shaft 49 is rotatably supported by a rotor bearing 51 and a rotor bearing 52. The rotor bearing 51 rotatably supports an upper part of the rotor shaft 49 protruding upward from an upper end surface of the rotor 48. The rotor bearing 52 rotatably supports a lower part of the rotor shaft 49 protruding downward from a lower end surface of the rotor 48. The rotor bearing 51 is held by the gear case 5. The rotor bearing 52 is held by the motor case 4.

As illustrated in FIG. 11, the first bevel gear 53 is fixed to the upper end of the rotor shaft 49. The first bevel gear 53 is coupled to at least a part of the speed reduction mechanism 13. The first bevel gear 53 rotates about the motor rotation axis MX. The rotor shaft 49 is coupled to the speed reduction mechanism 13 via a first bevel gear 53.

The controller 11 outputs control commands for controlling the motor 10. As illustrated in FIG. 9, the controller 11 includes a circuit board 11B equipped with a plurality of electronic components 11C. Examples of the electronic components 11C mounted on the circuit board 11B include a processor such as a central processing unit (CPU), non-volatile memory such as read only memory (ROM) or storage, volatile memory such as random access memory (RAM), a field effect transistor (FET), a capacitor, and a resistor.

As illustrated in FIG. 9, the controller 11 is accommodated in the controller accommodating portion 24. The controller 11 is held in a controller case 11A in the controller accommodating portion 24.

As illustrated in diagrams such as FIGS. 9, 11, 21, 22, and 23, a baffle plate 30 is disposed at the upper end of the motor case 4. The baffle plate 30 has an annular shape. The baffle plate 30 is fixed to the motor case 4 by screws 30S.

The fan 12 generates an air flow for cooling the motor 10 and the controller 11. As illustrated in FIGS. 9 and 11, the fan 12 is disposed on the upper side of the stator 47. The fan 12 is fixed to the upper part of the rotor shaft 49. The fan 12 is disposed between the rotor bearing 51 and the baffle plate 30. The fan 12 and the baffle plate 30 face each other. The fan 12 and the rotor shaft 49 rotate together.

As illustrated in diagrams such as FIGS. 3 and 4, there is provided intake ports 26 in the controller accommodating portion 24. The main body portion 21 has exhaust ports 27. As illustrated in diagrams such as FIG. 11, an opening 4C is provided in the rear part of the motor case 4. When the fan 12 rotates, the air in the external space of the main body housing 2 flows into the internal space of the controller accommodating portion 24 via the intake ports 26. The air flowing into the internal space of the controller accommodating portion 24 is passed through the internal space of the controller accommodating portion 24 to cool the controller 11. The air passed through the internal space of the controller accommodating portion 24 flows into the internal space of the motor case 4 through the opening 4C by the rotation of the fan 12. The air flowing into the internal space of the motor case 4 is passed through the internal space of the motor case 4 to cool the motor 10. At least a part of the air passed through the internal space of the motor case 4 flows out to the external space of the motor case 4 through the exhaust ports 27 by the rotation of the fan 12.

The speed reduction mechanism 13 is rotated by the motor 10. The speed reduction mechanism 13 transmits the rotational force of the motor 10 to the impacting mechanism 15 via the spindle 14. The speed reduction mechanism 13 couples the rotor shaft 49 and the spindle 14 to each other. The speed reduction mechanism 13 rotates the spindle 14 at a rotational speed lower than the rotational speed of the rotor shaft 49.

As illustrated in FIG. 11, the speed reduction mechanism 13 includes: a first bevel gear 53; a second bevel gear 54 meshing with the first bevel gear 53; and a planetary gear mechanism 55 driven by the rotational force of the motor 10 transmitted via the second bevel gear 54. The first bevel gear 53 rotates about the motor rotation axis MX. The second bevel gear 54 rotates about the output rotation axis AX.

The planetary gear mechanism 55 is accommodated in the gear case 5. As illustrated in FIG. 11, the planetary gear mechanism 55 includes a sun gear 55S, a plurality of planetary gears 55P, and an internal gear 55I. The planetary gears 55P are disposed around the sun gear 55S. The internal gear 55I is disposed around the planetary gears 55P. The internal gear 55I is fixed to the inner circumferential surface of the gear case 5.

The second bevel gear 54 is disposed around the sun gear 55S. The second bevel gear 54 is fixed to the sun gear 55S. The second bevel gear 54 and the sun gear 55S rotate together. The second bevel gear 54 and the sun gear 55S are rotatable about the output rotation axis AX extending in the front-rear direction. The output rotation axis AX and the motor rotation axis MX are orthogonal to each other. A rear end of the sun gear 55S is supported by a gear bearing 56. An intermediate part of the sun gear 55S is supported by a gear bearing 57. The gear bearing 56 is held by the bearing cover 40. The gear bearing 57 is held by the gear case 5. When the rotation of the rotor shaft 49 rotates the first bevel gear 53, the second bevel gear 54 rotates. The rotation of the second bevel gear 54 rotates the sun gear 55S.

The planetary gears 55P each meshes with the sun gear 55S. The planetary gears 55P are rotatably supported by the rear part of the spindle 14 via respective pins 55A. The spindle 14 is rotated by the planetary gears 55P. The internal gear 55I has internal teeth that mesh with the planetary gears 55P. The internal gear 55I is fixed to the gear case 5. The outer circumferential surface of the internal gear 55I is provided with a plurality of protrusions. The protrusions of the internal gear 55I are fitted to recesses provided on the inner circumferential surface of the gear case 5. The internal gear 55I is always unrotatable with respect to the gear case 5.

When driving of the motor 10 rotates the rotor shaft 49 and the first bevel gear 53, the second bevel gear 54 and the sun gear 55S rotate. When the sun gear 55S rotates, the planetary gears 55P revolve around the sun gear 55S. The planetary gears 55P revolve while meshing with the internal teeth of the internal gear 55I. Due to the revolution of the planetary gears 55P, the spindle 14 connected to the planetary gears 55P via the respective pins 55A rotates at a rotational speed lower than the rotational speed of the rotor shaft 49.

The spindle 14 rotates by the rotational force of the motor 10 transmitted by the speed reduction mechanism 13. The spindle 14 transmits the rotational force of the motor 10 transmitted via the speed reduction mechanism 13 to the impacting mechanism 15. The spindle 14 is rotatable about the output rotation axis AX. The rear part of the spindle 14 is accommodated in the gear case 5. The front part of the spindle 14 is accommodated in the hammer case 6. At least a part of the spindle 14 is disposed on the front side of the speed reduction mechanism 13. The spindle 14 is disposed on the rear side of the anvil 16.

As illustrated in FIG. 12, the spindle 14 includes a flange portion 14A, a spindle shaft portion 14B, and a protruding portion 14C. The spindle shaft portion 14B protrudes forward from the flange portion 14A. The protruding portion 14C protrudes rearward from the flange portion 14A.

As illustrated in FIG. 11, the planetary gears 55P are rotatably supported by the protruding portion 14C via the respective pins 55A. The spindle 14 is rotatably supported by a spindle bearing 58. The spindle bearing 58 rotatably supports the protruding portion 14C. The spindle bearing 58 is held by the gear case 5.

The impacting mechanism 15 impacts (strikes) the anvil 16 in a rotation direction around the output rotation axis AX. The impacting mechanism 15 is disposed on the front side of the motor 10. The impacting mechanism 15 is driven by the motor 10. The impacting mechanism 15 is rotatable about the output rotation axis AX. The rotational force of the motor 10 is transmitted to the impacting mechanism 15 via the speed reduction mechanism 13 and the spindle 14. The impacting mechanism 15 impacts the anvil 16 in the rotation direction by the rotational force of the spindle 14 rotated by the motor 10.

The impacting mechanism 15 is accommodated in the first tube portion 61 of the hammer case 6. As illustrated in FIG. 12, the impacting mechanism 15 includes a hammer 71, balls 72, a first coil spring 73, a second coil spring 74, a third coil spring 75, a first washer 76, and a second washer 77.

The hammer 71 is disposed on the front side of the speed reduction mechanism 13. The hammer 71 is disposed around the spindle shaft portion 14B. The hammer 71 is held by the spindle shaft portion 14B. The hammer 71 is rotated by the motor 10. The hammer 71 is rotated by the rotation of the motor 10 transmitted via the speed reduction mechanism 13. The balls 72 are disposed between the spindle shaft portion 14B and the hammer 71. The hammer 71 includes: a hammer body 71A having a tubular shape; and hammer projections 71B provided at a front part of the hammer body 71A. On the rear surface of the hammer body 71A, a recess 71C having an annular shape is provided. The recess 71C is recessed forward from the rear surface of the hammer body 71A.

The hammer 71 is rotated by the motor 10. The rotational force of the motor 10 is transmitted to the hammer 71 via the speed reduction mechanism 13 and the spindle 14. The hammer 71 is rotatable together with the spindle 14 owing to the rotational force of the spindle 14 rotated by the motor 10. The hammer 71 and the spindle 14 each rotate about the output rotation axis AX.

The first washer 76 is disposed inside the recess 71C. The first washer 76 is supported by the hammer 71 via a plurality of balls 78. The balls 78 are disposed on the front side of the first washer 76.

The second washer 77 is disposed on the rear side of the first washer 76 inside the recess 71C. An outer diameter of second washer 77 is smaller than an outer diameter of first washer 76. The second washer 77 and the hammer 71 are relatively movable in the front-rear direction.

The first coil spring 73 is disposed around the spindle shaft portion 14B. The rear end of the first coil spring 73 is supported by the flange portion 14A. The front end of the first coil spring 73 is disposed inside the recess 71C and supported by the first washer 76. The first coil spring 73 always generates an elastic force for moving the hammer 71 forward.

The second coil spring 74 is disposed around the spindle shaft portion 14B. The second coil spring 74 is disposed on the inner side of the first coil spring 73 in the radial direction. The rear end of the second coil spring 74 is supported by the flange portion 14A. The front end of the second coil spring 74 is disposed inside the recess 71C and supported by the second washer 77. The second coil spring 74 generates an elastic force for moving the hammer 71 forward when the hammer 71 moves rearward.

The third coil spring 75 is disposed around the spindle shaft portion 14B. The third coil spring 75 is disposed on the inner side of the first coil spring 73 in the radial direction. The third coil spring 75 is disposed inside the recess 71C. The rear end of the third coil spring 75 is supported by the second washer 77. The front end of the third coil spring 75 is supported by the first washer 76. The third coil spring 75 generates an elastic force for moving the second coil spring 74 rearward. The rear end of the second coil spring 74 is pressed against the flange portion 14A by the elastic force of the third coil spring 75. This prevents occurrence of free movement of the second coil spring 74 with respect to the flange portion 14A.

The balls 72 are made of metal such as steel. The balls 72 are disposed between the spindle shaft portion 14B and the hammer 71. The spindle 14 has spindle grooves 14D, in which of which at least a portion of the ball 72 is disposed. The spindle grooves 14D are provided in portions of the outer-circumferential surface of the spindle shaft portion 14B. The hammer 71 has hammer grooves 71D, in each of which at least a portion of the corresponding ball 72 is disposed. The hammer grooves 71D are provided in portions of the inner-circumferential surface of the hammer 71. The balls 72 are disposed between the spindle grooves 14D and the hammer grooves 71D. The balls 72 can roll inside the spindle groove 14D and inside the hammer groove 71D. The hammer 71 is movable together with the balls 72. The spindle 14 and the hammer 71 can move relative to each other in a direction parallel to the output rotation axis AX and a rotation direction around the output rotation axis AX within a movable range defined by the spindle grooves 14D and the hammer grooves 71D.

The anvil 16 is an output portion of the impact tool 1 that is rotated by the rotational force of the motor 10. At least a part of the anvil 16 is disposed on the front side of the hammer 71. The anvil 16 is impacted in the rotation direction by the hammer 71 of the impacting mechanism 15.

As illustrated in FIG. 12, the anvil 16 has an anvil recess 16A. The anvil recess 16A is provided at the rear end of the anvil 16. The anvil recess 16A is recessed forward from the rear end of the anvil 16. The spindle 14 is disposed rearward of the anvil 16. A front end of the spindle shaft portion 14B is disposed in the anvil recess 16A.

The anvil 16 includes an anvil shaft portion 16B and anvil projections 16C. The anvil shaft portion 16B is disposed on the front side of the impacting mechanism 15. The anvil projections 16C protrude outward in the radial direction of the anvil shaft portion 16B from the rear end of the anvil shaft portion 16B. The anvil projections 16C are impacted by the impacting mechanism 15 in the rotation direction around the output rotation axis AX.

The front end of the anvil shaft portion 16B is disposed forward of the hammer case 6 through the opening of the front part of the second tube portion 62. At the front end of the anvil shaft portion 16B, a socket is attached as a tool tip.

The anvil 16 is rotatably supported by an anvil bearing 79. The anvil bearing 79 is disposed around the anvil shaft portion 16B. The anvil 16 is rotatable about the output rotation axis AX. The anvil bearing 79 is held by the hammer case 6. The anvil bearing 79 is disposed inside the second tube portion 62 of the hammer case 6. The anvil bearing 79 is held by the second tube portion 62 of the hammer case 6.

In the embodiment, the anvil bearing 79 is a sliding bearing. The anvil bearing 79 has a tubular shape. In the embodiment, a sleeve is used as the anvil bearing 79. For example, the sliding bearing may be formed by impregnating a tubular porous metal body manufactured by a powder metallurgy method with a lubricating oil.

In the cross section orthogonal to the output rotation axis AX, the shape of the outer circumferential surface of a part of the anvil shaft portion 16B supported by the anvil bearing 79 is circular. In a cross section orthogonal to the output rotation axis AX, the shape of the inner circumferential surface of the anvil bearing 79 is circular.

The front end of the anvil shaft portion 16B is disposed forward of the second tube portion 62 through the opening of the front end of the second tube portion 62. At least a part of the anvil shaft portion 16B is disposed inside the opening at the front end of the second tube portion 62. As illustrated in FIGS. 12 and 13, a seal member 94 is provided at the front end of the anvil bearing 79. The seal member 94 is disposed inside the front end of the anvil bearing 79. A recess 79A is provided at the front end of the inner circumferential surface of the anvil bearing 79. The seal member 94 is disposed inside the recess 79A. The seal member 94 seals a boundary between the front end of the anvil bearing 79 and the anvil shaft portion 16B.

The trigger switch 17 is operated by an operator to drive the motor 10. The driving of the motor 10 means that the coils of the stator 47 are energized to rotate the rotor 48. The trigger switch 17 is provided on the upper part of the rear grip portion 23A. As illustrated in FIG. 9, the trigger switch 17 includes a trigger lever 17A and a switch body 17B. The switch body 17B is disposed in the internal space of the rear grip portion 23A. The trigger lever 17A protrudes forward from the upper part of the front part of the rear grip portion 23A. The trigger lever 17A is operated by the operator to move rearward. Operating the trigger lever 17A to move rearward will drive the motor 10. Canceling the operation of the trigger lever 17A will stop the motor 10.

The forward/reverse switching lever 29 is operated by the operator to switch the rotation direction of the motor 10. The forward/reverse switching lever 29 is disposed on the upper grip portion 23B. The forward/reverse switching lever 29 is supported by the upper grip portion 23B so as to be slidable in the front-rear direction. The forward/reverse switching lever 29 is slid to the front side to rotate the motor 10 in the forward direction. The forward/reverse switching lever 29 is slid to the rear side to rotate the motor 10 in the reverse direction.

The light assembly 18 emits illumination light. The light assembly 18 illuminates the anvil 16 and the surroundings of the anvil 16 with illumination light. The light assembly 18 illuminates the front side of the anvil 16 with illumination light. In addition, the light assembly 18 illuminates the socket attached to the anvil 16 and the surroundings of the socket with illumination light. The light assembly 18 is disposed around the second tube portion 62 of the hammer case 6.

The interface panel 19 includes, for example, an operation button for selecting a light emission mode of the light assembly 18. The interface panel 19 includes, for example, a display unit that displays the remaining capacity of the battery pack 43.

The hook assembly 20 is hooked on a target object. The hook assembly 20 includes: a base portion 20A and a ring portion 20B. The base portion 20A is fixed to an upper part of the main body housing 2. In the embodiment, the base portion 20A has openings into which the respective screws 41 are inserted. The screws 41 are respectively inserted into the openings of the screw bosses 2B through the openings of the base portion 20A. The base portion 20A is sandwiched between the heads of the screws 41 and the screw bosses 2B so as to be fixed to the upper part of the main body housing 2. The ring portion 20B is disposed so as to protrude upward from the base portion 20A. With a configuration in which at least a part of the target object is inserted into the base portion 20A, the impact tool 1 is suspended from the target object via the hook assembly 20.

Light Assembly

Figure 14:
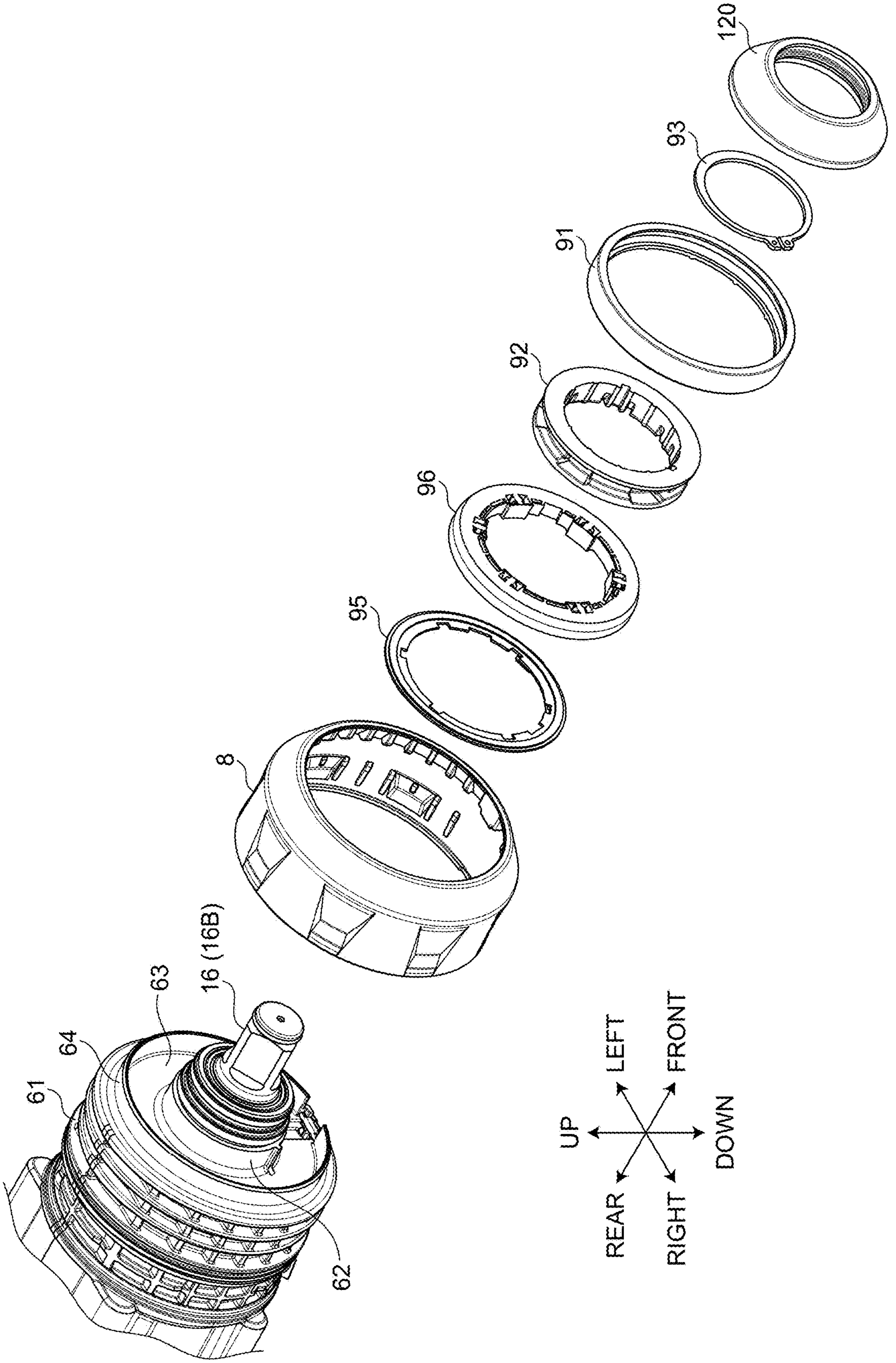
FIG. 14 is a front right-side exploded perspective view illustrating a light assembly according to the embodiment.

FIG. 14 is a front right-side exploded perspective view illustrating the light assembly 18 according to the embodiment. As illustrated in FIGS. 13 and 14, the light assembly 18 includes a light emitter unit 90, an axial elastic body 91, and a radial elastic body 92.

The light emitter unit 90 is disposed around the second tube portion 62. The light emitter unit 90 includes: a chip-on-board light emitting diode 95 (COB LED); and an optical member 96. The chip-on-board light emitting diode 95 includes: a substrate 95A; an LED chip 95B as a light emitter; and a phosphor 95C.

At least a part of the optical member 96 is disposed forward of the chip-on-board light emitting diode 95. At least a part of the optical member 96 is disposed so as to face the front surface of the chip-on-board light emitting diode 95. The light emitted from the LED chip 95B of the chip-on-board light emitting diode 95 passes through the optical member 96 and is applied to the front side of the light emitter unit 90.

The optical member 96 is made of polycarbonate resin. In the embodiment, the optical member 96 is made of a polycarbonate resin containing a white diffusion material. The optical member 96 is milky white. The optical member 96 has a light transmittance of 40% or more and 70% or less. Since the optical member 96 is milky white, it is difficult to visually recognize the outer shape of the LED chip 95B from the outside of the impact tool 1. Since it is difficult to visually recognize the outer shape of the LED chip 95B, the design of the impact tool 1 is improved.

The axial elastic body 91 and the radial elastic body 92 are each made of rubber. The axial elastic body 91 and the radial elastic body 92 each suppress transmission of vibration of the hammer case 6 to the light emitter unit 90. The axial elastic body 91 and the radial elastic body 92 each function as a vibration isolation member that attenuates vibration input to the light emitter unit 90.

The radial elastic body 92 has an annular shape. The radial elastic body 92 is disposed so as to surround the anvil shaft portion 16B. The radial elastic body 92 is disposed so as to surround the second tube portion 62.

The radial elastic body 92 is supported by the hammer case 6. The radial elastic body 92 supports the light emitter unit 90 from the inner side in the radial direction. At least a part of the radial elastic body 92 faces the front surface of the optical member 96. The radial elastic body 92 includes: a radial base portion 92A; a rear support portion 92B; and a front support portion 92C. The radial base portion 92A, the rear support portion 92B, and the front support portion 92C are integrated with each other.

The radial base portion 92A is disposed between the second tube portion 62 and the light emitter unit 90 in the radial direction. The radial base portion 92A has a tubular shape. The radial base portion 92A is disposed around the second tube portion 62. The inner circumferential surface of the radial base portion 92A faces the outer circumferential surface of the second tube portion 62. The inner circumferential surface of the radial base portion 92A comes in contact with the outer circumferential surface of the second tube portion 62. The outer circumferential surface of the radial base portion 92A faces the inner circumferential surface of the light emitter unit 90. The outer circumferential surface of the radial base portion 92A comes in contact with the inner circumferential surface of the light emitter unit 90.

The rear support portion 92B supports the light emitter unit 90 from the rear side. The rear support portion 92B has an annular shape. The rear support portion 92B is connected to a rear end of the radial base portion 92A. The rear support portion 92B protrudes outward in the radial direction from the rear end of the radial base portion 92A. The rear surface of the rear support portion 92B faces the front surface of the front wall 63. The front surface of the rear support portion 92B comes in contact with the rear surface of the light emitter unit 90.

The front support portion 92C supports the light emitter unit 90 from the front side. The front support portion 92C has an annular shape. The front support portion 92C is connected to the front end of the radial base portion 92A. The front support portion 92C protrudes from the front end of the radial base portion 92A outward in the radial direction. The rear surface of the front support portion 92C comes in contact with the front surface of the light emitter unit 90. The front surface of the front support portion 92C comes in contact with the rear surface of the front bumper 120.

The axial elastic body 91 has an annular shape. The axial elastic body 91 is disposed so as to surround the light emitter unit 90.

The axial elastic body 91 is supported by the light emitter unit 90. The axial elastic body 91 supports the light emitter unit 90 from the rear side. In the radial direction, at least a part of the axial elastic body 91 is disposed between the annular rib portion 64 and the light emitter unit 90. The axial elastic body 91 includes: an axial base portion 91A; a rear support portion 91B; and a front support portion 91C. The axial base portion 91A, the rear support portion 91B, and the front support portion 91C are integrated with each other.

The axial base portion 91A is disposed between the annular rib portion 64 and the light emitter unit 90 in the radial direction. The axial base portion 91A has a tubular shape. The axial base portion 91A is disposed around the light emitter unit 90. The outer circumferential surface of the axial base portion 91A faces the inner circumferential surface of the annular rib portion 64. The outer circumferential surface of the axial base portion 91A comes in contact with the inner circumferential surface of the annular rib portion 64. The inner circumferential surface of the axial base portion 91A faces the outer circumferential surface of the light emitter unit 90. The inner circumferential surface of the axial base portion 91A comes in contact with the outer circumferential surface of the light emitter unit 90.

The rear support portion 91B supports the light emitter unit 90 from the rear side. The rear support portion 91B has an annular shape. The rear support portion 91B is connected to the rear end of the axial base portion 91A. The rear support portion 91B protrudes inward in the radial direction from the rear end of the axial base portion 91A. The rear surface of the rear support portion 91B faces the front surface of the front wall 63. The front surface of the rear support portion 91B comes in contact with the rear surface of the light emitter unit 90.

The front support portion 91C supports the light emitter unit 90 from the front side. The front support portion 91C has an annular shape. The front support portion 91C is connected to the front end of the axial base portion 91A. The front support portion 91C protrudes inward in the radial direction from the front end of the axial base portion 91A. The rear surface of the front support portion 91*C comes* in contact with the front surface of the light emitter unit 90.

The front bumper 120 is disposed so as to cover at least a part of the surface of the hammer case 6 on the front side of the light assembly 18. The front bumper 120 comes in contact with at least a part of the front surface of the light assembly 18. The front bumper 120 supports the light assembly 18 from the front side. The front bumper 120 supports the radial elastic body 92 from the front side. The front bumper 120 comes in contact with at least a part of the front surface of the radial elastic body 92.

The front bumper 120 supports the front support portion 92C from the front side. The rear surface of the front bumper 120 comes in contact with the front surface of the front support portion 92C.

The front bumper 120 supports the light emitter unit 90 from the front side via the radial elastic body 92. The front bumper 120 supports the optical member 96 from the front side via the radial elastic body 92. In the radial direction, the outer end of the front bumper 120 is disposed outside the inner end of the optical member 96. The outer end of the front bumper 120 and the inner end of the optical member 96 overlap each other in the radial direction.

In the embodiment, the rubber hardness of the rear bumper 8 is the same as the rubber hardness of the front bumper 120. The rubber hardness of the radial elastic body 92 is the same as the rubber hardness of the axial elastic body 91. The rubber hardness of the front bumper 120 and the rear bumper 8 is higher than the rubber hardness of the radial elastic body 92 and the axial elastic body 91.

A washer 93 supports the front support portion 92C from the front side. The front surface of the front support portion 92C and the rear surface of the washer 93 come in contact with each other. As illustrated in FIG. 13, the washer 93 is disposed in a washer groove 62B provided on the outer circumferential surface of the second tube portion 62. The washer 93 functions as a fastener that supports the front support portion 92C from the front side.

Impact Absorber Mechanism

Figure 15:
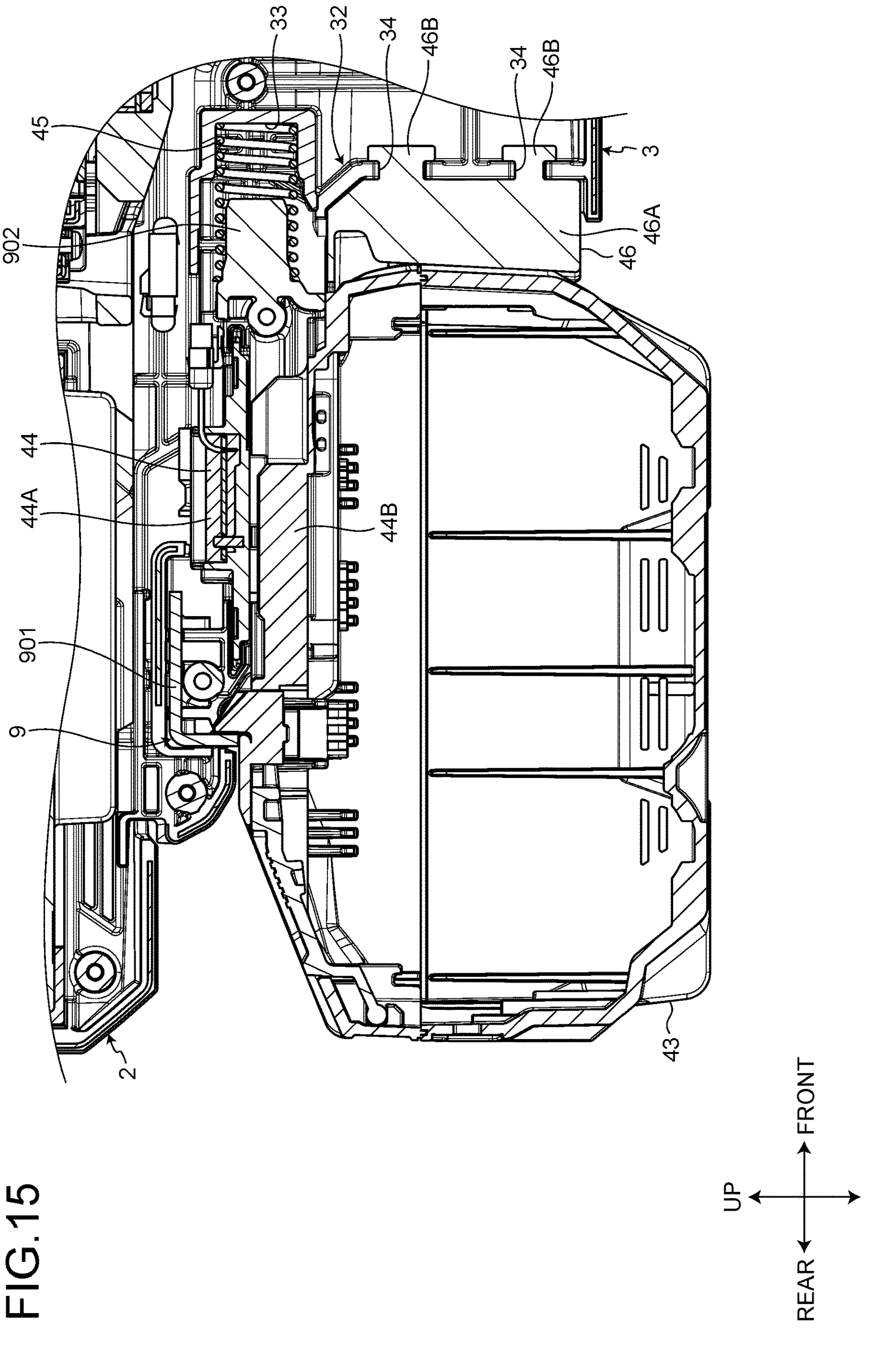
FIG. 15 is a cross-sectional view illustrating a part of the impact tool according to the embodiment.
Figure 16:
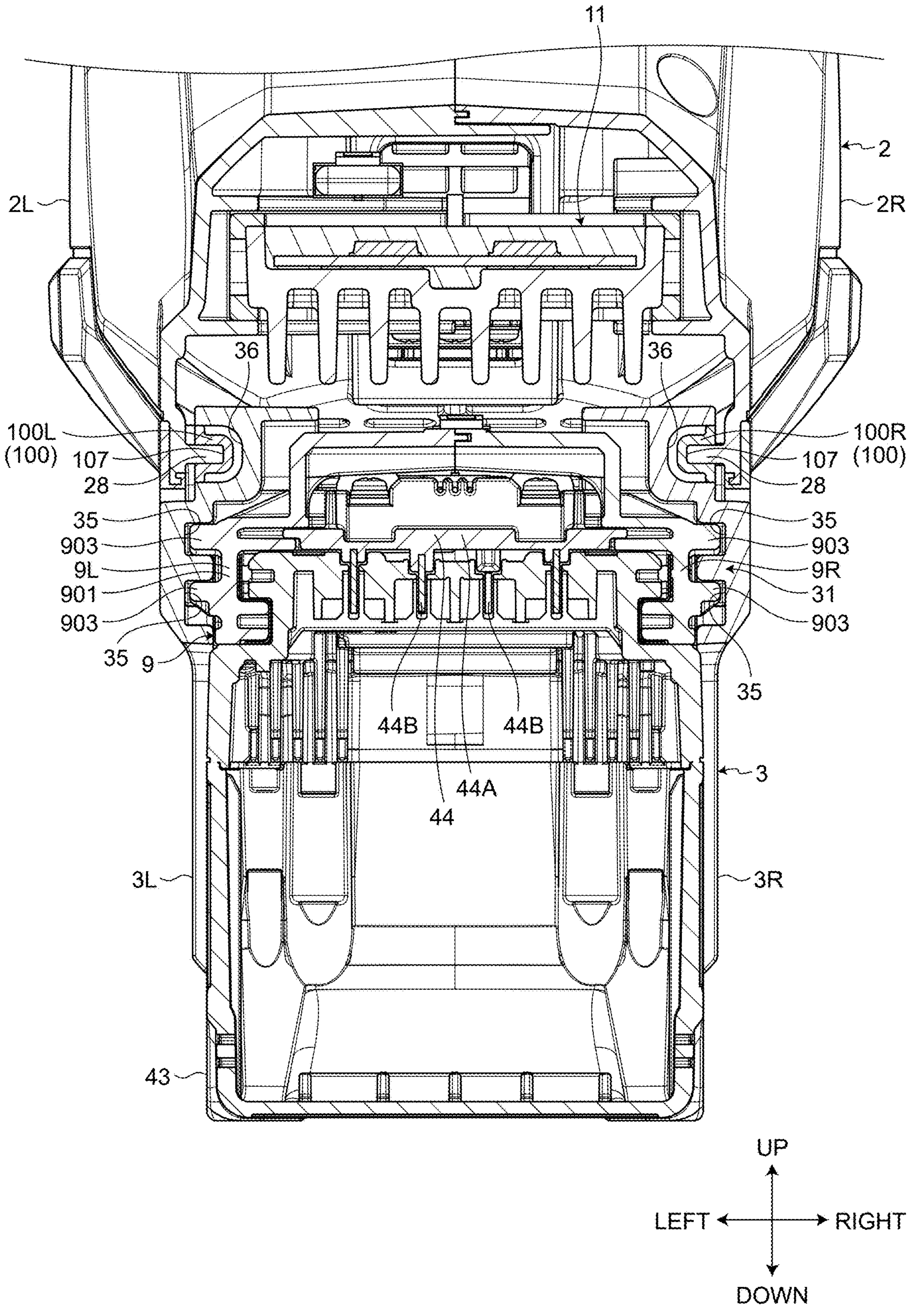
FIG. 16 is a cross-sectional view illustrating a part of the impact tool according to the embodiment.
Figure 17:
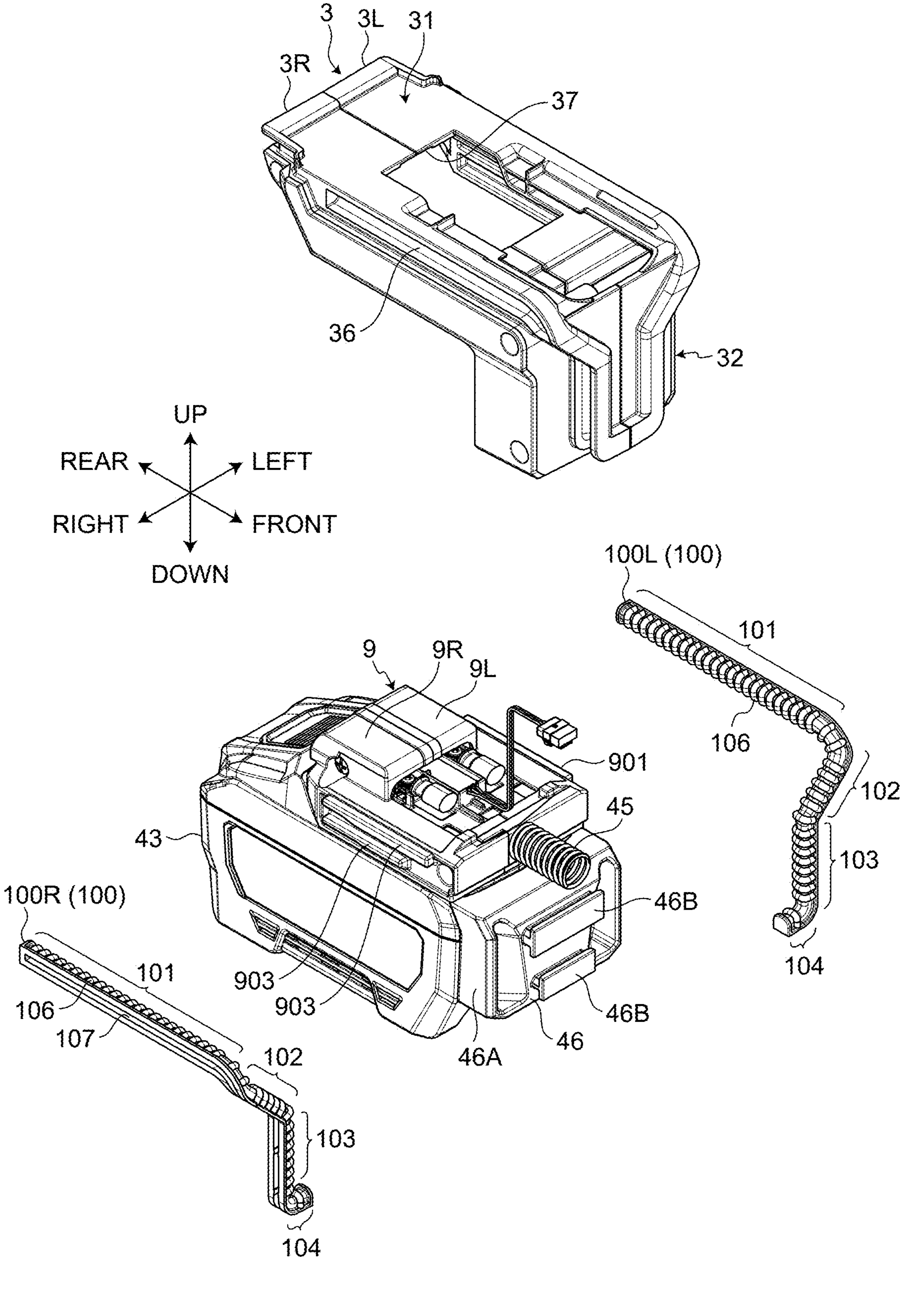
FIG. 17 is a front right-side exploded perspective view illustrating a battery housing and a battery holder according to the embodiment.

FIG. 15 is a cross-sectional view illustrating a part of the impact tool 1 according to the embodiment, and corresponds to an enlarged partial view of FIG. 9. FIG. 16 is a cross-sectional view illustrating a part of the impact tool 1 according to the embodiment and corresponds to a cross-sectional arrow view taken along line C-C in FIG. 3. FIG. 17 is a front right-side exploded perspective view illustrating the battery housing 3 and the battery holder 9 according to the embodiment.

The impact tool 1 includes: a main body housing 2 that accommodates a motor 10; vibration isolation rubbers 100 supported by the main body housing 2; a battery housing 3 supported by the vibration isolation rubbers 100; a battery holder 9 on which a battery pack 43 is attached; and a spring 45 and a cushion rubber 46 supported by the battery housing 3.

The battery housing 3 includes: a holder support portion 31 that supports the battery holder 9; and an elastic member support portion 32 disposed on the front side of the battery pack 43 attached to the battery holder 9.

The battery housing 3 includes a left battery housing 3L and a right battery housing 3R. The holder support portion 31 is separated into the left battery housing 3L and the right battery housing 3R. The battery holder 9 is sandwiched between the holder support portion 31 of the left battery housing 3L and the holder support portion 31 of the right battery housing 3R.

The battery holder 9 holds the terminal 44. The terminal 44 includes: a terminal plate 44A; and a terminal member 44B fixed to the terminal plate 44A. The terminal member 44B protrudes downward from the lower surface of the terminal plate 44A. The battery terminal member of the battery pack 43 and the terminal member 44B of the terminal 44 are connected to each other. The battery holder 9 holds the terminal plate 44A. An opening 37 is provided in an upper part of the holder support portion 31. At least a part of the terminal 44 is disposed inside the opening 37. When the terminal 44 and the controller 11 are connected via a lead wire, the lead wire can pass through the opening 37.

The battery holder 9 is movably supported by the battery housing 3. In the embodiment, the battery holder 9 is supported by the battery housing 3 so as to be movable in the front-rear direction. The battery holder 9 is movable in the front-rear direction with respect to the battery housing 3.

The battery holder 9 includes a terminal holding portion 901, a protrusion 902, and sliding portions 903.

The terminal holding portion 901 holds the terminal plate 44A. In the embodiment, the battery holder 9 includes a left battery holder 9L and a right battery holder 9R. The right battery holder 9R is disposed on the right side of the left battery holder 9L. The left battery holder 9L and the right battery holder 9R constitute a pair of half split holders. The terminal 44 is sandwiched between the left battery holder 9L and the right battery holder 9R.

The protrusion 902 protrudes forward from the front end of the terminal holding portion 901. The spring 45 is a coil spring. The protrusion 902 is inserted into the spring 45.

The battery housing 3 has guiding portions 35 that guide the sliding portions 903 provided in the battery holder 9. The sliding portions 903 are guided in the front-rear direction by the guiding portions 35 of the battery housing 3. In the embodiment, the guiding portions 35 each includes a guide groove provided on the inner surface of the battery housing 3. The sliding portions 903 are movable in the front-rear direction inside the guide grooves.

The sliding portions 903 are provided in each part, namely, the left part and the right part of the terminal holding portion 901. The guiding portions 35 are provided on each side, namely, the left side and the right side of the terminal holding portion 901 in the holder support portion 31. The battery housing 3 includes a left battery housing 3L and a right battery housing 3R. The guiding portions 35 are provided in each housing, namely, the left battery housing 3L and the right battery housing 3R.

The spring 45 and the cushion rubber 46 are each supported by the elastic member support portion 32 of the battery housing 3. The elastic member support portion 32 includes: a spring holding portion 33 that holds the spring 45; and rubber holding portions 34 that hold the cushion rubber 46.

The spring holding portion 33 includes a recess provided in the elastic member support portion 32. The recess is provided so as to be recessed forward from the rear surface of the elastic member support portion 32. With a configuration in which the front part of the spring 45 is disposed inside the recess, the spring 45 is held by the spring holding portion 33. The protrusion 902 of the battery holder 9 is inserted into the spring 45 from the rear end of the spring 45. The rear end of the spring 45 is supported by the front surface of the terminal holding portion 901.

The cushion rubber 46 includes: a main body portion 46A; and protrusions 46B each protruding forward from the front surface of the main body portion 46A. Two protrusions 46B are provided at intervals in the up-down direction. The rubber holding portions 34 each include an opening provided in the elastic member support portion 32. With the protrusions 46B disposed in the openings, the cushion rubber 46 is held by the rubber holding portions 34. A part of each of the rubber holding portions 34 (openings) is provided in the left battery housing 3L, while a part of each of the rubber holding portion 34 (openings) is provided in the right battery housing 3R. The left battery housing 3L and the right battery housing 3R are fixed by the screws 3S (see FIG. 3) in a state where the protrusions 46B are placed in the rubber holding portions 34 (openings), a part of each of which is provided in the left battery housing 3L and the right battery housing 3R, whereby the protrusions 46B are held by the rubber holding portions 34.

The spring 45 and the cushion rubber 46 each blocks relative movement between the battery housing 3 and the battery pack 43 attached to the battery holder 9. The spring

45 is a compression spring. The spring 45 biases the battery holder 9 in a direction away from the cushion rubber 46.

The battery pack 43 is slid from the rear side of the battery holder 9 to the front side with respect to the battery holder 9 so as to be attached to the battery holder 9. The cushion rubber 46 is disposed on the front side of the battery pack 43. The spring 45 biases the battery holder 9 rearward. At least a part of the battery holder 9 biased rearward comes into contact with the rear part of the holder support portion 31 of the battery housing 3, whereby the battery holder 9 is positioned in the front-rear direction.

When an external force in a direction approaching the cushion rubber 46 is not applied to the battery holder 9, the battery holder 9 is disposed at an initial position by the biasing force of the spring 45. The initial position of the battery holder 9 is a position determined by at least a part of the battery holder 9, which is biased rearward, coming into contact with the rear part of the holder support portion 31 of the battery housing 3. When the battery holder 9 is disposed at the initial position, the cushion rubber 46 and the battery pack 43 attached to the battery holder 9 are separated from each other. When an external force in a direction approaching the cushion rubber 46 is applied to the battery holder 9, the cushion rubber 46 and the battery pack 43 attached to the battery holder 9 come into contact with each other. That is, when an external force in a direction approaching the cushion rubber 46 is not applied to the battery holder 9, the spring 45 blocks the relative movement between the battery housing 3 and the battery pack 43. When an external force in a direction approaching the cushion rubber 46 is applied to the battery holder 9, the cushion rubber 46 blocks relative movement between the battery housing 3 and the battery pack 43.

The vibration isolation rubbers 100 block transmission of vibration of the main body housing 2 to the battery housing 3. The vibration isolation rubbers 100 attenuate the vibration input from the main body housing 2 to the battery housing 3. The vibration isolation rubbers 100 are disposed between the main body housing 2 and the battery housing 3. The vibration isolation rubbers 100 prevent contact between the main body housing 2 and the battery housing 3. The battery housing 3 is disposed between the main body housing 2 and the battery holder 9. The battery holder 9 is supported by the main body housing 2 via the vibration isolation rubbers 100 and the battery housing 3.

The vibration isolation rubbers 100 are disposed on the left side and the right side of the battery housing 3. The vibration isolation rubbers 100 includes: a left vibration isolation rubber 100L disposed between the left main body housing 2L and the left battery housing 3L; and a right vibration isolation rubber 100R disposed between the right main body housing 2R and the right battery housing 3R.

The vibration isolation rubbers 100 each have a rod shape extending in three directions different from each other (i.e., in the front-rear direction, the up-down direction, and the left-right direction). Each of the vibration isolation rubbers 100 includes a first portion 101, a second portion 102, a third portion 103, and a fourth portion 104. The first portion 101 extends in the front-rear direction. In the left vibration isolation rubber 100L, the second portion 102 extends in a direction inclined downward from the front end of the first portion 101 toward the right side. In the left vibration isolation rubber 100L, the third portion 103 extends downward from the lower end of the second portion 102. In the left vibration isolation rubber 100L, the fourth portion 104 extends rightward from the lower end of the third portion 103. In the right vibration isolation rubber 100R, the second portion 102 extends in a direction inclined downward from the front end of the first portion 101 toward the left side. In the right vibration isolation rubber 100R, the third portion 103 extends downward from the lower end of the second portion 102. In the right vibration isolation rubber 100R, the fourth portion 104 extends leftward from the lower end of the third portion 103.

Each of the vibration isolation rubbers 100 includes: a plurality of projections 106 facing the battery housing 3; and a holding groove 107 facing the main body housing 2. The projections 106 are provided in the first portion 101, the second portion 102, the third portion 103, and the fourth portion 104. The holding groove 107 is formed over the first portion 101, the second portion 102, the third portion 103, and the fourth portion 104.

The battery housing 3 has holding recesses 36 in which the vibration isolation rubbers 100 are disposed, respectively. The holding recess 36 is formed in accordance with the shape of the vibration isolation rubber 100 so as to allow the first portion 101, the second portion 102, the third portion 103, and the fourth portion 104 to be individually disposed.

The holding recesses 36 are respectively provided on the left surface of the left battery housing 3L and the right surface of the right battery housing 3R. The left vibration isolation rubber 100L is disposed in the holding recess 36 provided in the left battery housing 3 L. The right vibration isolation rubber 100R is disposed in the holding recess 36 provided in the right battery housing 3R. The projections 106 come in contact with the inner surface of the holding recess 36. The projections 106 reduce a contact area between the vibration isolation rubber 100 and the battery housing 3.

The main body housing 2 has holding protrusions 28 to be inserted into the holding grooves 107 of the vibration isolation rubbers 100. The holding protrusion 28 is formed in accordance with the shape of the vibration isolation rubber 100 so as to be inserted into the holding groove 107 formed over the first portion 101, the second portion 102, the third portion 103, and the fourth portion 104.

The holding protrusions 28 are provided on the inner surface of the left main body housing 2L and the inner surface of the right main body housing 2R. In the left main body housing 2L, the holding protrusion 28 is provided so as to protrude rightward from the inner surface (right surface) of the left main body housing 2L. In the right main body housing 2R, the holding protrusion 28 is provided so as to protrude leftward from the inner surface (left surface) of the right main body housing 2R. The holding protrusion 28 of the left main body housing 2L is inserted into the holding groove 107 of the left vibration isolation rubber 100L. The holding protrusion 28 of the right main body housing 2R is inserted into the holding groove 107 of the right vibration isolation rubber 100R.

In the embodiment, the first portion 101, the second portion 102, the third portion 103, and the fourth portion 104 extending in mutually different directions are integrated with each other. Note that the first portion 101, the second portion 102, the third portion 103, and the fourth portion 104 may be separate from each other.

Holder Mechanism

Figure 18:
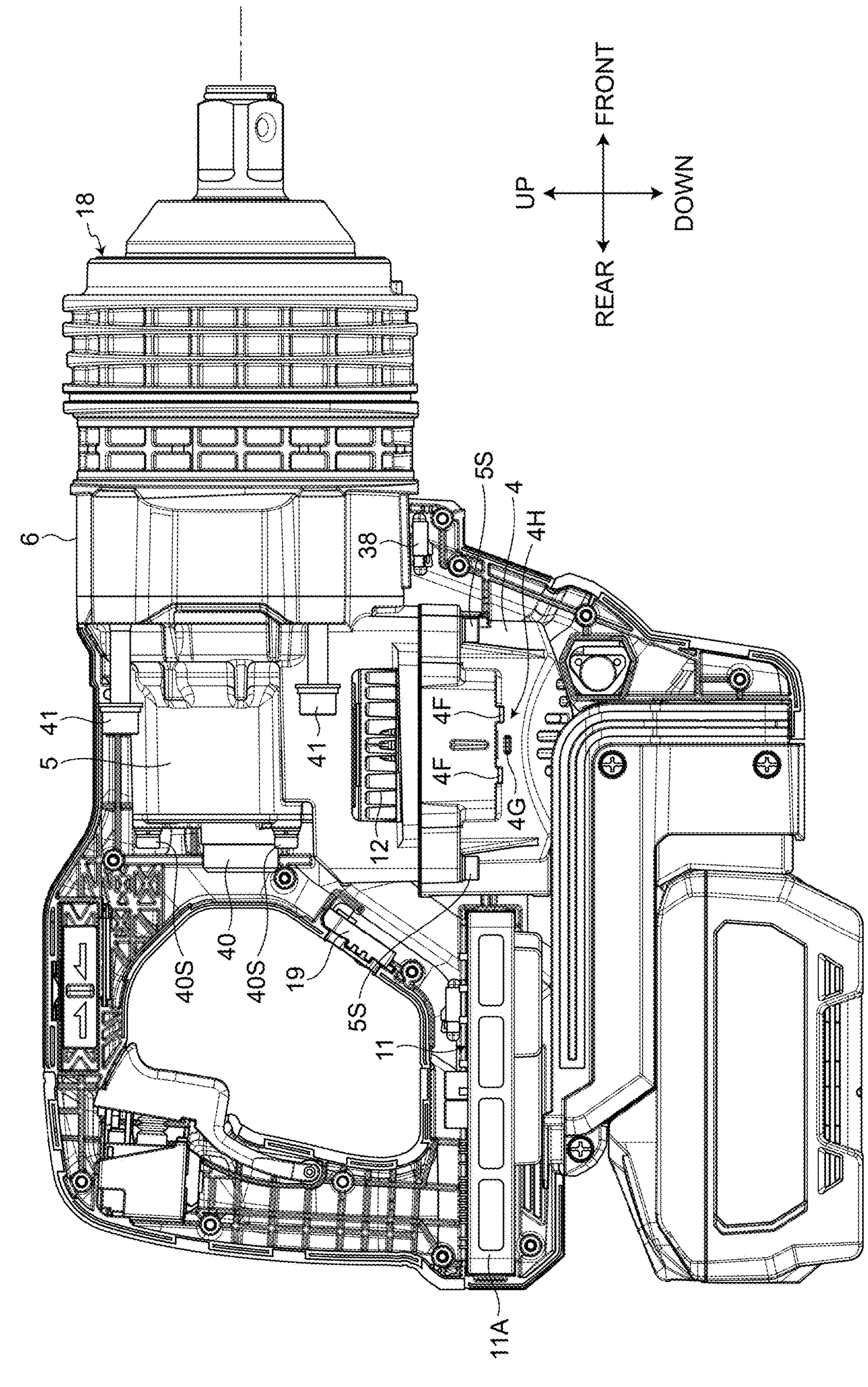
FIG. 18 is a right side view of a part of the impact tool according to the embodiment.
Figure 19:
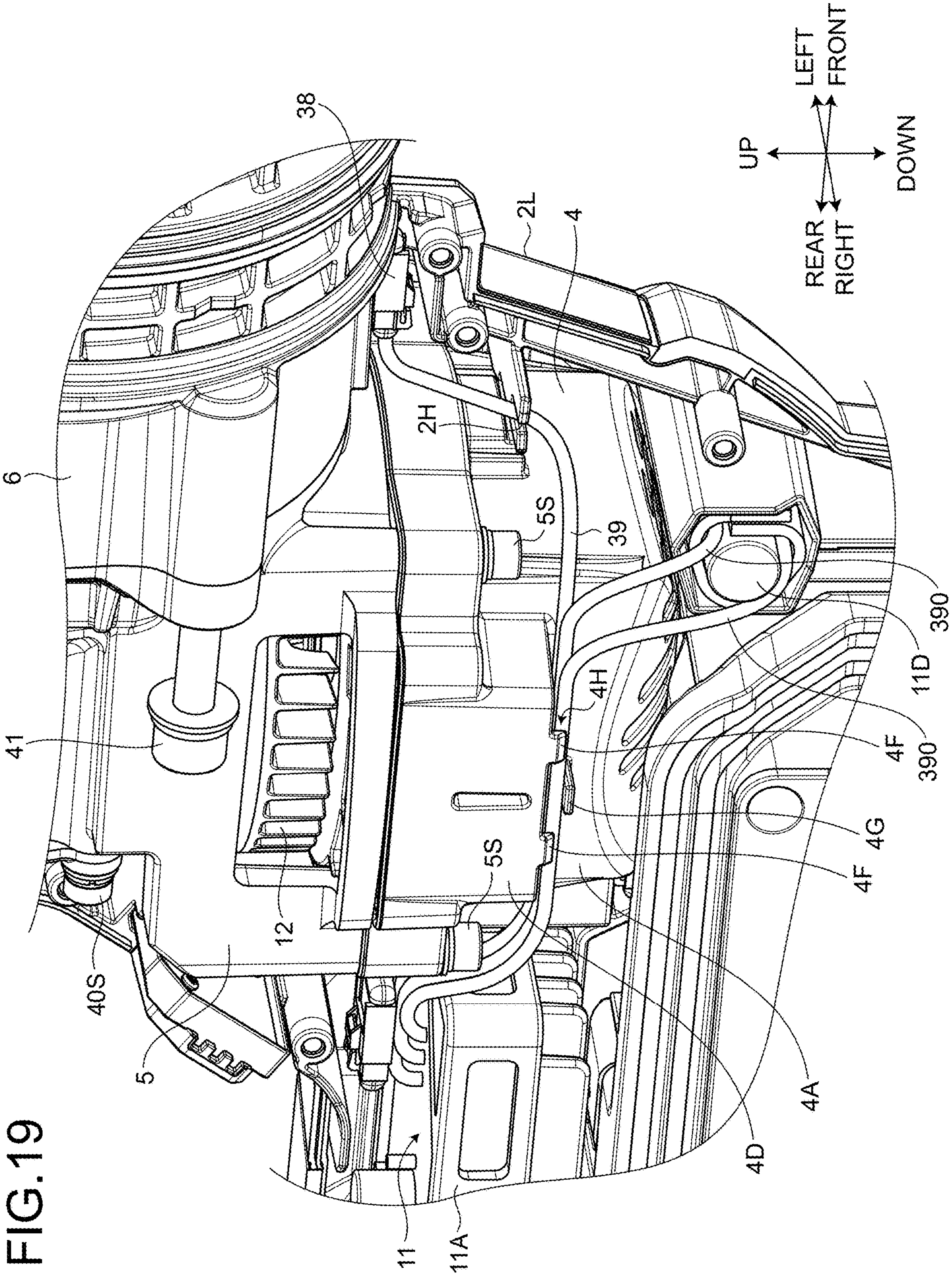
FIG. 19 is a front right-side perspective view illustrating a part of the impact tool according to the embodiment.
Figure 20:
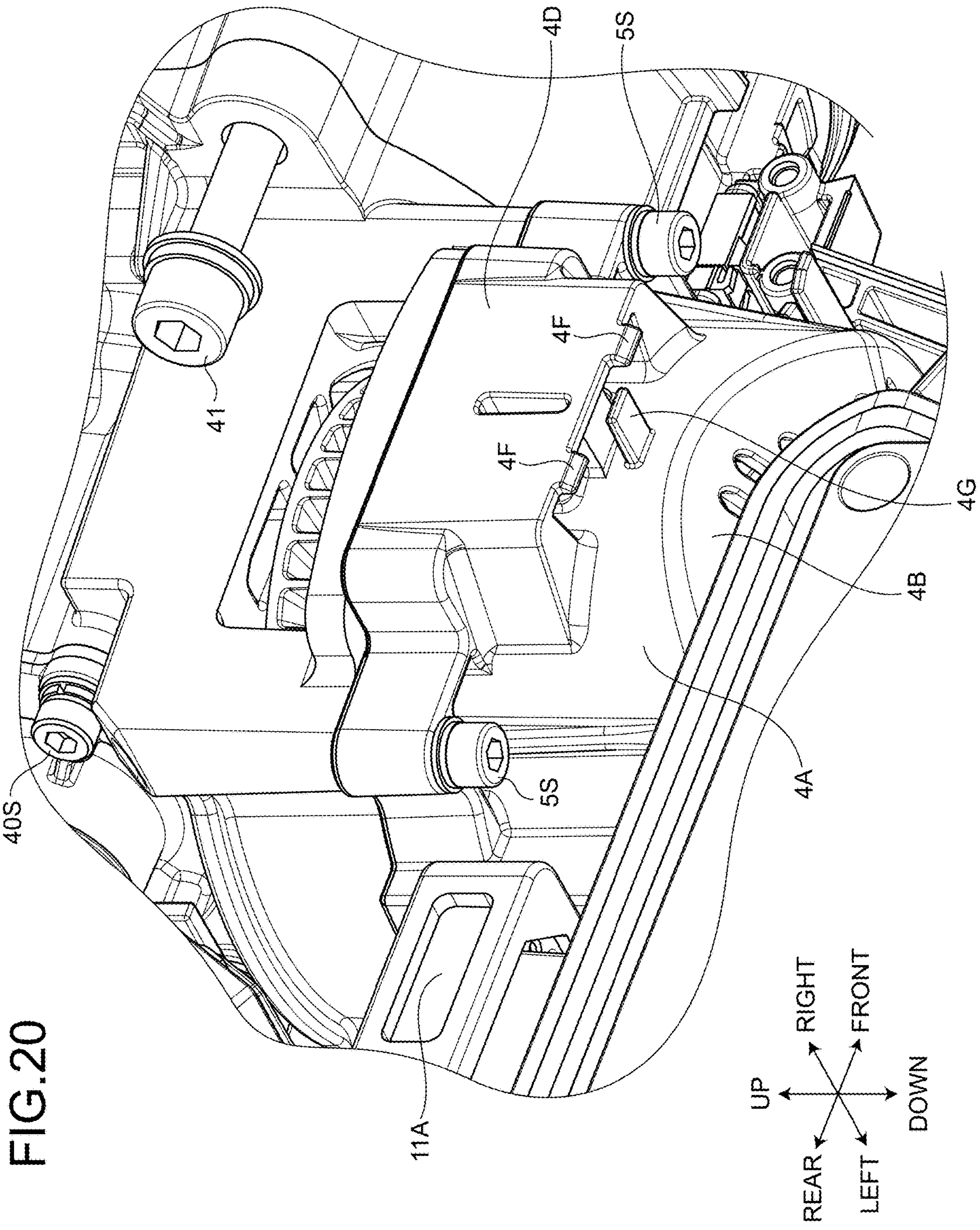
FIG. 20 is a lower rear right-side perspective view illustrating a part of the impact tool according to the embodiment.

FIG. 18 is a right side view of a part of the impact tool 1 according to the embodiment and corresponds to a view in which the right main body housing 2R is removed from the impact tool 1. FIG. 19 is a front right-side perspective view illustrating a part of the impact tool 1 according to the embodiment, and corresponds to an enlarged partial view of FIG. 18. FIG. 20 is a lower rear-right side perspective view illustrating a part of the impact tool 1 according to the embodiment and corresponds to an enlarged partial view of FIG. 18.

The motor case 4 includes a holder mechanism 4H that holds the lead wire 39. FIG. 19 illustrates an example of the lead wire 39. Although FIG. 19 illustrates an example in which the number of lead wires 39 is one, the lead wire 39 may be provided in plurality.

The holder mechanism 4H holds the lead wire 39 passing through the outside of the motor case 4. The holder mechanism 4H holds the lead wire 39 passing through the right side of the motor case 4. The holder mechanism 4H holds the lead wire 39 extending in the front-rear direction. The rear end of the lead wire 39 is disposed rearward of the motor case 4. The front end of the lead wire 39 is disposed forward of the motor case 4.

The holder mechanism 4H holds the lead wire 39 connected to the controller 11. The controller 11 is disposed rearward of the motor case 4. The holder mechanism 4H holds a lead wire 39 connected to an electronic device or an electronic component disposed outside the motor case 4. The holder mechanism 4H holds the lead wire 39 that is not connected to the motor 10. The holder mechanism 4H holds the lead wire 39 connected to an electronic device or an electronic component disposed forward of the motor case 4. In the embodiment, the electronic device disposed forward of the motor case 4 includes the light emitter unit 90. The electronic component disposed forward of the motor case 4 includes the LED chip 95B.

In the embodiment, the connector 38 is disposed forward of the motor case 4. The connector 38 is electrically connected to the chip-on-board light emitting diode 95 of the light emitter unit 90 to energize the chip-on-board light emitting diode 95 of the light emitter unit 90. The connector 38 is connected to the chip-on-board light emitting diode 95 of the light emitter unit 90 by a lead wire (not illustrated). The connector 38 is connected to the substrate 95A of the chip-on-board light emitting diode 95 by a lead wire (not illustrated). The connector 38 is accommodated in the main body portion 21 of the main body housing 2. The connector 38 is disposed on the lower side of the first tube portion 61 of the hammer case 6. The connector 38 is disposed on the front side of the motor case 4. In the left-right direction, the center of the connector 38 coincides with the center of the motor case 4. The connector 38 is fixed to the lower surface of the first tube portion 61. The connector 38 may be fixed to the main body portion 21.

A rear end of the lead wire 39 is connected to the controller 11. A front end of the lead wire 39 is connected to the connector 38. The lead wire 39 connects the controller 11 and the connector 38 to each other. The lead wire 39 is connected to the substrate 95A of the light emitter unit 90 via the connector 38. The controller 11 is connected to the substrate 95A of the light emitter unit 90 via the lead wire 39 and the connector 38. The holder mechanism 4H holds an intermediate part of the lead wire 39 connected to the controller 11 and the connector 38.

The lead wire 39 supplies power to the light emitter unit 90. The power from the battery pack 43 is supplied to the light emitter unit 90 via the controller 11, the lead wire 39, and the connector 38. The LED chip 95B of the light emitter unit 90 emits light based on the power supplied via the controller 11, the lead wire 39, and the connector 38.

The holder mechanism 4H includes: a base rib 4G protruding from the right part of the motor case 4; and hook ribs 4F each protruding from the right part of the motor case 4. The base rib 4G and the hook ribs 4F are each provided on the outer surface of the motor case 4.

The base rib 4G protrudes rightward from the right side surface of the tube portion 4A. The number of the base ribs 4G is one. The base rib 4G is not provided on the left side surface of the tube portion 4A. The base rib 4G supports the lead wire 39 from the lower side.

The hook ribs 4F are disposed on the upper side of the base rib 4G. The hook ribs 4F are separated from the base rib 4G. In the embodiment, the motor case 4 has a protruding portion 4D protruding laterally from the upper part of the outer circumferential surface of the tube portion 4A. The outer shape of the protruding portion 4D is substantially a rectangular parallelepiped shape. As illustrated in diagrams such as FIGS. 26, 27, and 28, the protruding portion 4D is provided in each part, namely, the upper part of the left side surface and the upper part of the right side surface of the tube portion 4A. The hook ribs 4F are disposed on the protruding portion 4D provided on the right side surface of the tube portion 4A. The number of the hook ribs 4F is two. The hook ribs 4F are not provided on the protruding portion 4D on the left side surface of the tube portion 4A. In the up-down direction, the lead wire 39 is disposed between the base rib 4G and the hook ribs 4F. The hook ribs 4F support the lead wire 39 from the right side so as to prevent the lead wire 39 supported by the base rib 4G from falling off from the base rib 4G.

The hook ribs 4F protrude downward from the right end of the lower surface of each of the protruding portions 4D. The two hook ribs 4F are disposed at intervals in the front-rear direction. In the up-down direction, the position (height) of the hook rib 4F disposed on the front side and the position (height) of the hook rib 4F disposed on the rear side are substantially the same. The base rib 4G protrudes rightward from the right side surface of the tube portion 4A on the lower side of the protruding portion 4D. In the front-rear direction, the base rib 4G is disposed between the front-side hook rib 4F and the rear-side hook rib 4F.

As illustrated in FIG. 19, the left main body housing 2L includes a holder 2H that holds the lead wire 39. The holder 2H has a recess into which the lead wire 39 is inserted. The holder 2H protrudes rightward from the right end surface of the left main body housing 2L. The holder 2H is disposed forward of the motor case 4. The holder 2H is disposed downward of the connector 38. In the up-down direction, the holder 2H is disposed upward of the hook ribs 4F. The lead wire 39 is held by the holder 2H between the holder mechanism 4H and the connector 38.

As illustrated in FIG. 19, an electronic component 11D is disposed between the controller 11 and the light emitter unit 90 in the front-rear direction. An example of the electronic component 11D is a capacitor. The electronic component 11D is accommodated in the main body portion 21 or the protruding portion 22 of the main body housing 2. The electronic component 11D is disposed on the lower side of the motor case 4. In the left-right direction, the center of the electronic component 11D coincides with the center of the motor case 4. The electronic component 11D is fixed to the main body portion 21 or the protruding portion 22. The electronic component 11D may be fixed to the lower surface of the motor case 4.

A lead wire 390 is connected to the electronic component 11D. The holder mechanism 4H holds the lead wire 390 connected to the electronic component 11D. When the controller 11 and the electronic component 11D are connected to each other by the lead wire 390, the holder mechanism 4H can hold an intermediate part of the lead wire 390 connecting the controller 11 and the electronic component 11D.

Motor Case and Gear Case

Figure 23:
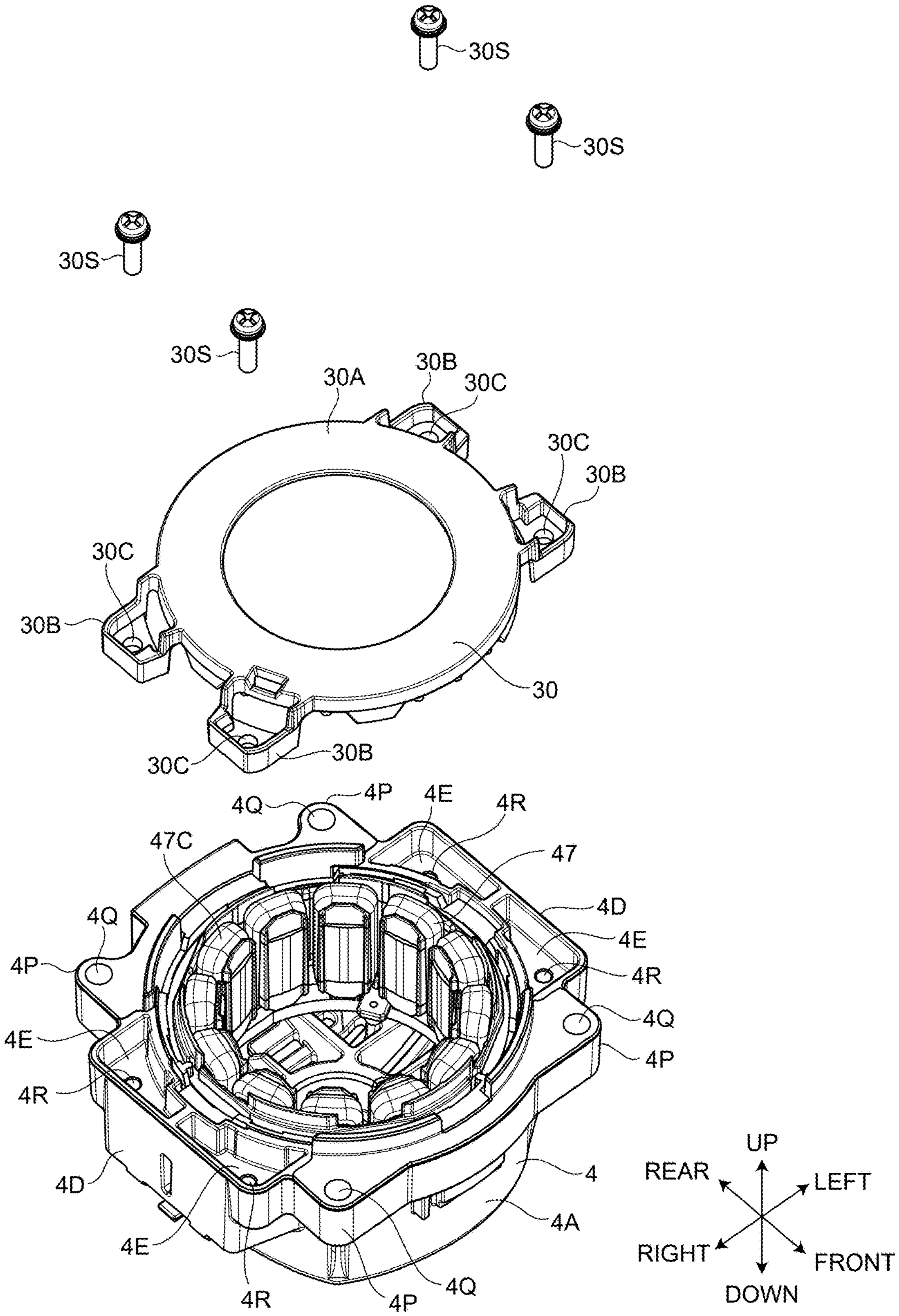
FIG. 23 is a front right-side exploded perspective view illustrating a motor case and a baffle plate according to the embodiment.
Figure 24:
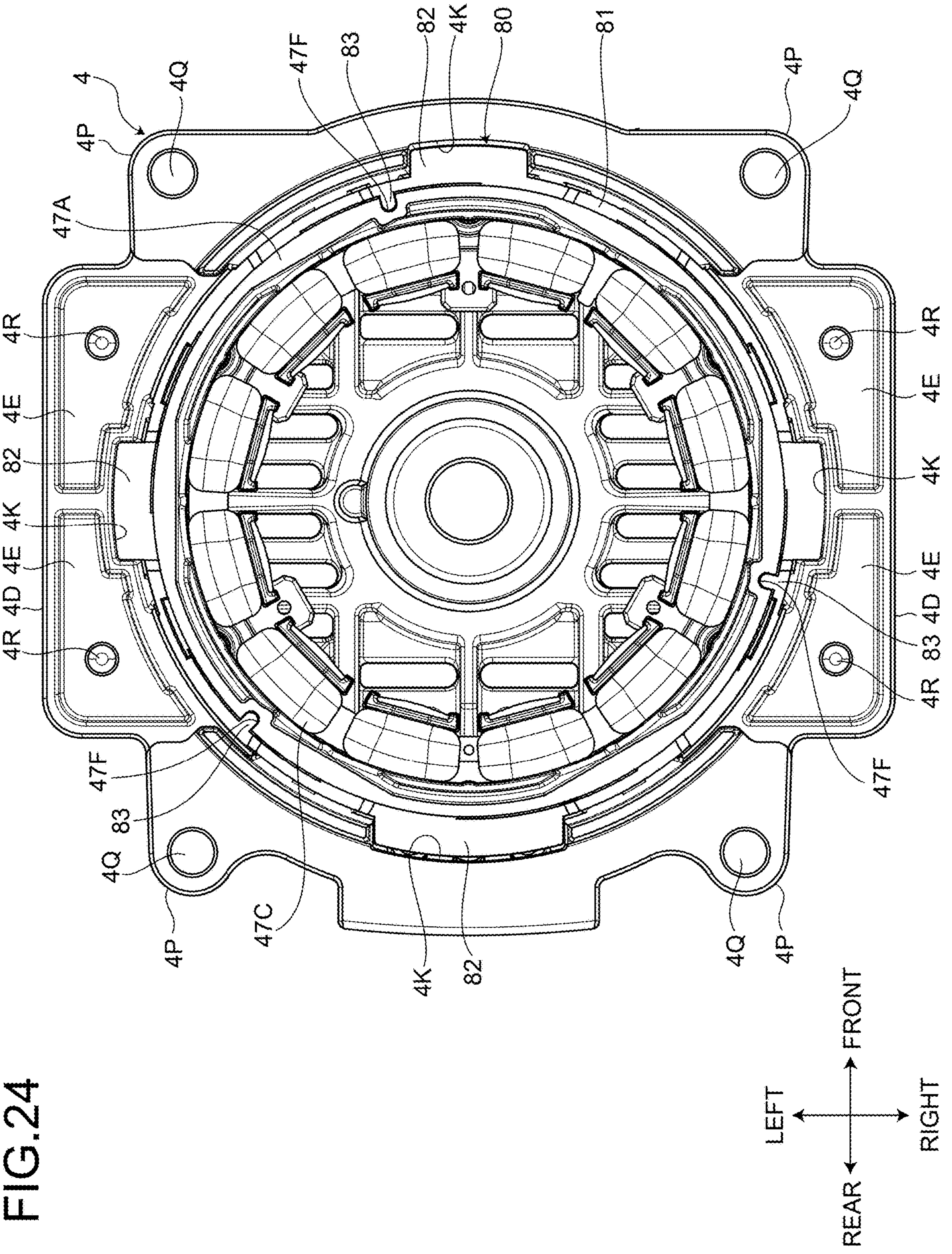
FIG. 24 is an upper view of the motor case, an inner member, and a stator according to the embodiment.
Figure 25:
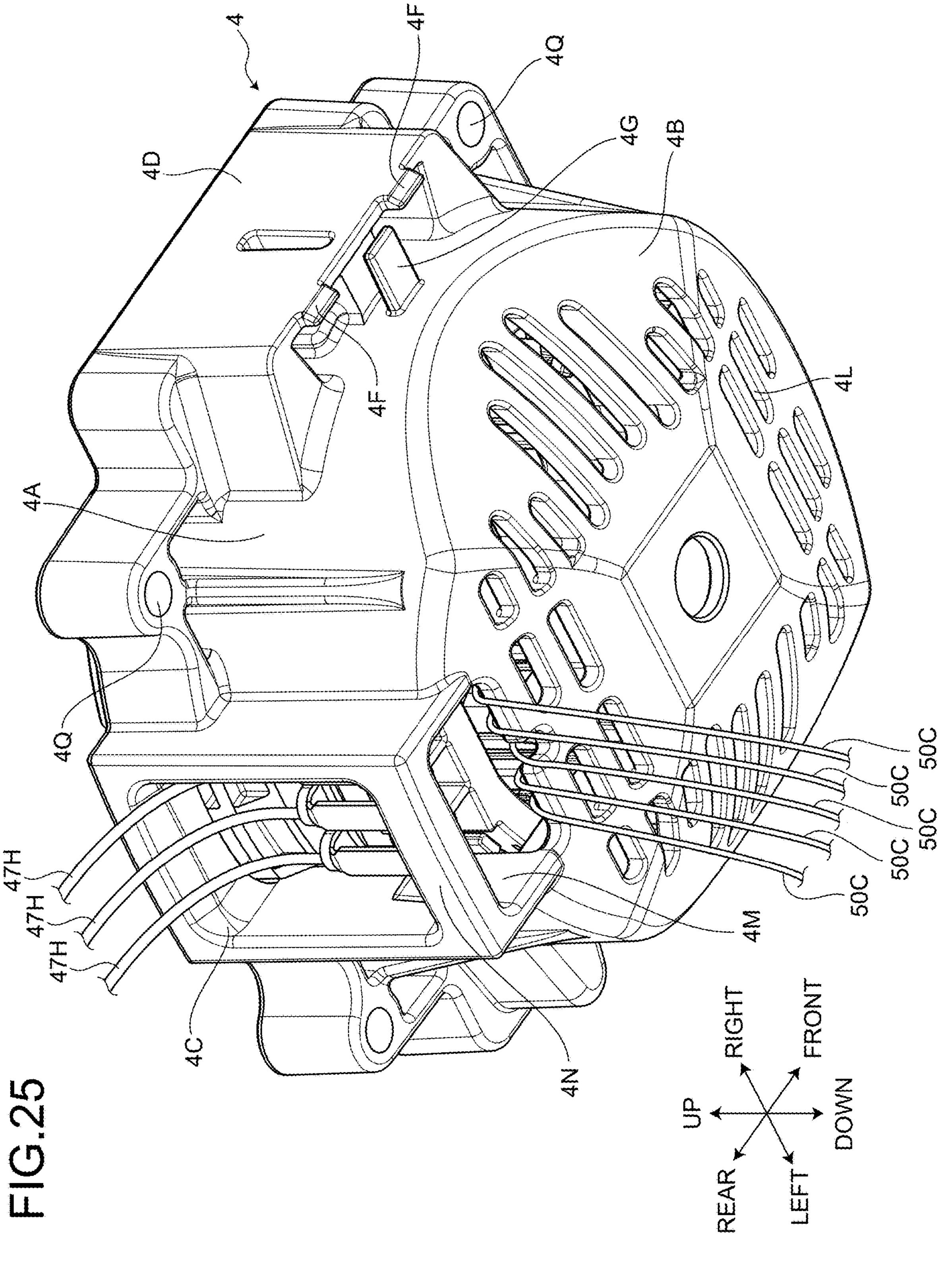
FIG. 25 is a lower rear right-side view of the motor case, an inner member, and a stator according to the embodiment.
Figure 26:
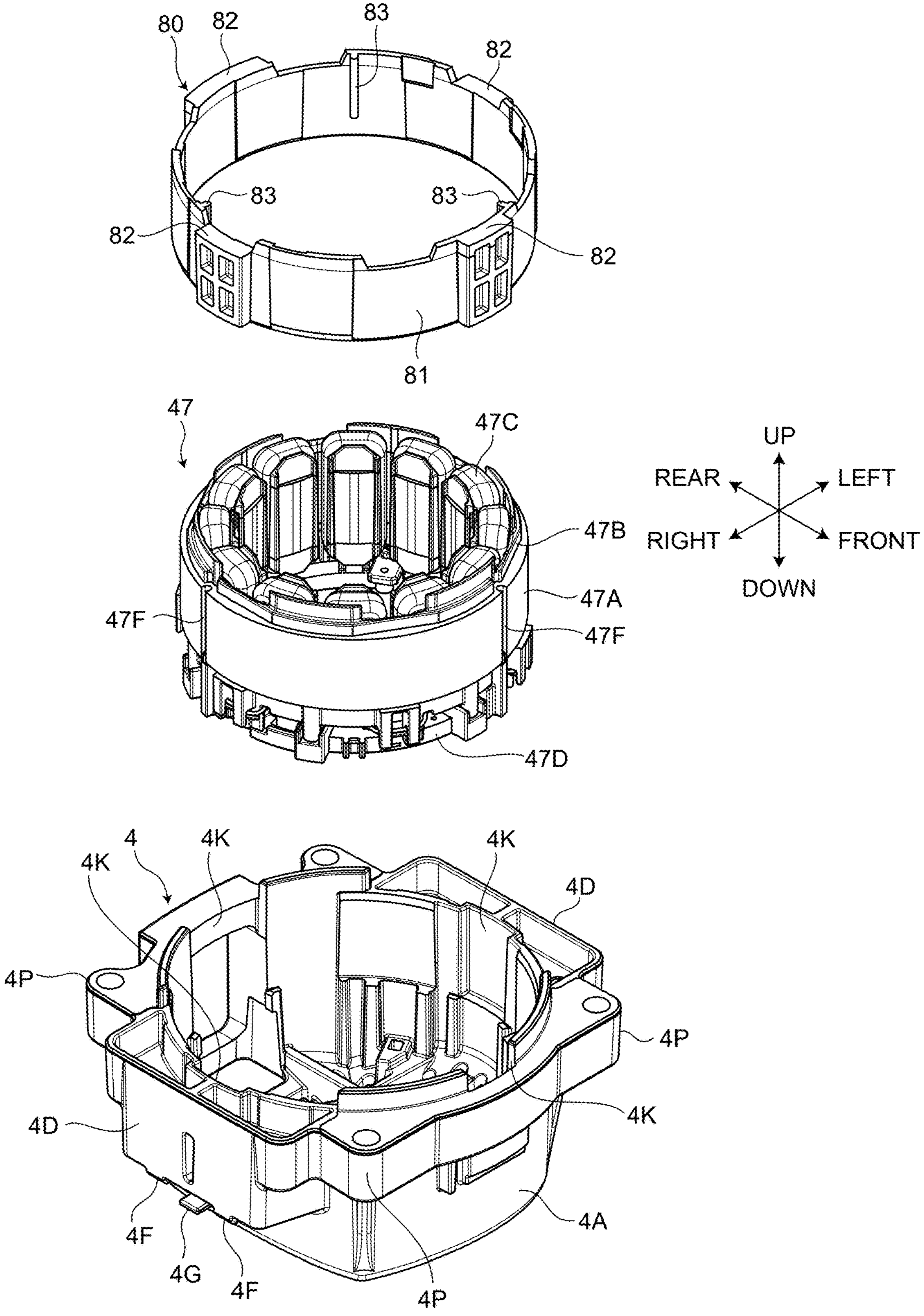
FIG. 26 is front right-side exploded perspective view illustrating the motor case, the inner member, and the stator according to the embodiment.
Figure 27:
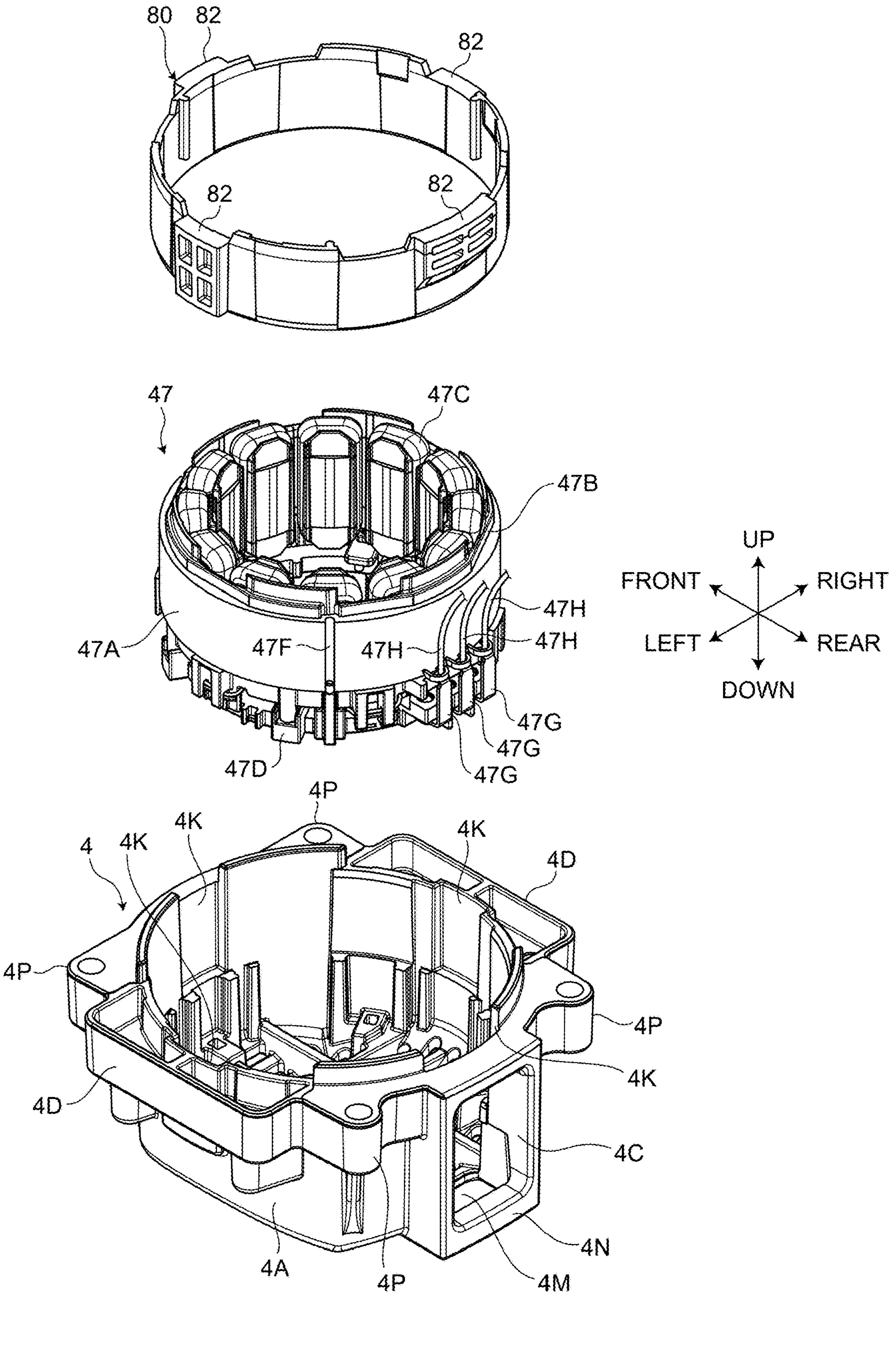
FIG. 27 is a rear left-side exploded perspective view illustrating the motor case, the inner member, and the stator according to the embodiment.
Figure 28:
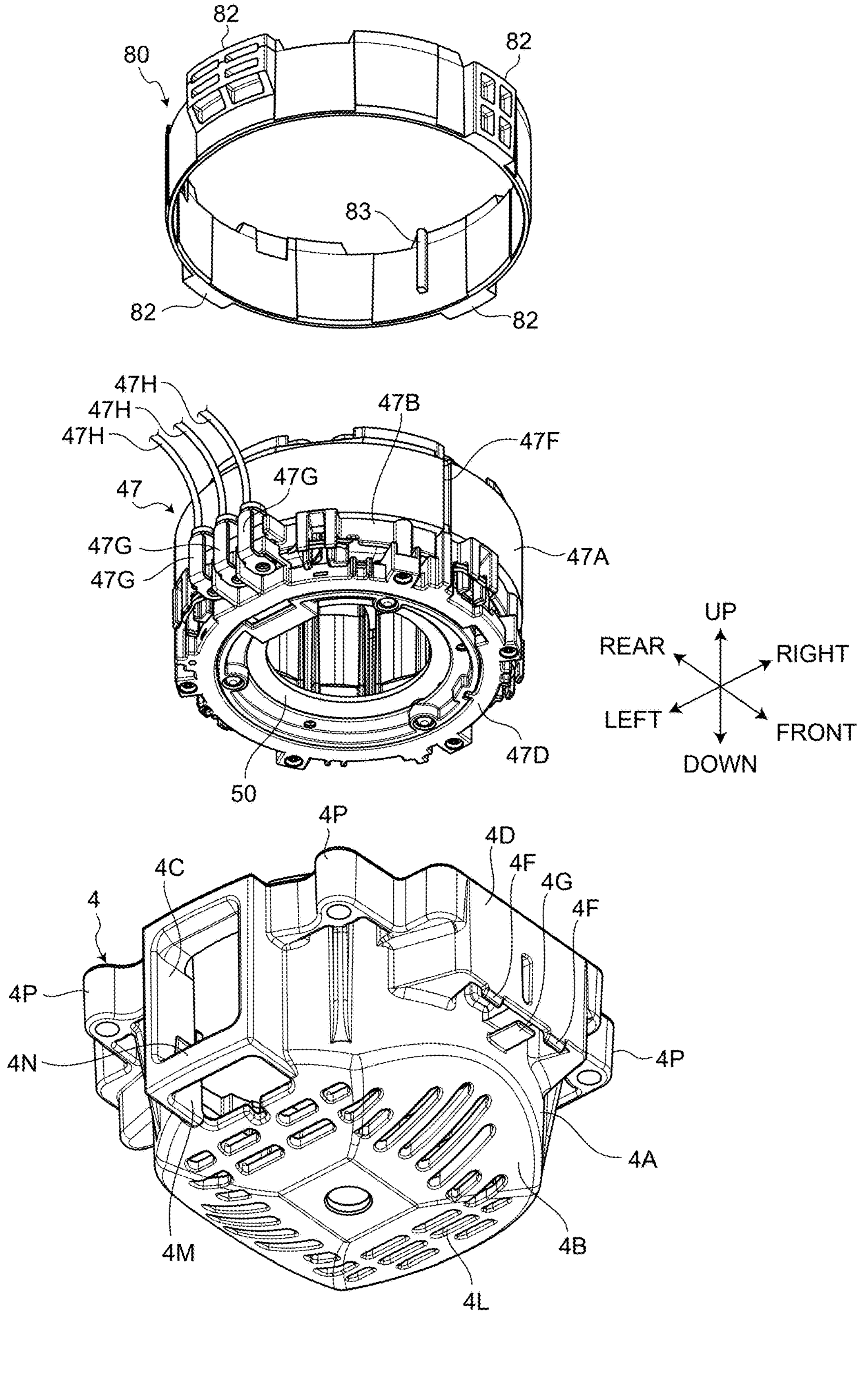
FIG. 28 is a lower rear right-side exploded perspective view illustrating the motor case, the inner member, and the stator according to the embodiment.

FIG. 21 is a front right-side exploded perspective view illustrating a part of the impact tool 1 according to the embodiment; FIG. 22 is a rear left-side exploded perspective view illustrating a part of the impact tool 1 according to the embodiment from the left rear side. FIG. 23 is a front right-side exploded perspective view illustrating the motor case 4 and a baffle plate 30 according to the embodiment. FIG. 24 is an upper view of the motor case 4, the inner member 80, and the stator 47 according to the embodiment. FIG. 25 is a lower rear right side-view of the motor case 4, the inner member 80, and the stator 47 according to the embodiment. FIG. 26 is front right-side exploded perspective view illustrating the motor case 4, the inner member 80, and the stator 47 according to the embodiment. FIG. 27 is a rear left-side exploded perspective view from the left rear side illustrating the motor case 4, the inner member 80, and the stator 47 according to the embodiment. FIG. 28 is a lower rear right-side exploded perspective view illustrating the motor case 4, the inner member 80, and the stator 47 according to the embodiment. FIG. 29 is a rear right-side exploded perspective view illustrating the gear case 5 and the bearing cover 40 according to the embodiment.

In the following explanation, a direction parallel to the motor rotation axis MX is appropriately referred to as an axial direction, a direction around the motor rotation axis MX is appropriately referred to as a circumferential direction or a rotation direction, and a radiating direction of the motor rotation axis MX is appropriately referred to as a radial direction. In the radial direction, a position close to or a direction approaching the motor rotation axis MX is appropriately referred to as an inward or inner side in the radial direction, and a position far from or a direction away from the motor rotation axis MX is appropriately referred to as an outward or outer side in the radial direction.

The motor case 4 holds the stator 47. The motor case 4 holds the stator 47 via the inner member 80. The motor case 4 is disposed on the lower side of the gear case 5. The motor case 4 is fixed to the gear case 5.

The motor case 4 is made of a magnesium alloy. An example of the magnesium alloy forming the motor case 4 is MDC1D being a Mg—Al—Zn-based magnesium alloy. The motor case 4 is manufactured with a die casting method. The specific gravity of the magnesium alloy is lower than the specific gravity of aluminum. The strength of the magnesium alloy is higher than the strength of a synthetic resin such as a polycarbonate resin. With the motor case 4 manufactured with a magnesium alloy, it is possible achieve both high strength and light weight of the motor case 4.

The motor case 4 includes: a tube portion 4A disposed around the motor 10; a lower wall 4B disposed at a lower end of the tube portion 4A; protruding portions 4D provided at an upper part of a left side surface and an upper part of a right side surface of the tube portion 4A; and a plurality of screw bosses 4P disposed around an upper end of the tube portion 4A. The tube portion 4A, the lower wall 4B, the protruding portion 4D, and the screw boss 4P are integrated with each other.

The gear case 5 accommodates at least a part of the speed reduction mechanism 13. The gear case 5 is disposed on the rear side of the hammer case 6. The gear case 5 is fixed to the hammer case 6.

The gear case 5 is made of a magnesium alloy. An example of the magnesium alloy forming the gear case 5 is MDC1D being a Mg—Al—Zn-based magnesium alloy. The gear case 5 is manufactured with a die casting method. The specific gravity of the magnesium alloy is lower than the specific gravity of aluminum. The strength of the magnesium alloy is higher than the strength of a synthetic resin such as a polycarbonate resin. With the gear case 5 manufactured with a magnesium alloy, it is possible achieve both high strength and light weight of the gear case 5.

The gear case 5 has a substantially tubular shape. An opening is provided in a front part of the gear case 5. An opening is provided in the rear part of the gear case 5. An opening is provided in a lower part of the gear case 5. The bearing cover 40 is disposed in the opening provided in the rear part of the gear case 5. The bearing cover 40 is fixed to the rear part of the gear case 5 by three screws 40S. As illustrated in FIG. 29, three screw bosses 40A are provided on the peripheral edge of the bearing cover 40. Openings 40B are provided in the respective three screw bosses 40A. The screws 40S are inserted into the openings 40B from the rear side of the bearing cover 40. The screws 40S are inserted into screw holes 5C provided at the rear end of the gear case 5. The screws 40S are inserted into the openings 40B of the screw bosses 40A from the rear side of the screw bosses 40A, and then inserted into the screw holes 5C provided at the rear end of the gear case 5.

The gear case 5 and the hammer case 6 are fixed by four screws 41. Four screw bosses 5B are provided on the peripheral edge of the front part of the gear case 5. Four screw bosses 6B are provided at a peripheral edge on the rear part of the hammer case 6. The screws 41 are inserted into openings formed in screw bosses 5B of the gear case 5. The screws 41 are inserted into screw holes provided in the screw bosses 6B of the hammer case 6. The screws 41 are inserted into the openings of the screw bosses 5B from the rear side of the screw bosses 5B, and then inserted into the screw holes of the screw bosses 6B.

An opening is provided at an upper part of the motor case 4. An opening is provided in a lower part of the gear case 5. The internal space of the motor case 4 and the internal space of the gear case 5 are connected to each other via the opening at the upper part of the motor case 4 and the opening at the lower part of the gear case 5. The motor case 4 and the gear case 5 are fixed by four screws 5S. Four screw bosses 4P are provided on a peripheral edge of the upper part of the motor case 4. Openings 4Q are provided in the respective four screw bosses 4P. The screws 5S are inserted into the openings 4Q from the lower side of the screw bosses 4P. The screws 5S are inserted into screw holes provided at the lower end of the gear case 5. The screws 5S are inserted into the openings 4Q of the screw bosses 4P from the lower side of the screw bosses 4P, and then inserted into the screw holes provided at the lower end of the gear case 5.

The stator 47 includes: the stator core 47A; the insulator 47B fixed to the stator core 47A; and the coils 47C each wound around the respective teeth of the stator core 47A via the insulator 47B. In the embodiment, the number of coils 47C is twelve. The coils 47C are connected via the busbar unit 47D. The busbar unit 47D is fixed to the lower part of the insulator 47B.

The busbar unit 47D includes three power supply terminals 47G. Lead wires 47H are connected to the power supply terminals 47G. One lead wire 47H is connected to one power supply terminal 47G. The controller 11 and the power supply terminals 47G are connected to each other via the lead wires 47H. The lead wires 47H supply power to the coils 47C of the stator 47. Power from the battery pack 43 is supplied to the coils 47C via the controller 11, the lead wires 47H, and the power supply terminals 47G. The motor 10 is driven based on the power supplied via the controller 11, the lead wires 47H, and the power supply terminals 47G.

The inner member 80 is disposed between the outer circumferential surface of the stator core 47A and the inner circumferential surface of the tube portion 4A of the motor case 4. The inner member 80 has a substantially annular shape. The inner member 80 is made of synthetic resin. The inner member 80 is made of a glass fiber-reinforced polycarbonate resin.

The inner member 80 includes: a base portion 81 having an annular shape; outer protrusions 82 projecting outward in the radial direction from an outer circumferential surface of the base portion 81; and inner protrusions 83 projecting inward in the radial direction from an inner circumferential surface of the base portion 81. Four outer protrusions 82 are provided at intervals in the circumferential direction. The outer shape of the outer protrusion 82 is substantially a rectangular parallelepiped shape long in the up-down direction. Three inner protrusions 83 are provided at intervals in the circumferential direction. The inner protrusion 83 is long in the up-down direction.

After the stator 47 is press-fitted into the inner member 80, the inner member 80 is press-fitted into the motor case 4. The stator 47 is fixed to the inner member 80. The stator 47 is fixed to the motor case 4 via the inner member 80.

Grooves 47F are provided on the outer circumferential surface of the stator core 47A. The grooves 47F are long in the up-down direction. Three grooves 47F are provided at intervals in the circumferential direction. The inner protrusions 83 are inserted into the grooves 47F. With the inner protrusions 83 inserted into the grooves 47F, it is possible to prevents a change in the relative position between the stator 47 and the inner member 80 in the rotation direction.

Recesses 4K are provided on an inner circumferential surface of the tube portion 4A of the motor case 4. The recesses 4K are long in the up-down direction. Four recesses 4K are provided at intervals in the circumferential direction. The outer protrusions 82 are inserted into the recesses 4K. With the outer protrusions 82 inserted into the recesses 4K, it is possible to prevent a change in the relative position between the inner member 80 and the motor case 4 in the rotation direction.

The opening 4C is provided in the rear part of the tube portion 4A of the motor case 4. An opening 4M is provided in a rear part of the lower wall 4B of the motor case 4. A reinforcement rib 4N is provided at a boundary between the opening 4C and the opening 4M. The left end of the reinforcement rib 4N is fixed to the tube portion 4A or the lower wall 4B. The right end of the reinforcement rib 4N is fixed to the tube portion 4A or the lower wall 4B. The reinforcement rib 4N is integrated with the tube portion 4A and the lower wall 4B. The lower wall 4B has a plurality of ventilation ports 4L.

As described with reference to FIG. 11, the sensor substrate 50 is fixed to the busbar unit 47D of the stator 47. The sensor substrate 50 is accommodated in the motor case 4. The sensor substrate 50 includes: the circuit substrate 50A and the magnetic sensor 50B supported by the circuit substrate 50A. The sensor substrate 50 detects the position of the rotor 48 in the rotation direction. A plurality of lead wires 50C are connected to the sensor substrate 50. As illustrated in FIG. 25, the number of lead wires 50C connected to the sensor substrate 50 is five. The lead wires 50C connect the sensor substrate 50 and the controller 11 to each other. A detection signal of the magnetic sensor 50B is transmitted to the controller 11 via the lead wires 50C. The controller 11 controls the motor 10 based on the detection signal from the magnetic sensor 50B.

As illustrated in FIG. 25, the lead wires 47H connecting the power supply terminals 47G of the stator 47 and the controller 11 passes through the opening 4C provided at the rear part of the tube portion 4A. The lead wires 50C connecting the sensor substrate 50 and the controller 11 passes through the opening 4M provided at the rear part of the lower wall 4B.

The controller 11 is disposed on the rear side of the motor case 4. The power supply terminals 47G are disposed on the rear side of the stator core 47A inside the motor case 4. With the lead wires 47H passing through the opening 4C provided at the rear part of the tube portion 4A, it is possible to prevent a situation in which the lead wires 47H are excessively bent or excessive tension acts on the lead wires 47H.

The controller 11 is disposed on the rear side of the motor case 4. The sensor substrate 50 is disposed on the lower side of the stator core 47A inside the motor case 4. With the lead wires 50C passing through the opening 4M provided at the rear part of the lower wall 4B, it is possible to prevent a situation in which the lead wires 50C are excessively bent or excessive tension acts on the lead wires 50C.

With the reinforcement rib 4N disposed at the boundary between the opening 4C and the opening 4M, it is possible to prevent deterioration of strength of the motor case 4.

The baffle plate 30 is disposed at the upper end of the motor case 4. The baffle plate 30 includes: a base portion 30A having an annular shape; and four screw bosses 30B provided at a peripheral edge of the base portion 30A. Each of the screw bosses 30B has an opening 30C.

Each of the protruding portions 4D of the motor case 4 has recesses 4E. The recesses 4E are provided so as to be recessed downward from the upper surface of each of the protruding portions 4D. The protruding portions 4D are provided in an upper part of the left side surface of the tube portion 4A and an upper part of the right side surface of the tube portion 4A. Two recesses 4E are provided in the front-rear direction in the protruding portion 4D provided on the left side surface of the tube portion 4A. Two recesses 4E are provided in the front-rear direction in the protruding portion 4D provided on the right side surface of the tube portion 4A. The four recesses 4E in total each have a screw hole 4R.

The base portion 30A is inserted into the opening of the upper end of the tube portion 4A. With the base portion 30A inserted into the opening of the upper end of the tube portion 4A, the screw bosses 30B are inserted into the respective recesses 4E. With the screw bosses 30B inserted into the recesses 4E, the openings 30C and the screw holes 4R are aligned with each other.

The baffle plate 30 is fixed to the upper end of the motor case 4 by the four screws 30S. The screws 30S are inserted into the openings 30C from the upper side of the screw bosses 30B. The screws 30S are inserted into a screw holes 4R provided in the recesses 4E of the motor case 4. The screws 30S are inserted into the openings 30C of the screw bosses 30B from the upper side of the screw bosses 30B, and then inserted into the screw holes 4R provided in the motor case 4. The screws 30S are joined to the screw holes 4R.

Grip Portion

Figure 30:
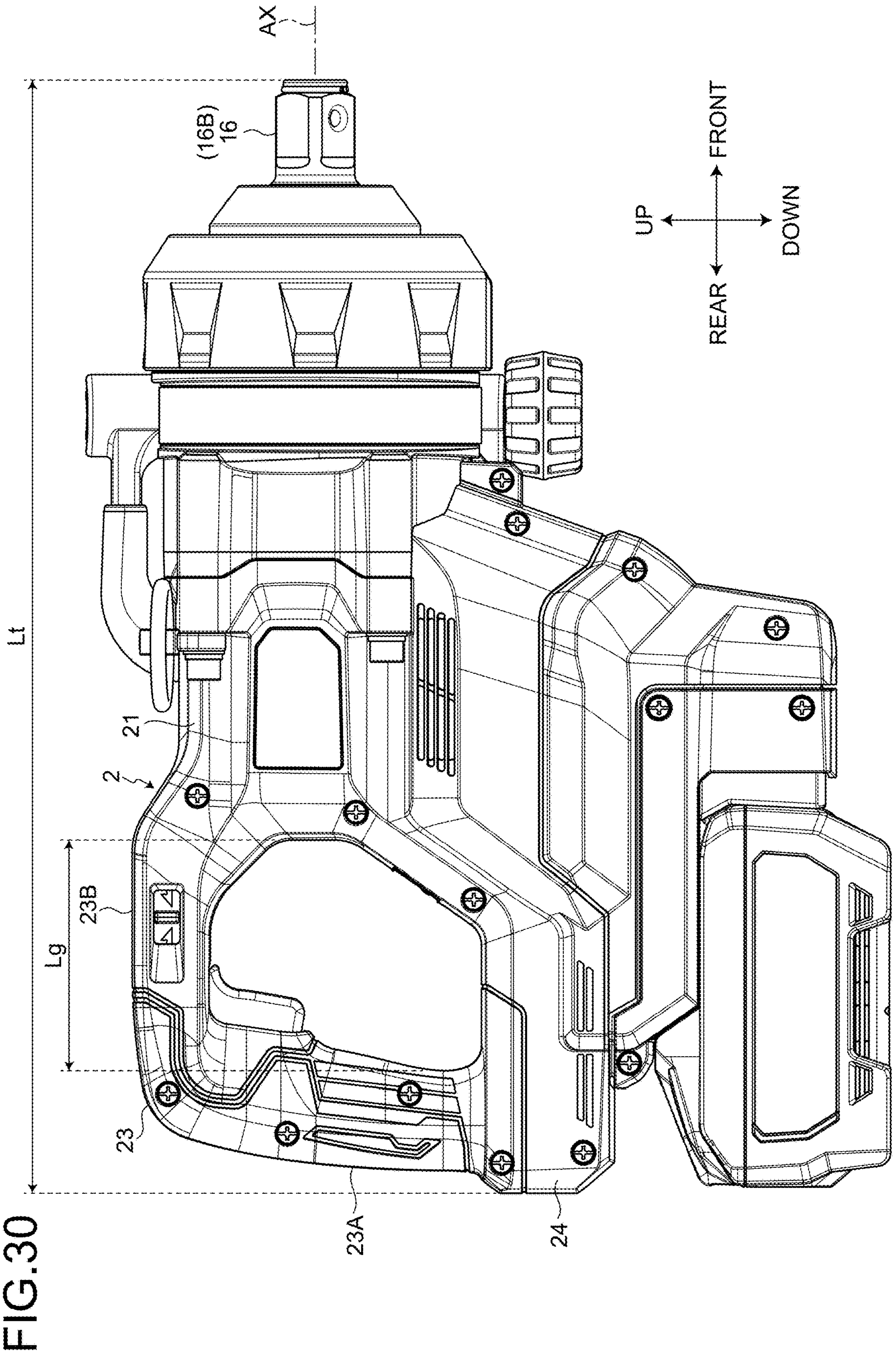
FIG. 30 is a right-side view of the impact tool according to the embodiment.

FIG. 30 is a right-side view of the impact tool 1 according to the embodiment. The grip portion 23 is gripped by an operator. The grip portion 23 is disposed on the rear side of the main body portion 21. The grip portion 23 includes; a rear grip portion 23A extending upward from the rear part of the controller accommodating portion 24; and an upper grip portion 23B extending forward from the upper end of the rear grip portion 23A. The lower end of the rear grip portion 23A is connected to the controller accommodating portion 24. An upper end of the rear grip portion 23A is connected to a rear end of the upper grip portion 23B. A front end of the upper grip portion 23B is connected to an upper part of the main body portion 21. The grip portion 23, the main body portion 21, and the controller accommodating portion 24 form a D-shaped handle. The D-shaped handle is disposed on the rear side of the motor 10.

An overall length Lt of the impact tool 1 is 440 mm or less. In the embodiment, the overall length Lt of the impact tool 1 is 435 mm. The overall length Lt of the impact tool 1 represents the maximum dimension of the impact tool 1 in the front-rear direction parallel to the output rotation axis AX. As illustrated in FIG. 30, in the embodiment, the overall length Lt of the impact tool 1 is a distance in the front-rear direction between the front end of the anvil 16 and the rear end of the main body housing 2. The rear end of the main body housing 2 is a rear end of the controller accommodating portion 24. The overall length Lt of the impact tool 1 is 440 mm or less, making it possible to achieve downsizing of the impact tool 1 and improve workability.

A space length Lg of the grip portion 23 is 90 mm or more. In the embodiment, the space length Lg of the grip portion 23 is 92 mm. The space length Lg of the grip portion 23 represents a maximum dimension of an inner-side space of the grip portion 23 in the front-rear direction parallel to the output rotation axis AX. The grip portion 23, the main body portion 21, and the controller accommodating portion 24 form a D-shaped handle. The inner-side space of the grip portion 23 refers to a space surrounded by the grip portion 23, the main body portion 21, and the controller accommodating portion 24. As illustrated in FIG. 30, in the embodiment, the space length Lg of the grip portion 23 is a distance in the front-rear direction between the lower end of the front surface of the rear grip portion 23A and the rear end of the main body portion 21.

Figure 31:
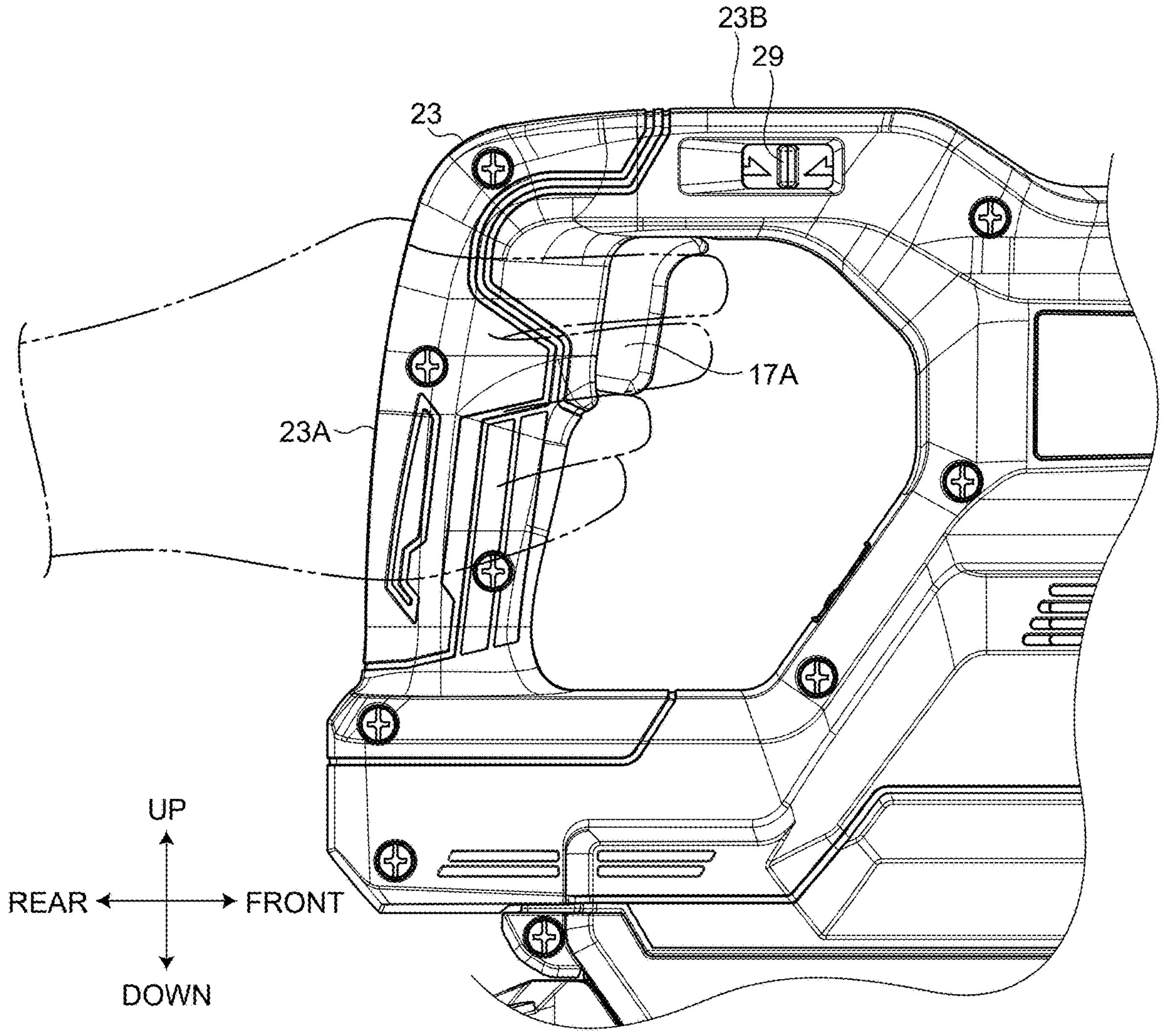
FIG. 31 is a diagram illustrating an example of how to grip a grip portion according to the embodiment.
Figure 32:
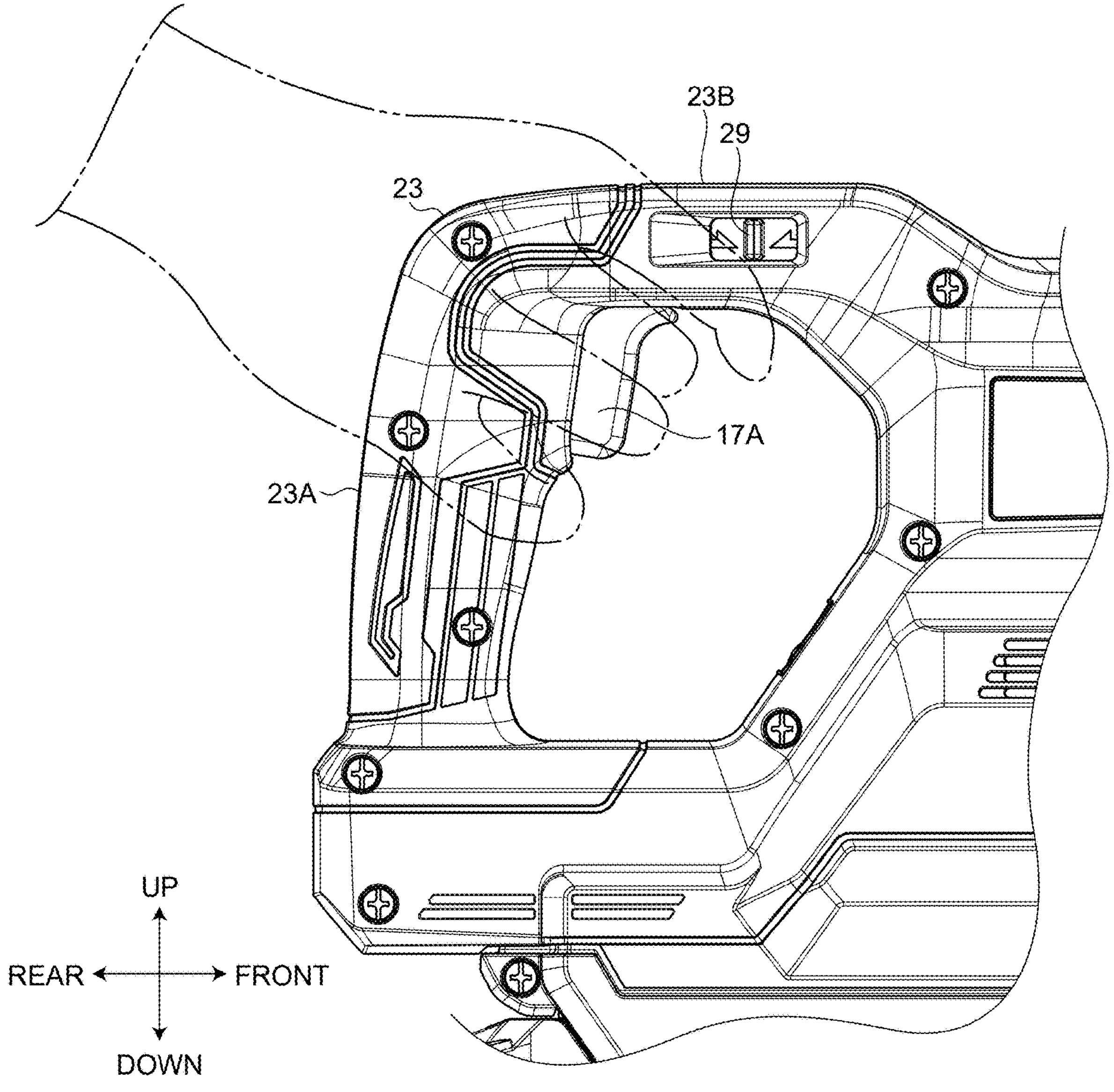
FIG. 32 is a diagram illustrating an example of how to grip a grip portion according to the embodiment.

FIGS. 31 and 32 are diagrams each illustrating an example of how to grip the grip portion 23 according to the embodiment. FIG. 31 illustrates a state in which the operator's right hand grips the rear grip portion 23A. FIG. 32 illustrates a state in which the operator's right hand grips the upper grip portion 23B while gripping a part of the rear grip portion 23A.

As illustrated in FIG. 31, the operator can pull the trigger lever 17A to the rear side with the index finger and the middle finger while gripping the rear grip portion 23A with the right hand. The operator can also slide the forward/reverse switching lever 29 in the front-rear direction with the index finger, for example, while gripping the rear grip portion 23A with the right hand.

As illustrated in FIG. 32, the operator can pull the trigger lever 17A to the rear side with the middle finger and the ring finger while gripping the rear grip portion 23A and the upper grip portion 23B with the right hand. The operator can also slide the forward/reverse switching lever 29 in the front-rear direction with the index finger, for example, while gripping the rear grip portion 23A and the upper grip portion 23B with the right hand.

As illustrated in FIG. 32, for example, depending on the position of the work target or the presence of an obstacle around the work target, the operator may pull the trigger lever 17A while gripping the rear grip portion 23A and the upper grip portion 23B. That is, depending on the work situation, the workability may be improved by the operator gripping the upper grip portion 23B. In the embodiment, since the space length Lg of the grip portion 23 is 90 mm or more, the operator can easily grip the upper grip portion 23B. This improves workability.

Interface Panel

Figure 33:
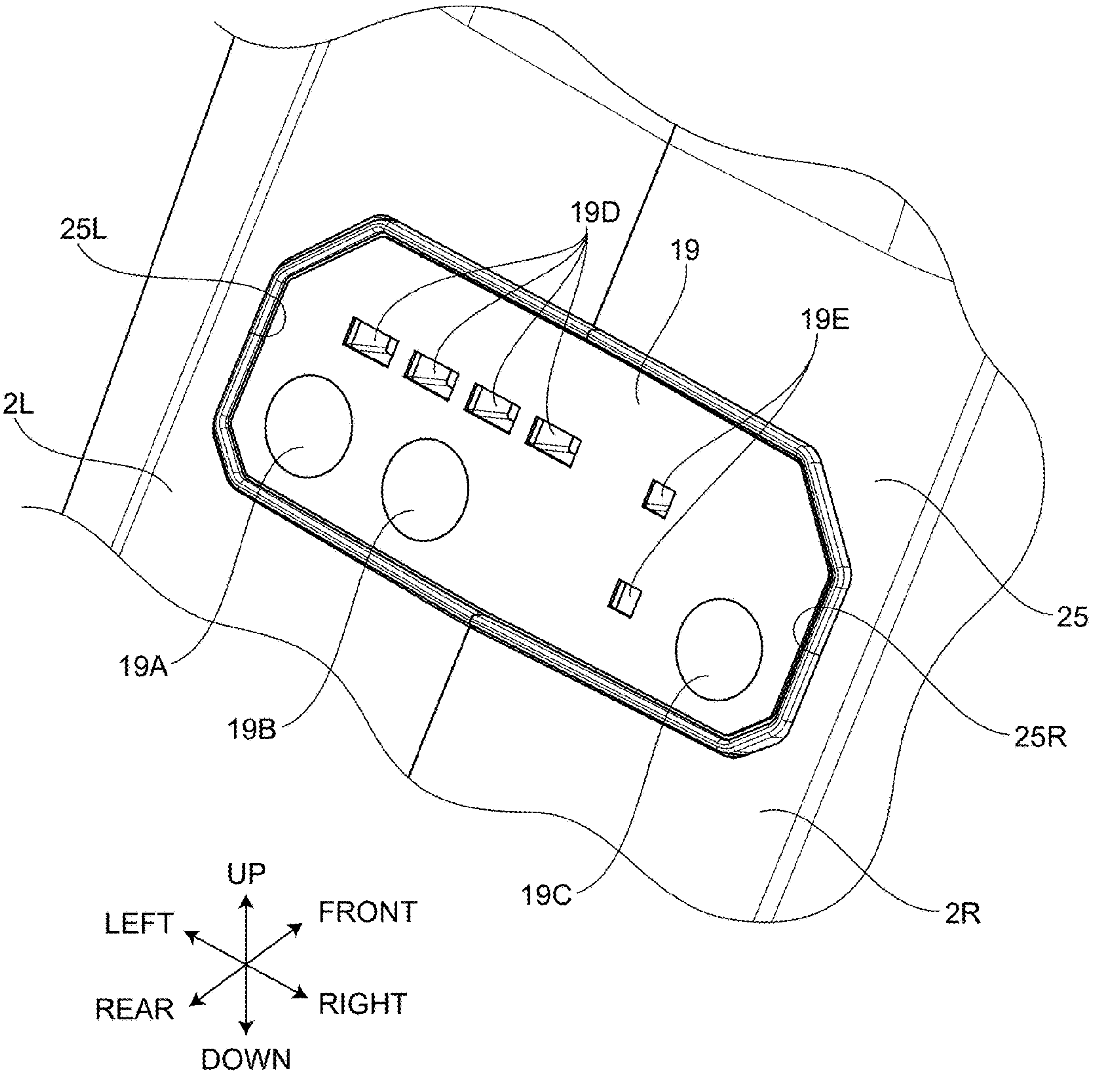
FIG. 33 is a rear right-side perspective view illustrating an interface panel according to the embodiment.
Figure 34:
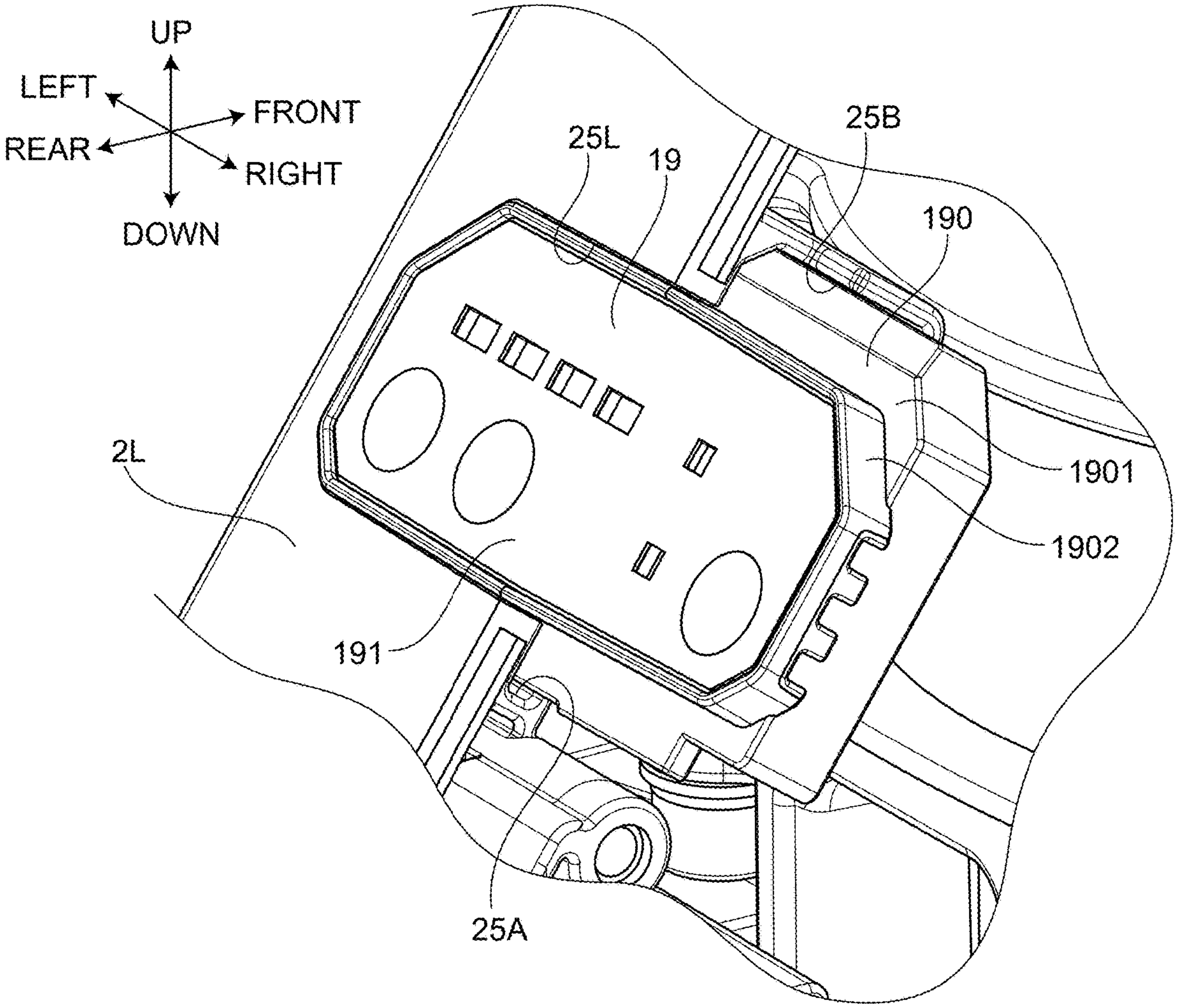
FIG. 34 is a rear right-side perspective view for illustrating a holding structure of the interface panel according to the embodiment.
Figure 35:
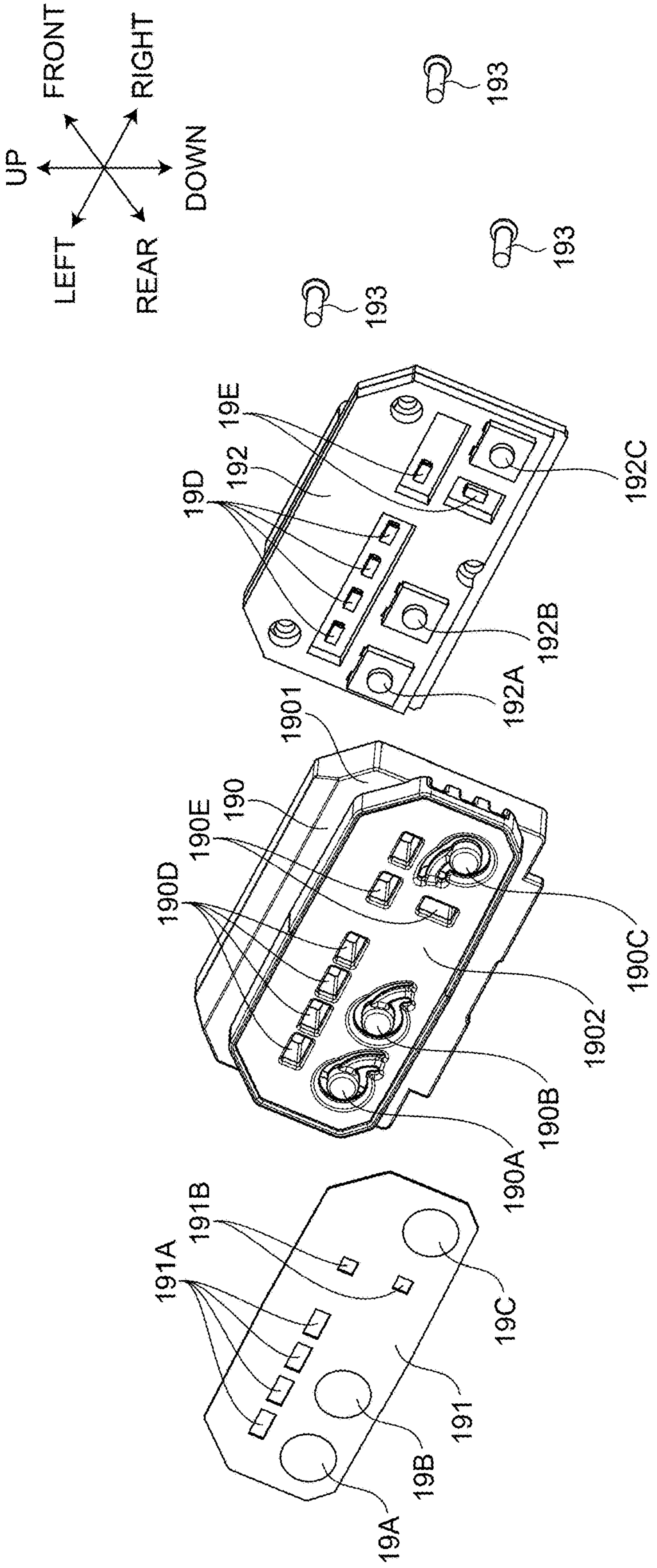
FIG. 35 is a rear right-side exploded perspective view illustrating the interface panel according to the embodiment.

FIG. 33 is a rear right-side perspective view illustrating the interface panel 19 according to the embodiment. FIG. 34 is a rear right-side perspective view for illustrating the holding structure of the interface panel 19 according to the embodiment. FIG. 35 is a rear right-side exploded perspective view illustrating the interface panel 19 according to the embodiment.

The interface panel 19 is disposed in the panel holding portion 25 of the main body housing 2. The panel holding portion 25 is disposed so as to extend upward from the front part of the controller accommodating portion 24 toward the front side. The surface of the interface panel 19 is inclined downward toward the rear side. Since the interface panel 19 is disposed in the panel holding portion 25, the operator can smoothly visually recognize the interface panel 19 while gripping the grip portion 23. That is, since the interface panel 19 is inclined downward toward the rear side, the operator can easily view the interface panel 19 during the work using the impact tool 1.

As illustrated in FIG. 33, the interface panel 19 includes an impacting force adjustment button 19A, a light intensity adjustment button 19B, an application button 19C, four adjustment light emitters 19D, and two application light emitters 19E. The impacting force adjustment button 19A is disposed on the left side of the light intensity adjustment button 19B. The light intensity adjustment button 19B is disposed on the left side of the application button 19C. The four adjustment light emitters 19D are disposed in the left-right direction. The two application light emitters 19E are disposed in the up-down direction. The four adjustment light emitters 19D are disposed on the upper side of the impacting force adjustment button 19A and the light intensity adjustment button 19B. The upper application light emitter 19E is disposed on the right side of the adjustment light emitter 19D. The lower application light emitter 19E is disposed between the light intensity adjustment button 19B and the application button 19C in the left-right direction.

Pressing the impacting force adjustment button 19A will adjust the impacting force of the impacting mechanism 15. The impacting force is adjusted in four stages. When the impacting force adjustment button 19A is pressed once, the impacting force decreases by one stage. When the impacting force adjustment button 19A is pressed once at the stage where the impacting force is the minimum value, the impacting force returns to the stage where the impacting force is the maximum value.

Pressing the light intensity adjustment button 19B will adjust the light emission intensity of the light emitter unit 90. The light emission intensity is adjusted in four stages. When the light intensity adjustment button 19B is pressed once, the light emission intensity decreases by one stage. When the light intensity adjustment button 19B is pressed once at the stage where the light intensity is the minimum value, the stage returns to the stage where the light emission intensity is the maximum value.

The four adjustment light emitters 19D are turned on or off based on the impacting force adjusted by the operation of the impacting force adjustment button 19A. When the impacting force is at the lowest level, one adjustment light emitter 19D is turned on. In a case where the impacting force is one stage higher than the lowest value stage, two emitters out of the four adjustment light emitters 19D are turned on. In a case where the impacting force is two stages higher than the minimum value stage, three emitters out of the four adjustment light emitters 19D are turned on. When the impacting force is at the highest value, all the four adjustment light emitters 19D are turned on.

The application button 19C is operated to adjust an adjustment item set by the operator, for example. The two application light emitters 19E are turned on or off based on the adjustment value of the adjustment item adjusted by the operation of the application button 19C.

The interface panel 19 is sandwiched between the left main body housing 2L and the right main body housing 2R in the left-right direction. In the panel holding portion 25, the left main body housing 2L has a recess 25L in which the left part of the interface panel 19 is disposed. The right main body housing 2R has a recess 25R in which the right part of the interface panel 19 is disposed. The left part of the interface panel 19 is fitted to the recess 25L. The right part of the interface panel 19 is fitted to the recess 25R.

As illustrated in FIG. 35, the interface panel 19 includes a resin panel 190, a sheet 191, and a display operation board 192. The display operation board 192 faces the back surface of the resin panel 190. The resin panel 190 and the display operation board 192 are fixed by three screws 193. The sheet 191 is attached to the surface of the resin panel 190.

Four adjustment light emitters 19D and two application light emitters 19E are mounted on the surface of the display operation board 192. The adjustment light emitters 19D and the application light emitters 19E each are light emitting diodes. Switches mounted on the surface of the display operation board 192 includes: a micro switch 192A corresponding to the impacting force adjustment button 19A; a micro switch 192B corresponding to the light intensity adjustment button 19B; and a micro switch 192C corresponding to the application button 19C.

The sheet 191 includes: an impacting force adjustment button 19A; a light intensity adjustment button 19B; an application button 19C; four transmission portions 191A that transmit light from the respective adjustment light emitters 19D; and two transmission portions 191B that transmit light from the respective application light emitters 19E.

The resin panel 190 includes: an elastic deformation portion 190A disposed between the impacting force adjustment button 19A and the micro switch 192A; an elastic deformation portion 190B disposed between the light intensity adjustment button 19B and the micro switch 192B; and an elastic deformation portion 190C disposed between the application button 19C and the micro switch 192C.

When the impacting force adjustment button 19A is pressed, the elastic deformation portion 190A is elastically deformed to press the micro switch 192A. Pressing the micro switch 192A will adjust the impacting force of the impacting mechanism 15.

When the light intensity adjustment button 19B is pressed, the elastic deformation portion 190B is elastically deformed to press the micro switch 192B. Pressing the micro switch 192B will adjust the light emission intensity of the light emitter unit 90.

When the application button 19C is pressed, the elastic deformation portion 190C is elastically deformed to press the micro switch 192C. Pressing the micro switch 192C will adjust the adjustment items set by the operator.

The resin panel 190 includes: four transmission portions 191A that transmit the light from the respective adjustment light emitters 19D; and two transmission portion 191B that transmit the light from the respective application light emitters 19E.

The resin panel 190 includes: a base portion 1901; and a protruding portion 1902 protruding toward in an upward rear direction from a rear surface of the base portion 1901. The elastic deformation portion 190A, the elastic deformation portion 190B, the elastic deformation portion 190C, passing portions 190D, and passing portions 190E are provided in the protruding portion 1902. The sheet 191 is attached to the surface of the protruding portion 1902.

As illustrated in FIG. 34, the panel holding portion 25 includes: a lower part holding portion 25A that holds a lower part of the base portion 1901 of the resin panel 190; and an upper part holding portion 25B that holds an upper part of the base portion 1901 of the resin panel 190.

The lower part holding portion 25A includes grooves respectively provided in the left main body housing 2L and the right main body housing 2R. The lower end of the base portion 1901 is inserted into the grooves of the lower part holding portion 25A. The lower end of the base portion 1901 is fitted to the grooves of the lower part holding portion 25A.

The upper part holding portion 25B includes grooves respectively provided in the left main body housing 2L and the right main body housing 2R. The upper end of the base portion 1901 is inserted into the grooves of the upper part holding portion 25B. The upper part holding portion 25B comes in contact with the upper part of the rear surface of the base portion 1901 and the upper surface of the base portion 1901.

The left part of the protruding portion 1902 is fitted to the recess 25L. The right part of the protruding portion 1902 is fitted to the recess 25R. With a configuration in which the protruding portion 1902 is fitted to the recess 25L and the recess 25R, and the base portion 1901 is held by the lower part holding portion 25A and the upper part holding portion 25B, the interface panel 19 is fixed to the panel holding portion 25.

Operation of Impact Tool

Next, operations of the impact tool 1 will be described. For example, when the tightening work of the work target is performed, the socket used for the tightening work is attached to the front end of the anvil 16. After the socket is attached to the anvil 16, the operator grips the side handle 7 with the left hand and grips the grip portion 23 with the right hand to operate the trigger lever 17A to move the trigger lever 17A rearward. When the trigger lever 17A is operated to move rearward, power is supplied from the battery pack 43 to the motor 10 so as to drive the motor 10 and turn on the light assembly 18. The driving of the motor 10 rotates the rotor 48 and the rotor shaft 49. When the rotor shaft 49 rotates, the rotational force of the rotor shaft 49 is transmitted to the planetary gears 55P via the first bevel gear 53, the second bevel gear 54, and the sun gear 55S. The planetary gears 55P revolve around the sun gear 55S while rotating in a state of being meshed with the internal teeth of the internal gear 55I. The planetary gears 55P are rotatably supported by the spindle 14 via the respective pins 55A. Due to the revolution of the planetary gears 55P, the spindle 14 rotates at a rotational speed lower than the rotational speed of the rotor shaft 49.

When the spindle 14 rotates in a state where the hammer projections 71B and the anvil projections 16C are in contact with each other, the anvil 16 rotates together with the hammer 71 and the spindle 14. The tightening work proceeds with the rotation of the anvil 16.

When a load of a predetermined value or more acts on the anvil 16 with the progress of the tightening work, the rotations of the anvil 16 and the hammer 71 are stopped. When the spindle 14 rotates in a state where the rotation of the hammer 71 is stopped, the hammer 71 moves rearward. When the hammer 71 moves rearward, the contact between the hammer projections 71B and the anvil projections 16C is canceled. The hammer 71, which has moved to the rear side, moves forward while rotating, by the elastic force of the first coil spring 73 and the second coil spring 74. When the hammer 71 moves forward while rotating, the anvil 16 is impacted in the rotation direction by the hammer 71. With this operation, the anvil 16 rotates about the output rotation axis AX with high torque. This tightens the bolt or the nut with high torque.

According to the embodiment, the axial elastic body 91 and the radial elastic body 92 blocks transmission of vibration of the hammer case 6 to the light emitter unit 90. Since the light emitter unit 90 is vibration-isolated, it is possible to prevent, for example, breakage of a connection portion formed by soldering between the substrate 95A and the LED chip 95B or breakage of wiring provided on the substrate 95A. That is, the failure of the light emitter unit 90 is prevented.

Further, according to the embodiment, the vibration isolation rubbers 100 block transmission of vibration of the main body housing 2 to the terminal 44 and the battery pack 43. Since each of the vibration isolation rubbers 100 extends in three directions of the front-rear direction, the up-down direction, and the left-right direction, it is possible to attenuate vibrations occurring in the three directions applied to the terminal 44 and the battery pack 43.

Still further, when the impact tool 1 falls and the battery pack 43 hits the floor surface or the ground, the battery holder 9 moves forward to allow the battery pack 43 to come into contact with the cushion rubber 46. This reduces the impact acting on the battery pack 43.

EFFECTS

As described above, in the embodiment, the impact tool 1 includes: the motor 10; the speed reduction mechanism 13 rotated by the motor 10; the hammer 71 rotated by the rotation of the motor 10 transmitted via the speed reduction mechanism 13; the anvil 16 to be impacted in the rotation direction by the hammer 71; the motor case 4 accommodating the motor 10; and the gear case 5 accommodating the speed reduction mechanism 13. One or both of the motor case 4 and the gear case 5 are made of a magnesium alloy.

In the above configuration, since one or both of the motor case 4 and the gear case 5 are made of a magnesium alloy, it is possible to achieve both high strength and light weight of the impact tool 1. The strength of the magnesium alloy is higher than the strength of the synthetic resin. The specific gravity of the magnesium alloy is lower than the specific gravity of aluminum.

In the embodiment, the motor case 4 includes a holder mechanism 4H that holds the lead wire 39, being the first lead wire passing through the outside of the motor case 4.

In the above configuration, the lead wire 39 is held by the holder mechanism 4H, leading to improvement of assemblability at the time of assembling the impact tool 1.

In the embodiment, the lead wire 39 is not connected to the motor 10.

In the above configuration, the lead wire 39 not connected to the motor 10 is held by the holder mechanism 4H. Power is supplied to an electronic device other than the motor 10 via the lead wire 39.

In the embodiment, the impact tool 1 includes the controller 11. The lead wire 39 is connected to the controller 11.

In the above configuration, the lead wire 39 connected to controller 11 is held by the holder mechanism 4H.

In the embodiment, the controller 11 is disposed rearward of the motor case 4. The lead wire 39 is connected to an electronic component disposed forward of the motor case 4.

In the above configuration, power is supplied to the electronic component disposed forward of the motor case 4 via the lead wire 39.

In the embodiment, the impact tool 1 includes the light emitter unit 90 including the light emitter that illuminates the front end side of the anvil 16. The electronic component includes the LED chip 95B of the light emitter unit 90.

In the above configuration, power is supplied to the LED chip 95B disposed forward of the motor case 4 via the lead wire 39. The LED chip 95B emits light by the power supplied via the lead wire 39.

In the embodiment, the impact tool 1 includes the connector 38 that is disposed forward of the motor case 4 to energize the light emitter unit 90. A rear end of the lead wire 39 is connected to the controller 11. A front end of the lead wire 39 is connected to the connector 38. The holder mechanism 4H holds the intermediate part of the lead wire 39.

In the above configuration, the intermediate part of the lead wire 39 connecting the controller 11 and the connector 38 is held by the holder mechanism 4H.

In the embodiment, the holder mechanism 4H includes: the base rib 4G provided on the outer surface of the motor case 4 to support the lead wire 39 from the lower side; and the hook rib 4F disposed on the outer surface of the motor case 4 on the upper side of the base rib 4G to support the lead wire 39 from the side.

In the above configuration, the lead wire 39 is held by the base rib 4G and the hook rib 4F.

In one or more embodiments, the motor case 4 includes: the tube portion 4A disposed around the motor 10; the lower wall 4B disposed at the lower end of the tube portion 4A; and the protruding portion 4D protruding laterally from the upper part of the outer circumferential surface of the tube portion 4A. The base rib 4G protrudes from the side surface of the tube portion 4A on the lower side of the protruding portion 4D. The hook rib 4F protrudes downward from the lower surface of the protruding portion 4D.

In the above configuration, the relative position between the base rib 4G and the hook rib 4F is optimized to be able to hold the lead wire 39.

In one or more embodiments, the impact tool 1 includes: the fan 12 fixed to the upper part of the rotor shaft 49 of the motor 10; and the baffle plate 30 disposed at the upper end of the motor case 4 to face the fan 12. The baffle plate 30 includes: the base portion 30A having an annular shape and inserted into the opening of the upper end of the tube portion 4A; and the screw boss 30B provided on the peripheral edge of the base portion 30A. The protruding portion 4D has the recess 4E, which is an upper recess, into which the screw boss 30B is inserted in a state where the base portion 30A is inserted into the opening at the upper end of the tube portion 4A.

In the above configuration, the base portion 30A is inserted into the opening of the upper end of the tube portion 4A and the screw boss 30B is inserted into the recess 4E of the protruding portion 4D, decreasing the amount of protrusion of the baffle plate 30 upward from the motor case 4. This prevents enlargement of the impact tool 1.

In the embodiment, the screw 30S inserted into the opening 30C of the screw boss 30B is joined to the screw hole 4R provided in the recess 4E.

In the above configuration, the motor case 4 and the baffle plate 30 are fixed with each other by the screw 30S. The screw 30S is disposed inside the recess 4E, decreasing the amount of protrusion of the screw 30S upward from the baffle plate 30. This prevents enlargement of the impact tool 1.

In the embodiment, the motor case 4 includes: the tube portion 4A disposed around the motor 10; and the lower wall 4B disposed at the lower end of the tube portion 4A. The impact tool 1 includes: the inner member 80 made of a synthetic resin and disposed between the inner circumferential surface of the tube portion 4A and the outer circumferential surface of the stator core 47A of the motor 10.

In the above configuration, the contact between the magnesium alloy motor case 4 and the iron stator core 47A is blocked by the inner member 80 made of a synthetic resin, making it possible to reduce wear of the motor case 4.

In the embodiments, the inner member 80 includes: the base portion 81 having an annular shape and disposed between the inner circumferential surface of the tube portion 4A and the outer circumferential surface of the stator core 47A of the motor 10; an outer protrusion 82 protruding outward in the radial direction from the outer circumferential surface of the base portion 81; and the inner protrusion 83 protruding inward in the radial direction from the inner circumferential surface of the base portion 81. The inner circumferential surface of the tube portion 4A has the recess 4K, which is an inner recess, into which the outer protrusion 82 is inserted. The outer circumferential surface of the stator core 47A has the groove 47F into which the inner protrusion 83 is inserted.

In the above configuration, since the inner protrusion 83 is inserted into the groove 47F, it is possible to prevent a change in the relative position between the stator 47 and the inner member 80 in the rotation direction. With the outer protrusion 82 inserted into the recess 4K, it is possible to prevent a change in the relative position between the inner member 80 and the motor case 4 in the rotation direction.

In the embodiments, the impact tool 1 includes: the controller 11 disposed on the rear side of the motor case 4 to control the motor 10; and the sensor substrate 50 accommodated in the motor case 4 to detect the position of the rotor of the motor 10 in the rotation direction. The motor case 4 includes: the tube portion 4A disposed around the motor 10; and the lower wall 4B disposed at the lower end of the tube portion 4A. The stator 47 of the motor 10 includes: the stator core 47A; and the power supply terminal 47G disposed on the rear side of the stator core 47A inside the motor case 4. The sensor substrate 50 is disposed on the lower side of the stator core 47A inside the motor case 4. The opening 4C, which is the first opening, is provided in a rear part of the tube portion 4A. The opening 4M, which is the second opening, is provided in a rear part of the lower wall 4B. The lead wire 47H, which is the second lead wire connecting the power supply terminal 47G and the controller 11 to each other, passes through the opening 4C. The lead wire 50C, which is the third lead wire connecting the sensor substrate 50 and the controller 11 to each other, passes through the opening 4M.

In the above configuration, with the lead wire 47H passing through the opening 4C provided at the rear part of the tube portion 4A, it is possible to prevent a situation in which the lead wire 47H is excessively bent or an excessive tension acts on the lead wire 47H. With the lead wire 50C passing through the opening 4M provided at the rear part of the lower wall 4B, it is possible to prevent a situation in which the lead wire 50C is excessively bent or an excessive tension acts on the lead wire 50C.

In the embodiment, the motor case 4 includes the reinforcement rib 4N provided at the boundary between the opening 4C and the opening 4M and integrated with the tube portion 4A and the lower wall 4B.

In the above configuration, with the reinforcement rib 4N disposed at the boundary between the opening 4C and the opening 4M, it is possible to reduce deterioration of strength of the motor case 4.

In the embodiment, the impact tool 1 includes the main body housing 2 made of a synthetic resin and configured to accommodate the motor case 4. The anvil 16 rotates about the output rotation axis AX extending in the front-rear direction. The overall length Lt indicating the distance in the front-rear direction between the front end of the anvil 16 and the rear end of the main body housing 2 is 440 mm or less.

The above configuration can prevent enlargement of the impact tool 1, improving workability in work using the impact tool 1.

In the embodiment, the main body housing 2 includes: the main body portion 21 that accommodates the motor case 4; the grip portion 23 disposed on a rear side of the main body portion 21; and the controller accommodating portion 24 disposed on the lower side of the grip portion 23. The grip portion 23 includes; a rear grip portion 23A extending upward from the rear part of the controller accommodating portion 24; and an upper grip portion 23B extending forward from the upper end of the rear grip portion 23A. A front end of the upper grip portion 23B is connected to an upper part of the main body portion 21. The space length Lg indicating the maximum dimension in the front-rear direction of the space surrounded by the grip portion 23, the main body portion 21, and the controller accommodating portion 24 is 90 mm or more.

With the above configuration, when gripping the grip portion 23, the operator can easily grip only the rear grip portion 23A as well as easily grip a part of the rear grip portion 23A and a part of the upper grip portion 23B at the same time. In addition, this makes it easy to grip the grip portion 23 because the finger and the main body portion 21 are unlikely to interfere with each other. This makes it possible to apply various ways of gripping according to the working situation, leading to an improvement in operability.

In the embodiment, the upper end of the motor case 4 and the lower end of the gear case 5 are fixed with each other by the screw 5S.

In the above configuration, the motor case 4 and the gear case 5 disposed in the up-down direction are fixed by the screw 5S.

In the embodiment, the rotor 48 of the motor 10 rotates about the motor rotation axis MX extending in the up-down direction. The speed reduction mechanism 13 includes: the first bevel gear 53 that rotates about the motor rotation axis MX; and the second bevel gear 54 configured to mesh with the first bevel gear 53 and rotate about the output rotation axis AX extending in the front-rear direction.

In the above configuration, the motor rotation axis MX and the output rotation axis AX are orthogonal to each other, making it possible to shorten the overall length Lt of the impact tool 1.

In the embodiment, the impact tool 1 includes the hammer case 6 disposed on the front side of the gear case 5 to accommodate the hammer 71. Both the motor case 4 and the gear case 5 are made of a magnesium alloy, and the hammer case 6 is made of aluminum.

In the above configuration, since both the motor case 4 and the gear case 5 are made of a magnesium alloy, it is possible to achieve high strength and light weight of both the motor case 4 and the gear case 5. The hammer case 6 is made of aluminum having a strength higher than that of the magnesium alloy. Therefore, even with a large impact applied to the hammer case 6 when the hammer 71 impacts the anvil 16, the hammer case 6 can withstand the impact.

OTHER EMBODIMENTS

In the embodiment described above, both the motor case 4 and the gear case 5 are made of a magnesium alloy. Alternatively, one of the motor case 4 and the gear case 5 may be made of a magnesium alloy, and the other may be made of a material other than the magnesium alloy.

In the above-described embodiment, the axial elastic body 91 and the radial elastic body 92 each have an annular shape. Alternatively, the axial elastic body 91 may be a plurality of elastic body pieces provided at a plurality of positions around the second tube portion 62. The radial elastic body 92 also may be a plurality of elastic body pieces provided at a plurality of positions around the second tube portion 62.

In the above-described embodiment, the battery holder 9 includes: the left battery holder 9L; and the right battery holder 9R disposed on the right side of the left battery holder 9L. That is, the battery holder 9 can be divided into left and right modules. Alternatively, the battery holder 9 may be configured to be divided into upper and lower modules.

In the embodiment described above, the impact tool 1 is an impact wrench. Alternatively, the impact tool may be an impact driver. The anvil of the impact driver includes: an insertion hole into which the tool tip is inserted, and a chuck mechanism that holds the tool tip.

In the above-described embodiment, the battery pack 43 attached to the battery holder 9 is used as the power source of the impact tool 1. Alternatively, a commercial power source (AC power source) may be used as a power source of the impact tool 1.

In the above-described embodiment, the motor 10 is an inner rotor type brushless motor. Alternatively, the motor 10 may be an outer rotor type brushless motor or a brushed motor.

The electric-powered impact tool 1 may be another type of power tool, such as an electric hammer, an electric cutter, an electric circular saw, an electric chain saw, an electric lawn mower, an electric grass mower, or an electric grinder.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An impact tool comprising:

a motor;

a speed reduction mechanism rotated by the motor; and a hammer rotated by rotation of the motor transmitted via the speed reduction mechanism;

an anvil to be impacted in a rotation direction by the hammer;

a motor case configured to accommodate the motor; and a gear case configured to accommodate the speed reduction mechanism, wherein one or both of the motor case and the gear case are made of a magnesium alloy, and wherein the motor case includes a holder mechanism configured to hold a first lead wire passing through an outside of the motor case.

2. The impact tool according to claim 1, wherein the first lead wire is not connected to the motor.

3. The impact tool according to claim 2, further comprising a controller, wherein the first lead wire is connected to the controller.

4. The impact tool according to claim 3, wherein the controller is disposed rearward of the motor case, and the first lead wire is connected to an electronic component disposed forward of the motor case.

5. The impact tool according to claim 4, further comprising a light emitter unit including a light emitter that illuminates a front end side of the anvil, wherein the electronic component includes an LED chip of the light emitter unit.

6. The impact tool according to claim 5, further comprising a connector that is disposed forward of the motor case to energize the light emitter unit, wherein a rear end of the first lead wire is connected to the controller, a front end of the first lead wire is connected to the connector, and the holder mechanism holds an intermediate part of the first lead wire.

7. The impact tool according to claim 1, wherein the holder mechanism includes:

a base rib provided on an outer surface of the motor case to support the first lead wire from a lower side; and a hook rib disposed on the outer surface of the motor case on an upper side of the base rib to support the first lead wire from a side.

8. The impact tool according to claim 7, wherein the motor case includes:

a tube portion disposed around the motor;

a lower wall disposed at a lower end of the tube portion; and a protruding portion protruding laterally from an upper part of an outer circumferential surface of the tube portion, the base rib protrudes from a side surface of the tube portion on a lower side of the protruding portion, and the hook rib protrudes downward from a lower surface of the protruding portion.

9. The impact tool according to claim 8, further comprising:

a fan fixed to an upper part of a rotor shaft of the motor; and a baffle plate disposed at an upper end of the motor case and facing the fan, wherein the baffle plate includes:

a base portion having an annular shape and configured to be inserted into an opening of an upper end of the tube portion; and a screw boss provided on a peripheral edge of the base portion, and the protruding portion includes an upper recess into which the screw boss is inserted in a state where the base portion is inserted into the opening of the upper end of the tube portion.

10. The impact tool according to claim 9, wherein a screw inserted into an opening of the screw boss is joined to a screw hole provided in the upper recess.

11. The impact tool according to claim 1, wherein the motor case includes:

a tube portion disposed around the motor; and a lower wall disposed at a lower end of the tube portion, and the impact tool further comprises an inner member made of a synthetic resin and disposed between an inner circumferential surface of the tube portion and an outer circumferential surface of a stator core of the motor.

12. The impact tool according to claim 11, wherein the inner member includes:

a base portion having an annular shape and disposed between the inner circumferential surface of the tube portion and the outer circumferential surface of the stator core of the motor;

an outer protrusion protruding outward in a radial direction from an outer circumferential surface of the base portion; and an inner protrusion protruding inward in the radial direction from an inner circumferential surface of the base portion, the inner circumferential surface of the tube portion has an inner recess into which the outer protrusion is inserted, and the outer circumferential surface of the stator core has a groove into which the inner protrusion is inserted.

13. The impact tool according to claim 1, further comprising:

a controller disposed on a rear side of the motor case to control the motor; and a sensor substrate accommodated in the motor case to detect a position of a rotor of the motor in a rotation direction, wherein the motor case includes:

a tube portion disposed around the motor; and a lower wall disposed at a lower end of the tube portion, a stator of the motor includes: a stator core; and a power supply terminal disposed on a rear side of the stator core inside the motor case, the sensor substrate is disposed on a lower side of the stator core inside the motor case, a first opening is provided in a rear part of the tube portion, a second opening is provided in a rear part of the lower wall, a second lead wire connecting the power supply terminal and the controller to each other passes through the first opening, and a third lead wire connecting the sensor substrate and the controller to each other passes through the second opening.

14. The impact tool according to claim 13, wherein the motor case includes a reinforcement rib provided at a boundary between the first opening and the second opening and integrated with the tube portion and the lower wall.

15. The impact tool according to claim 1, wherein an upper end of the motor case and a lower end of the gear case are fixed with each other by a screw.

16. The impact tool according to claim 15, wherein a rotor of the motor rotates about a motor rotation axis extending in an up-down direction, and the speed reduction mechanism includes: a first bevel gear configured to rotate about the motor rotation axis; and a second bevel gear configured to mesh with the first bevel gear and rotate about an output rotation axis extending in a front-rear direction.

17. An impact tool comprising:

a motor;

a speed reduction mechanism rotated by the motor;

a hammer rotated by rotation of the motor transmitted via the speed reduction mechanism;

an anvil to be impacted in a rotation direction by the hammer;

a motor case configured to accommodate the motor;

a gear case configured to accommodate the speed reduction mechanism, wherein one or both of the motor case and the gear case are made of a magnesium alloy; and a main body housing made of a synthetic resin and configured to accommodate the motor case, wherein the anvil rotates about an output rotation axis extending in a front-rear direction, and an overall length indicating a distance in the front-rear direction between a front end of the anvil and a rear end of the main body housing is 440 mm or less.

18. The impact tool according to claim 17, wherein the main body housing includes:

a main body portion configured to accommodate the motor case;

a grip portion disposed on a rear side of the main body; and a controller accommodating portion disposed on a lower side of the grip portion, the grip portion includes:

a rear grip portion extending upward from a rear part of the controller accommodating portion; and an upper grip portion extending forward from an upper end of the rear grip portion, a front end of the upper grip portion is connected to an upper part of the main body portion, and a space length indicating a maximum dimension in the front-rear direction of a space surrounded by the grip portion, the main body portion, and the controller accommodating portion is 90 mm or more.

19. An impact tool comprising:

a motor;

a speed reduction mechanism rotated by the motor;

a hammer rotated by rotation of the motor transmitted via the speed reduction mechanism;

an anvil to be impacted in a rotation direction by the hammer;

a motor case configured to accommodate the motor; and a gear case configured to accommodate the speed reduction mechanism, wherein one or both of the motor case and the gear case are made of a magnesium alloy; and a hammer case disposed on a front side of the gear case to accommodate the hammer, wherein both the motor case and the gear case are made of a magnesium alloy, and the hammer case is made of aluminum.

* * * * *